US012562477B2

(12) United States Patent
Wu et al.

(10) Patent No.: US 12,562,477 B2
(45) Date of Patent: Feb. 24, 2026

(54) ANTENNA AND ELECTRONIC DEVICE

(71) Applicant: Huawei Technologies Co., Ltd., Shenzhen (CN)

(72) Inventors: Pengfei Wu, Shanghai (CN); Hanyang Wang, Reading (GB); Liang Xue, Shanghai (CN); Meng Hou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 88 days.

(21) Appl. No.: 18/708,741

(22) PCT Filed: Oct. 26, 2022

(86) PCT No.: PCT/CN2022/127675

§ 371 (c)(1),
(2) Date: May 9, 2024

(87) PCT Pub. No.: WO2023/082999

PCT Pub. Date: May 19, 2023

(65) Prior Publication Data

US 2025/0007161 A1 Jan. 2, 2025

(30) Foreign Application Priority Data

Nov. 11, 2021 (CN) ......................... 202111332957.2

(51) Int. Cl.

| | |
|---|---|
| ***H01Q 5/328*** | (2015.01) |
| ***H01Q 1/24*** | (2006.01) |
| ***H01Q 1/44*** | (2006.01) |
| ***H01Q 1/48*** | (2006.01) |

(52) U.S. Cl.
CPC ............. *H01Q 5/328* (2015.01); *H01Q 1/243* (2013.01); *H01Q 1/44* (2013.01); *H01Q 1/48* (2013.01)

(58) Field of Classification Search
None
See application file for complete search history.

(56) References Cited

U.S. PATENT DOCUMENTS

| | | | | |
|---|---|---|---|---|
| 2009/0267851 | A1 | 10/2009 | Morris, III | |
| 2017/0214422 | A1 | 7/2017 | Na et al. | |
| 2023/0163457 | A1* | 5/2023 | Tsai | H01Q 1/243 343/893 |
| 2023/0387609 | A1* | 11/2023 | Wang | H01Q 1/50 |
| 2024/0055780 | A1* | 2/2024 | Vollmer | H01Q 25/001 |
| 2024/0146349 | A1* | 5/2024 | Jin | H01Q 1/48 |

FOREIGN PATENT DOCUMENTS

| | | | |
|---|---|---|---|
| CN | 212412212 | U | 1/2021 |
| CN | 112448143 | A | 3/2021 |
| CN | 113131196 | A | 7/2021 |
| CN | 114389005 | A | 4/2022 |
| EP | 1011167 | A1 | 6/2000 |
| WO | 2011018551 | A1 | 2/2011 |
| WO | 2020173540 | A1 | 9/2020 |
| WO | 2020251064 | A1 | 12/2020 |

* cited by examiner

*Primary Examiner* — Wilson Lee
(74) *Attorney, Agent, or Firm* — Slater Matsil, LLP

(57) ABSTRACT

In accordance with an embodiment, an antenna includes at least two radiators. The at least two radiators include a first radiator and a second radiator that are spaced apart in parallel, and a first end of the first radiator is disposed closer to a first end of the second radiator than a second end of the first radiator. Both the first radiator and the second radiator are connected to a feed point.

20 Claims, 47 Drawing Sheets

Current pattern at a first resonance frequency

Current pattern at a second resonance frequency

Electric field pattern at a first resonance frequency

Electric field pattern at a second resonance frequency

Radiation pattern at a first resonance frequency of 2.74 GHz

Radiation pattern at a second resonance frequency of 2.44 GHz

Radiation pattern of an antenna according to an embodiment of this application
Resonance frequency: 2.44 GHz Radiation pattern of an antenna with a second design size in a second reference design
Resonance frequency: 2.44 GHz 2.44 GHz 2.59 GHz 2.74 GHz 2.66 GHz 2.77 GHz 2.87 GHz 2.44 GHz 2.59 GHz 2.9 GHz 2.65 GHz 2.7 GHz 2.8 GHz 2.55 GHz 2.6 GHz 2.73 GHz Current pattern at a first resonance frequency of 0.83 GHz Current pattern at a second resonance frequency of 0.91 GHz Electric field pattern at a first resonance frequency Electric field pattern at a second resonance frequency Radiation pattern at a first resonance frequency Radiation pattern at a second resonance frequency Current pattern at a first resonance frequency 0.79 GHz Current pattern at a second resonance frequency 0.9 GHz Electric field pattern at a first resonance frequency 0.79 GHz Electric field pattern at a second resonance frequency 0.9 GHz Current pattern at a first resonance frequency of J@1.94 GHz Current pattern at a second resonance frequency of J@2.16 GHz Electric field pattern at a first resonance frequency of E@1.94 GHz Electric field pattern at a second resonance frequency of E@2.16 GHz Radiation pattern at a first resonance frequency of 1.94 GHz Radiation pattern at a second resonance frequency of 2.16 GHz Current pattern at a first resonance frequency 1.79 GHz Current pattern at a second resonance frequency 2.34 GHz Electric field pattern at a first resonance frequency Electric field pattern at a second resonance frequency Current pattern at a first resonance frequency 1.71 GHz Current pattern at a second resonance frequency 2.21 GHz Current pattern at a third resonance frequency 2.49 GHz Electric field pattern at a first resonance frequency Electric field pattern at a second resonance frequency Electric field pattern at a third resonance frequency

ANTENNA AND ELECTRONIC DEVICE

CROSS-REFERENCE TO RELATED APPLICATIONS

This application is a National Stage of International Patent Application No. PCT/CN2022/127675, filed on Oct. 26, 2022, which claims priority to Chinese Patent Application No. 202111332957.2, filed on Nov. 11, 2021, both of which are hereby incorporated by reference in their entireties.

TECHNICAL FIELD

This application relates to the field of antennas, and in particular, to an antenna and an electronic device.

BACKGROUND

With rapid development of key technologies such as curved and flexible displays, lightness and thinness and an ultimate screen-to-body ratio of an ID (industrial design, industrial design) have become a trend of terminal products. In this trend, antenna arrangement space is greatly reduced. In addition, some terminal products such as a mobile phone have an increasingly high requirement for photographing. With a gradual increase in a quantity of cameras and sizes of the cameras, complexity of an antenna design in the terminal product is further increased. Further, 3G, 4G, and 5G frequency bands usually coexist as communication frequency bands of some terminal products such as a mobile phone. This leads to an increasing quantity of antennas on one electronic device and more serious mutual impact. Therefore, miniaturization and wide frequency band coverage of an antenna have become a common goal in the industry.

In the conventional technology, to implement wide frequency band coverage of an antenna, an antenna of a serial structure (refer to FIG. 1*a*) may be used. Two radiators are arranged in serial and are spaced apart end to end, and a plurality of modes of the antenna are excited through coupled feeding to form the wide frequency band coverage. However, the antenna of the serial structure has a large size in a length direction. For example, when the antenna is arranged on a metal side frame, the antenna needs to occupy more space in the length direction. This is not conducive to a layout design of a plurality of antennas in an electronic device.

It can be learned that, in the conventional technology, it is difficult to consider both miniaturization and wide frequency band coverage of an antenna.

SUMMARY

An objective of this application is to resolve a problem in the conventional technology that it is difficult to consider both miniaturization and wide frequency band coverage of an antenna. Therefore, the embodiments provide an antenna and an electronic device, and a brand-new antenna structure is constructed. Compared with a conventional single-radiator antenna, the brand-new antenna increases wide frequency band bandwidth in a same operating frequency band, implements miniaturization of the antenna under a condition of same efficiency, and significantly improves efficiency bandwidth.

An embodiment of this application provides an antenna, including at least two radiators. The at least two radiators include a first radiator and a second radiator that are spaced apart in parallel, and a first end of the first radiator is disposed closer to a first end of the second radiator than a second end of the first radiator. Both the first radiator and the second radiator are connected to a feed point. Both the first end of the first radiator and the first end of the second radiator are grounded. A gap by which the first radiator and the second radiator are spaced apart is less than or equal to 3 mm.

In this application, the first radiator and the second radiator are spaced apart in parallel to separately receive feed signals, so that a plurality of resonance modes of the antenna in a same operating frequency band can be excited to form wide frequency band bandwidth, and efficiency bandwidth is significantly improved under a condition of same efficiency. Compared with a manner of disposing radiators in serial in an antenna, a manner of disposing radiators in parallel further greatly reduces a size in a length direction of the antenna, and implements miniaturization of the antenna. Further, in this application, when the gap between the first radiator and the second radiator is very small, for example, a physical length of the gap is less than or equal to 3 mm, wide frequency band bandwidth in a same operating frequency band can still be ensured, to help reduce a size in a width direction of the antenna, provide a possibility of further miniaturization of the antenna, provide a basis for implementing different layout manners of the antenna in an electronic device, and help enrich a layout design solution of a plurality of antennas in the electronic device.

In some embodiments, a first feed connection point of the first radiator is connected to the feed point, and a second feed connection point of the second radiator is connected to the feed point. A phase difference between a feed signal received by the first feed connection point and a feed signal received by the second feed connection point ranges from 180°−45° to 180°+45°. For example, the phase difference is within a range of 180°±30°, 180°±20°, or 180°±10°.

The phase difference between the feed signals received by the two radiators ranges from 180°−45° to 180°+45°, so that two co-directional electric fields (for example, the electric fields are both in a direction from the ground to the radiator or a direction from the radiator to the ground) can be excited on the first radiator and the second radiator in a same operating frequency band of the antenna, thereby generating superposition of the electric fields. Compared with a conventional single-radiator antenna, the antenna can significantly improve efficiency bandwidth while it is ensured that a size in a length direction of the antenna is not increased. Alternatively, under a condition of same efficiency bandwidth, compared with a conventional single-radiator antenna or an antenna of a serial structure (as shown in FIG. 1*a*), the antenna in this embodiment of this application is greatly reduced in size in a length direction. Therefore, this embodiment of this application can help implement miniaturization of an antenna size, and facilitate a layout design of a plurality of antennas in an electronic device.

In some embodiments, the first end of the first radiator and the first end of the second radiator are grounded by using a co-grounded structure. The co-grounded structure includes a grounding component, the grounding component is connected between the first end of the first radiator and the first end of the second radiator, the first end of the first radiator is grounded, and the first end of the second radiator is grounded by using the grounding component and the first radiator.

Alternatively, the co-grounded structure includes a metal component, the first end of the first radiator is connected to the first end of the second radiator by using the metal component, and the metal component is grounded.

In some embodiments, the first end of the first radiator is disposed in alignment with the first end of the second radiator.

In some possible implementations, the second end of the first radiator is also disposed in alignment with a second end of the second radiator.

In this embodiment, the first radiator and the second radiator are disposed in parallel and are disposed in a manner in which at least one end of the first radiator is disposed in alignment with at least one end of the second radiator, so that space occupied by the radiators in a length direction of the antenna can be further reduced. This helps further implement miniaturization of an antenna size, and further lays a foundation for enriching layouts of antennas in electronic devices with different IDs (industrial designs, industrial designs).

In some embodiments, the second end of the first radiator is grounded and/or the second end of the second radiator is grounded.

In some embodiments, a resonance frequency of the first radiator and a resonance frequency of the second radiator are within a same operating frequency band of the antenna.

In some embodiments, the antenna further includes a ground, configured to ground the first radiator and the second radiator. At any frequency in the operating frequency band, an electric field generated by the first radiator and an electric field generated by the second radiator are consistent in direction, and are both in a direction from the ground to the radiator or a direction from the radiator to the ground.

In some possible embodiments, the gap by which the first radiator and the second radiator are spaced apart is less than or equal to 0.1 times an operating wavelength of the antenna.

In some embodiments, the gap by which the first radiator and the second radiator are spaced apart is less than or equal to 1 mm. In this application, when the gap between the first radiator and the second radiator is very small, wide frequency band bandwidth in a same operating frequency band can still be ensured, to help reduce a size in a width direction of the antenna, provide a possibility of further miniaturization of the antenna, provide a basis for implementing different layout manners of the antenna in an electronic device, and help enrich a layout design solution of a plurality of antennas in the electronic device.

In this embodiment, the gap by which the first radiator and the second radiator are spaced apart is small, which helps reduce a size in a width direction of the antenna, so that an overall size of the antenna is further miniaturized. Further, the first radiator and the second radiator are disposed close to each other, so that a superposition degree of the co-directional electric fields is good, and operating performance of the antenna is improved.

In some embodiments, the at least two radiators further include a third radiator, and the third radiator and the first radiator or the second radiator are disposed in serial and are spaced apart end to end to form a slot, so as to be coupled through the slot.

An end that is of the third radiator and that is away from the slot is grounded.

In this implementation, efficiency bandwidth of the antenna can be further improved by using a plurality of radiators. In addition, because at least two radiators (for example, the first radiator and the second radiator) in the plurality of radiators are spaced apart in parallel, compared with a conventional multi-radiator antenna, the antenna is smaller in size in a length direction on a premise of meeting same efficiency bandwidth, so that miniaturization of the antenna is implemented.

An embodiment of this application provides an electronic device, including the antenna provided in any one of the foregoing embodiments or possible embodiments.

In some embodiments, a first radiator and a second radiator are connected to a feed point by using a differential feed structure.

In some embodiments, a first radiator and a second radiator are connected to a feed point by using a distributed feed structure.

The distributed feed structure includes a signal transmission line, a first end of the signal transmission line is connected to a first feed connection point of the first radiator, and a second end of the signal transmission line is connected to a second feed connection point of the second radiator.

In some embodiments, the signal transmission line is electrically connected to a radio frequency source by using the feed point, and a line length between the first end of the signal transmission line and the feed point and a line length between the second end of the signal transmission line and the feed point are set, so that a phase difference between a feed signal received by the first feed connection point and a feed signal received by the second feed connection point ranges from 180°−45° to 180°+45°.

In some possible embodiments, the electronic device further includes a feed network. The first radiator and the second radiator are separately connected to the radio frequency source by using the feed network. The first radiator is connected to a first output end of the feed network, and the second radiator is connected to a second output end of the feed network, so that a phase difference between a feed signal received by the first radiator and a feed signal received by the second radiator ranges from 180°−45° to 180°+45°.

In some embodiments, the distributed feed structure further includes a first matching component and a second matching component that are used for radiator impedance matching. The first matching component is connected between the first end of the signal transmission line and the first feed connection point, and the second matching component is connected between the second end of the signal transmission line and the second feed connection point.

In some embodiments, the first matching component is a capacitor, and the second matching component is an inductor or a jumper resistor; or the first matching component is an inductor or a jumper resistor, and the second matching component is a capacitor.

In some embodiments, the first radiator is formed by using a metal side frame of the electronic device, and the second radiator is formed by using a conductive member in the electronic device.

Alternatively, each of the first radiator and the second radiator is formed by using a metal side frame of the electronic device.

Alternatively, each of the first radiator and the second radiator is formed by using a conductive member in the electronic device.

It can be learned that, in this embodiment, because the radiators of the antenna may be formed by using different components (such as the metal side frame and the conductive member) in the electronic device, an arrangement position of the antenna in the electronic device is not limited. This improves a degree of freedom of a manner of arranging the antenna in the electronic device, and is conducive to a layout design of a plurality of antennas in the electronic device.

DESCRIPTIONS OF REFERENCE NUMERALS

Figure 1A:
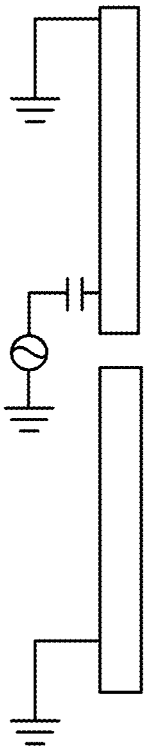
FIG. 1*a* is a schematic diagram of a principle structure of an antenna of a serial structure in a first reference design.

- 1: antenna;
- 101, 102, and 103: slots; 11: first radiator; 111: first end; 112: second end; 12: second radiator; 121: first end; 122: second end; 13: third radiator; 14: fourth radiator; 15, 16, 18, and 19: metal components; 17: signal transmission line;
- A0: feed point; A1: first feed connection point; A2: second feed connection point; RF: radio frequency source; C: capacitor; L, L1, and L2: inductors; 0R, 0R1, 0R2, and 0R3: jumper resistors;
- 2: electronic device;
- 20: PCB board; 21: first matching component; 22: second matching component; 23: cover; 24: display/module;
- 25: middle frame; 26: rear cover; and 27: side frame.

DETAILED DESCRIPTION OF THE EMBODIMENTS

The following describes implementations of this application by using specific embodiments. A person skilled in the art may easily learn of other advantages and effects of this application based on content disclosed in this specification. Although this application is described with reference to some embodiments, it does not mean that a characteristic of this application is limited only to this implementation. On the contrary, a purpose of describing this application with reference to an implementation is to cover another option or modification that may be derived based on claims of this application. To provide an in-depth understanding of this application, the following descriptions include a plurality of specific details. This application may alternatively be implemented without using these details. In addition, to avoid confusion or blurring a focus of this application, some specific details are omitted from the description. It should be noted that embodiments in this application and features in embodiments may be mutually combined in the case of no conflict.

It should be noted that, in this specification, similar reference numerals and letters in the following accompanying drawings indicate similar items. Therefore, once an item is defined in an accompanying drawing, the item does not need to be further defined or interpreted in the following accompanying drawings.

In descriptions of this application, it should be noted that orientation or position relationships indicated by terms “center”, “above”, “below”, “left”, “right”, “vertical”, “horizontal”, “inner”, “outer”, and the like are orientation or position relationships based on the accompanying drawings, and are only intended to facilitate and simplify the description of this application, but are not intended to indicate or imply that an apparatus or an element needs to have a specific orientation and be constructed and operated in a specific orientation, and therefore cannot be understood as a limitation on this application. In addition, terms “first” and “second” are merely used for a purpose of description, and shall not be understood as an indication or implication of relative importance.

In the descriptions of this application, it should be noted that, unless otherwise expressly specified and limited, terms “mount”, “interconnect”, and “connect” should be understood in a broad sense. For example, the terms may indicate a fixed connection, a detachable connection, or an integral connection, may indicate a mechanical connection or an electrical connection, or may indicate a direct interconnection, an indirect interconnection through an intermediate medium, or internal communication between two elements. For a person of ordinary skill in the art, a specific meaning of the foregoing terms in this application may be understood based on a specific situation.

In the descriptions of this application, it should be understood that, in this application, an “electrical connection” may be understood as physical contact and electrical conduction of components, or may be understood as a form in which different components in a line structure are connected through physical lines that can transmit an electrical signal, such as a printed circuit board (printed circuit board, PCB) copper foil or a conducting wire. “Coupling” may be understood as mid-air electrical conduction through indirect coupling. The coupling in this application may be understood as capacitive coupling. For example, signal transmission is implemented by forming an equivalent capacitor through coupling in a slot between two spaced conductive members.

Antenna pattern: The antenna pattern is also referred to as a radiation pattern. The antenna pattern refers to a pattern in which relative field strength (a normalized modulus value) of an antenna radiation field changes with a direction at a specific distance from the antenna. The antenna pattern is generally indicated by two plane patterns that are perpendicular to each other in a maximum radiation direction of an antenna.

Ground/Ground plane: The ground/ground plane may generally refer to at least a part of any ground layer, or ground plate, or ground metal layer in an electronic device (like a mobile phone), or at least a part of any combination of any ground layer, or ground plate, or ground part. The “ground/ground plane” may be used to ground a component in the electronic device. In an embodiment, the “ground/ground plane” may be a ground layer of a circuit board of an electronic device, or may be a ground metal layer formed by a ground plate formed by using a middle frame of the electronic device or a metal thin film below a screen in the electronic device. In an embodiment, the circuit board may be a printed circuit board (printed circuit board, PCB), for example, an 8-layer, 10-layer, or 12-layer to 14-layer board having 8, 10, 12, 13, or 14 layers of conductive materials, or an element that is separated by a dielectric layer or an insulation layer like glass fiber or polymer and that is electrically insulated. In an embodiment, the circuit board includes a dielectric substrate, a ground layer, and a wiring layer. The wiring layer and the ground layer are electrically connected through a via. In an embodiment, parts such as a display, a touchscreen, an input button, a transmitter, a processor, a memory, a battery, a charging circuit, and a system on chip (system on chip, SoC) structure may be installed on or connected to the circuit board, or electrically connected to the wiring layer and/or the ground layer in the circuit board. For example, a radio frequency source is disposed at the wiring layer.

Any of the foregoing ground layer, or ground plate, or ground metal layer is made of a conductive material. In an embodiment, the conductive material may be any one of the following materials: copper, aluminum, stainless steel, brass and alloys thereof, copper foils on insulation laminates, aluminum foils on insulation laminates, gold foils on insulation laminates, silver-plated copper, silver-plated copper foils on insulation laminates, silver foils on insulation laminates and tin-plated copper, cloth impregnated with graphite powder, graphite-coated laminates, copper-plated laminates, brass-plated laminates, and aluminum-plated laminates. A person skilled in the art may understand that the ground layer/ground plate/ground metal layer may alternatively be made of another conductive material.

Electrical length: The electrical length may be a physical length, or may be indicated by a product of a physical length (namely, a mechanical length or a geometric length) and a ratio of transmission time of an electrical or electromagnetic signal in a medium to time required when the signal passes through a distance the same as the physical length of the medium in free space, and the electrical length may satisfy the following formula:

$$\bar{L} = L \times \frac{a}{b},$$

where

L is the physical length, a is the transmission time of the electrical or electromagnetic signal in the medium, and b is the transmission time in free space.

Alternatively, the electrical length may be a ratio of a physical length (namely, a mechanical length or a geometric length) to a wavelength of a transmitted electromagnetic wave. The electrical length may satisfy the following formula:

$$\bar{L} = \frac{L}{\lambda},$$

where

L is the physical length, and λ is the wavelength of the electromagnetic wave.

To make the objectives, technical solutions, and advantages of this application clearer, the following further describes the implementations of this application in detail with reference to the accompanying drawings.

Figure 1B:
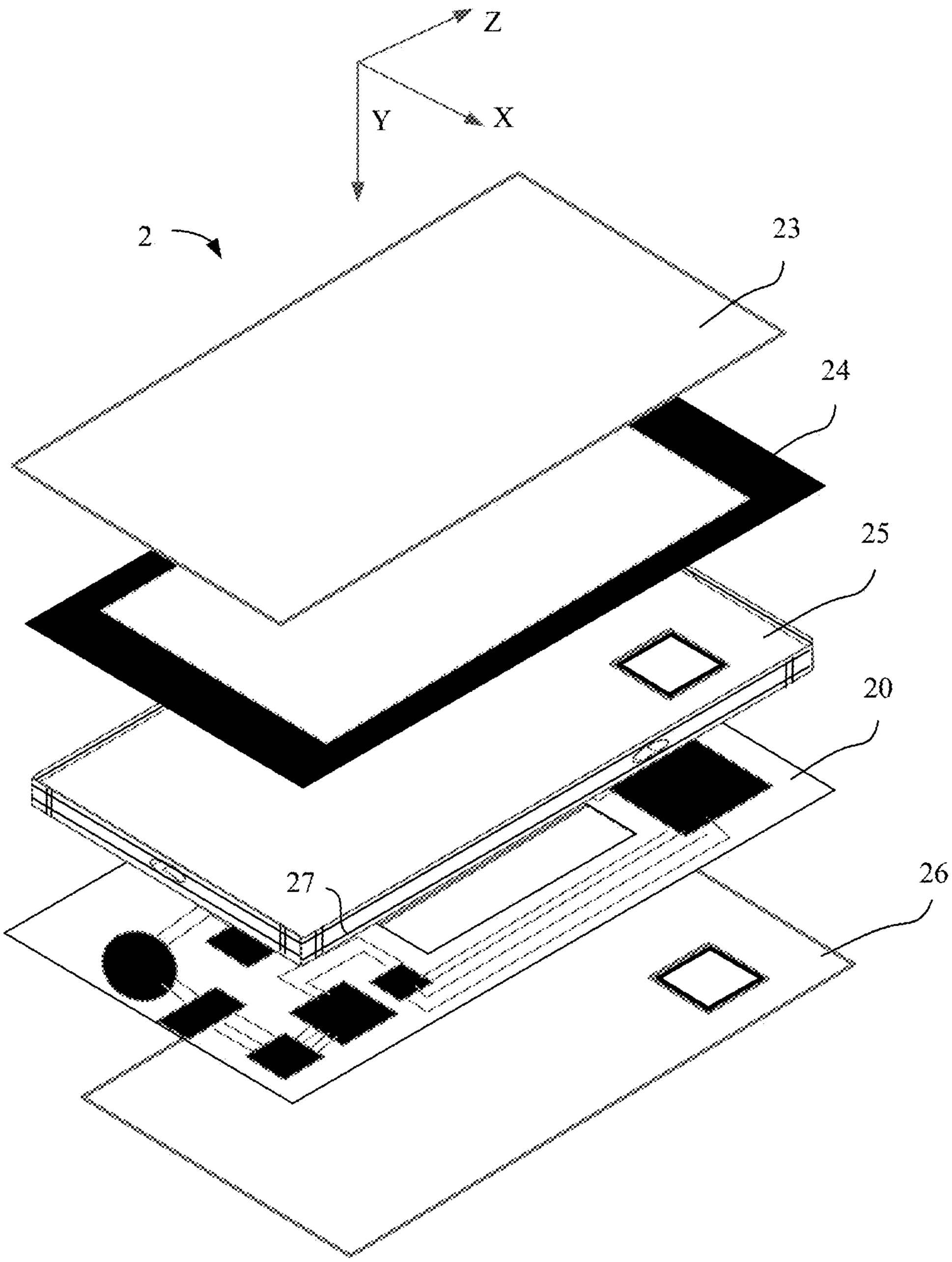
FIG. 1*b* shows an example of an electronic device according to an embodiment of this application.

The technical solutions provided in this application are applicable to an electronic device that uses one or more of the following communication technologies: a Bluetooth (Bluetooth, BT) communication technology, a global positioning system (global positioning system, GPS) communication technology, a wireless fidelity (wireless fidelity, Wi-Fi) communication technology, a global system for mobile communications (global system for mobile communications, GSM) communication technology, a wideband code division multiple access (wideband code division multiple access, WCDMA) communication technology, a long term evolution (long term evolution, LTE) communication technology, a 5G communication technology, a SUB-6G communication technology, and other future communication technologies. The electronic device in embodiments of this application may be a mobile phone, a tablet computer, a notebook computer, a smart household, a smart band, a smart watch, a smart helmet, smart glasses, or the like. Alternatively, the electronic device may be a handheld device that has a wireless communication function, a computing device, another processing device connected to a wireless modem, a vehicle-mounted device, an electronic device in a 5G network, an electronic device in a future evolved public land mobile network (public land mobile network, PLMN), or the like. This is not limited in embodiments of this application. FIG. 1*b* shows an example of an electronic device provided in an embodiment of this application. An example in which the electronic device is a mobile phone is used for description.

As shown in FIG. 1*b*, an electronic device 2 may include a cover (cover) 23, a display/module (display) 24, a printed circuit board (printed circuit board, PCB board) 20, a middle frame (middle frame) 25, and a rear cover (rear cover) 26. It should be understood that, in some embodiments, the cover 23 may be a cover glass (cover glass), or may be replaced with a cover of another material, for example, a cover of an ultra-thin glass material or a cover of a PET (Polyethylene terephthalate, polyethylene terephthalate) material.

The cover 23 may be tightly attached to the display module 24, and may be mainly used to protect the display module 24 for dust resistance.

In an embodiment, the display module 24 may include a liquid crystal display (liquid crystal display, LCD) panel, a light-emitting diode (light-emitting diode, LED) display panel, an organic light-emitting diode (organic light-emitting diode, OLED) display panel, or the like. This is not limited in this application.

The middle frame 25 is mainly used to support the electronic device. FIG. 1*b* shows that the PCB board 20 is disposed between the middle frame 25 and the rear cover 26. It should be understood that, in an embodiment, the PCB board 20 may alternatively be disposed between the middle frame 25 and the display module 24. This is not limited in this application. The printed circuit board PCB board 20 may be a flame-resistant material (FR-4) dielectric board, or may be a Rogers (Rogers) dielectric board, or may be a hybrid dielectric board of Rogers and FR-4, or the like. Herein, FR-4 is a grade designation for a flame-resistant material, and the Rogers dielectric board is a high-frequency board. An electronic element, for example, a radio frequency chip, is carried on the PCB board 20. In an embodiment, a metal layer may be disposed on the printed circuit board PCB board 20. The metal layer may be used to ground an electronic element carried on the printed circuit board PCB board 20, or may be used to ground another element, for example, a support antenna or a side frame antenna. The metal layer may be referred to as a ground plane, a ground plate, or a ground layer. In an embodiment, the metal layer may be formed by etching metal on a surface of any dielectric board in the PCB board 20. In an embodiment, the metal layer used for grounding may be disposed on a side that is of the printed circuit board PCB board 20 and that is close to the middle frame 25. In an embodiment, an edge of the printed circuit board PCB board 20 may be considered as an edge of a ground layer of the printed circuit board PCB board 20. In an embodiment, the metal middle frame 25 may also be configured to ground the foregoing element. The electronic device 2 may further have another ground plane/ground plate/ground layer, as described above. Details are not described herein again.

The electronic device 2 may further include a battery (not shown in the figure). The battery may be disposed between the middle frame 25 and the rear cover 26, or may be disposed between the middle frame 25 and the display module 24. This is not limited in this application. In some embodiments, the PCB board 20 is divided into a mainboard and a sub-board. The battery may be disposed between the mainboard and the sub-board. The mainboard may be disposed between the middle frame 25 and an upper edge of the battery, and the sub-board may be disposed between the middle frame 25 and a lower edge of the battery.

Further, the middle frame 25 of the electronic device may include a side frame 27, and the side frame 27 may be made of a conductive material like metal. The side frame 27 may be disposed between the display module 24 and the rear cover 26, and extend around a periphery of the electronic device 2. The side frame 27 may have four sides surrounding the display module 24, to help fasten the display module 24. In an implementation, the side frame 27 made of a metal material may be directly used as a metal side frame of the electronic device 2 to form an appearance of the metal side frame, and is applicable to a metal industrial design (industrial design, ID). In another implementation, an outer surface of the side frame 27 may alternatively be made of a non-metal material, for example, is a plastic side frame, to form an appearance of a non-metal side frame, and is applicable to a non-metal ID.

The middle frame 25 may include the side frame 27, and the middle frame 25 including the side frame 27 is used as an integrated component, and may support an electronic component in the electronic device. The cover 23 and the rear cover 26 are respectively covered along an upper edge and a lower edge of the side frame 27, to form a casing or a housing (housing) of the electronic device. In an embodiment, the cover 23, the rear cover 26, the side frame 27, and/or the middle frame 25 may be collectively referred to as a casing or a housing of the electronic device 2. It should be understood that the "casing or housing" may mean a part or all of any one of the cover 23, the rear cover 26, the side frame 27, or the middle frame 25, or mean a part or all of any combination of the cover 23, the rear cover 26, the side frame 27, or the middle frame 25.

Alternatively, the side frame 27 may not be considered as a part of the middle frame 25. In an embodiment, the side frame 27 and the middle frame 25 may be connected and integrally formed. In another embodiment, the side frame 27 may include a protruding part extending inwards, to be connected to the middle frame 25 by using a spring or a screw, through welding, or the like. The protruding part of the side frame 27 may be further configured to receive a feed signal, so that at least a part of the side frame 27 is used as a radiator of an antenna to receive/transmit a radio frequency signal. A slot may exist between the middle frame 25 and the part of the side frame that serves as the radiator, to ensure that the radiator of the antenna has a good radiation environment, and the antenna has a good signal transmission function.

The rear cover 26 may be a rear cover made of a metal material, or may be a rear cover made of a non-conductive material, for example, a glass rear cover, a plastic rear cover, or another non-metallic rear cover.

The antenna of the electronic device 2 may be further disposed in the side frame 27. When the side frame 27 of the electronic device 2 is made of a non-conductive material, the radiator of the antenna may be located in the electronic device 2 and is disposed along the side frame 27. For example, the radiator of the antenna is disposed close to the side frame 27, to reduce a volume occupied by the radiator of the antenna as much as possible, and be closer to the outside of the electronic device 2, so as to implement better signal transmission effect. It should be noted that, that the radiator of the antenna is tightly attached to the side frame 27 means that the radiator of the antenna may be tightly attached to the side frame 27, or may be disposed close to the side frame 27. For example, there may be a specific small slot between the radiator of the antenna and the side frame 27.

The antenna of the electronic device 2, for example, a support antenna or a millimeter-wave module, may be further disposed in the casing. Clearance of the antenna disposed in the housing may be obtained by using a slit/opening on any one of the middle frame, and/or the side frame, and/or the rear cover, and/or the display, or may be obtained by using a non-conductive slot/aperture formed between any several of the middle frame, and/or the side frame, and/or the rear cover, and/or the display. The clearance of the antenna may ensure radiation performance of the antenna. It should be understood that the clearance of the antenna may be a non-conductive region formed by any conductive component in the electronic device 2, and the antenna radiates a signal to external space through the non-conductive region. In an embodiment, a form of the antenna may be an antenna form based on a flexible mainboard (Flexible Printed Circuit, FPC), an antenna form based on laser-direct-structuring (Laser-Direct-structuring, LDS), or an antenna form like a microstrip disk antenna (Microstrip Disk Antenna, MDA). In an embodiment, the antenna may alternatively use a transparent structure embedded into a screen of the electronic device, so that the antenna is a transparent antenna unit embedded into the screen of the electronic device.

FIG. 1*b* shows only an example of some parts included in the electronic device 2. Actual shapes, actual sizes, and actual structures of these parts are not limited to those in FIG. 1*b*.

It should be understood that, in this application, it may be considered that a surface on which the display of the electronic device is located is a front surface, a surface on which the rear cover is located is a rear surface, and a surface on which the side frame is located is a side surface.

It should be understood that, in this application, it is considered that when a user holds the electronic device (the user usually holds the electronic device vertically and faces the screen), an orientation in which the electronic device is located has a top part, a bottom part, a left part, and a right part.

Figures 2A, 2B, 2C:
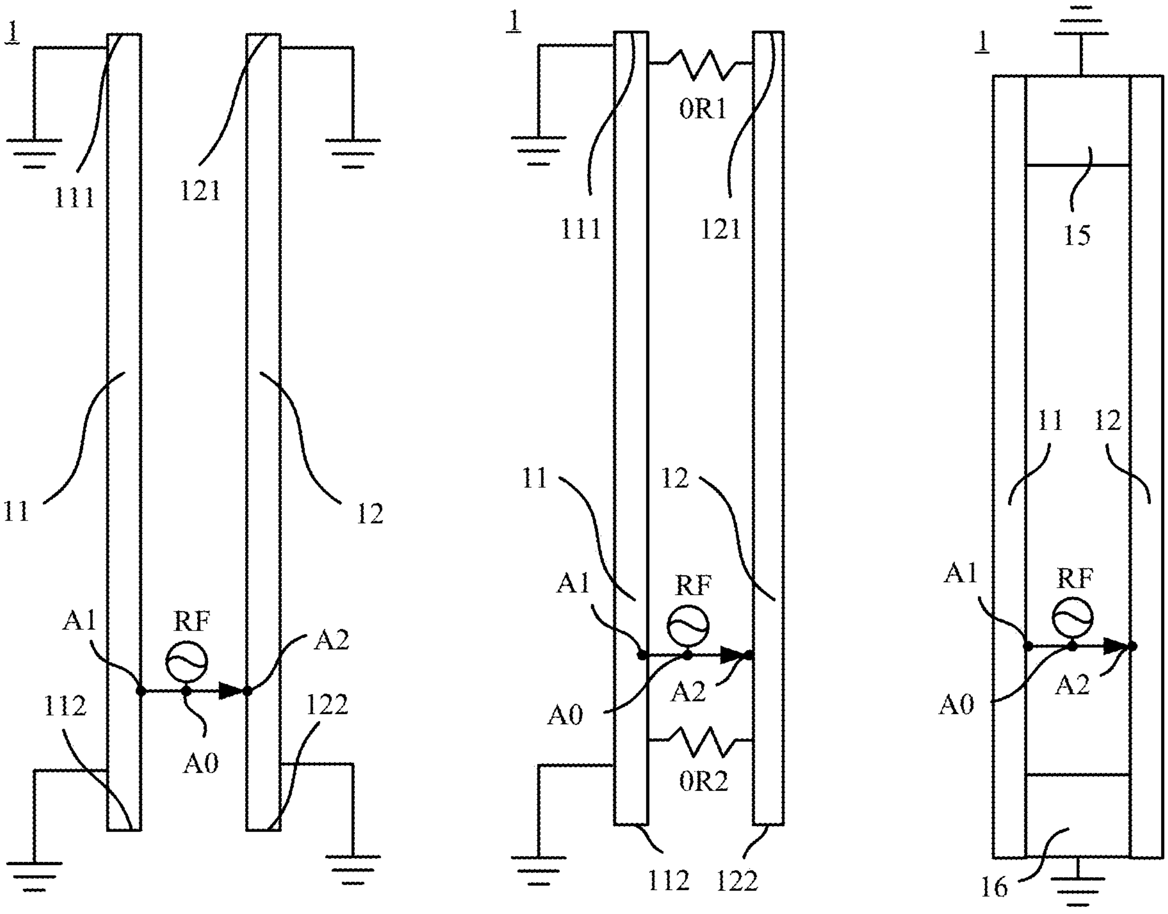
FIG. 2*a* to FIG. 2*c* are schematic diagrams of a principle structure of an antenna according to an embodiment of this application, where a separately-grounded structure is used in FIG. 2*a*, and a co-grounded structure is used in FIG. 2*b* and FIG. 2*c;*

FIG. 2*a* to FIG. 2*c* are schematic diagrams of a principle structure of an antenna according to an embodiment of this application. In an embodiment, in FIG. 2*a*, a first radiator 11 and a second radiator 12 are separately grounded, that is, a separately-grounded structure is used. In an embodiment, a co-grounded structure is used in FIG. 2*b* and FIG. 2*c*. It should be understood that, in this embodiment of this application, at least two radiators of an antenna 1 may alternatively be grounded by using both a separately-grounded structure and a co-grounded structure.

As shown in FIG. 2*a* to FIG. 2*c*, the antenna 1 provided in this application includes at least two radiators, the at least two radiators include the first radiator 11 and the second radiator 12 that are spaced apart in parallel, and a first end 111 of the first radiator 11 is disposed closer to a first end 121 of the second radiator 12 than a second end 112 of the first radiator 11. In an embodiment, the first end 111 of the first radiator 11 and the first end 121 of the second radiator 12 are disposed opposite to each other. In an embodiment, the first end 111 of the first radiator 11 may be disposed in alignment with the first end 121 of the second radiator 12. In an embodiment, an end face of the first end 111 of the first radiator 11 may be disposed in alignment with an end face of the first end 121 of the second radiator 12.

It should be noted that an end, the first end, or the second end is not limited to an end face of the radiator, and may alternatively be a radiator segment including the end face, for example, a radiator segment within 1 mm to 3 mm (for example, 2 mm) away from the end face. That the first end 111 of the first radiator 11 is disposed in alignment with the first end 121 of the second radiator 12 may be understood as that a radiator segment that is of the first radiator 11 and that is within 1 mm to 3 mm (for example, 2 mm) away from the end face of the first end 111 of the first radiator 11 and a radiator segment that is of the second radiator 12 and that is within 1 mm to 3 mm (for example, 2 mm) away from the end face of the first end 121 of the second radiator 12 at least partially overlap in a vertical direction of an extension direction of the first radiator 11 or the second radiator 12. That an end face of the first end 111 of the first radiator 11 is disposed in alignment with an end face of the first end 121 of the second radiator 12 may be understood as that the end face of the first end 111 of the first radiator 11 and the end face of the first end 121 of the second radiator 12 are aligned in a vertical direction of an extension direction of the first radiator 11 or the second radiator 12.

The first radiator 11 and the second radiator 12 are connected to a same radio frequency source RF, and separately receive feed signals. In an embodiment, a first feed connection point A1 of the first radiator 11 is connected to a feed point A0, and a second feed connection point A2 of the second radiator 12 is connected to the feed point A0. The first end 111 of the first radiator 11 and the first end 121 of the second radiator 12 are separately grounded (as shown in FIG. 2*a*), or are grounded by using a co-grounded structure (as shown in FIG. 2*b* and FIG. 2*c*). Alternatively, the second end 112 of the first radiator 11 and a second end 122 of the second radiator 12 may be separately grounded, or may be grounded by using a co-grounded structure. In another implementation, alternatively, only one end of the first radiator 11 and only one end of the second radiator 12 may be grounded. For example, the first end 111 of the first radiator 11 and the first end 121 of the second radiator 12 are grounded. Alternatively, the second end 112 of the first radiator 11 and the second end 122 of the second radiator 12 are grounded.

The co-grounded structure includes a grounding component. The grounding component may be, for example, an inductor, a jumper resistor, a capacitor, or a metal component. The grounding component is connected between the first radiator 11 and the second radiator 12. Selection of parameters of the inductor and the capacitor is not limited, and the parameters may be selected based on a purpose, a setting condition, and the like of the antenna. In this implementation, the grounding component is a jumper resistor (or referred to as a zero-ohm resistor). As shown in FIG. 2*b*, the first end 111 of the first radiator 11 is grounded, and a jumper resistor 0R1 is connected between the first end 111 of the first radiator 11 and the first end 121 of the second radiator 12, so that the first end 121 of the second radiator 12 is grounded by using the jumper resistor 0R1 and the first radiator 11. The second end 112 of the first radiator 11 is grounded, and a jumper resistor 0R2 is connected between the second end 112 of the first radiator 11 and the second end 122 of the second radiator 12, so that the second end 122 of the second radiator 12 is grounded by using the jumper resistor 0R2 and the first radiator 11.

In another implementation, refer to FIG. 2*c*. The grounding component may alternatively be a metal component 15 connected between the first end 111 of the first radiator 11 and the first end 121 of the second radiator 12, and a metal component 16 connected between the second end 112 of the first radiator 11 and the second end 122 of the second radiator 12. The metal component 15 and the metal component 16 are separately grounded, and therefore, two ends of the first radiator and two ends of the second radiator 12 are grounded by using the metal component 15 and the metal component 16.

Further, the second end 112 of the first radiator 11 may alternatively be disposed in alignment with the second end 122 of the second radiator 12. In an embodiment, an end face of the second end 112 of the first radiator 11 is disposed in alignment with an end face of the second end 122 of the second radiator 12.

It can be learned that, in this embodiment of this application, the first radiator and the second radiator are spaced apart in parallel to separately receive feed signals, so that a plurality of resonance modes of the antenna in a same operating frequency band can be excited to form wide frequency band bandwidth. Compared with a manner of disposing radiators in serial in an antenna, a manner of disposing radiators in parallel further greatly reduces a size in a length direction of the antenna, and implements miniaturization of the antenna. Further, in this application, when a gap between the first radiator and the second radiator is very small, for example, a physical length of the gap is less than or equal to 3 mm, or less than or equal to 1 mm, wide frequency band bandwidth in a same operating frequency band can still be implemented, to help reduce a size in a width direction of the antenna, provide a possibility of further miniaturization of the antenna, provide a basis for implementing different layout manners of the antenna in an electronic device, and help enrich a layout design solution of a plurality of antennas in the electronic device.

Further, a phase difference between a feed signal received by the first feed connection point A1 and a feed signal received by the second feed connection point A2 ranges from 180°−45° to 180°+45°, for example, 180°±30°, 180°±20°, or 180°±10°. In this implementation, the phase difference is 180°. Certainly, a deviation of a specific amplitude is also allowed, for example, 0.5°, 1°, or 5°. It should be noted that a feed structure of the antenna is not limited, and a feed structure in which a phase difference of feed signals between two radiators ranges from 180°−45° to 180°+45° does not depart from the scope of this embodiment of this application.

In an implementation, as shown in FIG. 2*a* to FIG. 2*c*, a differential feed structure may be used for feeding. In an embodiment, the differential feed structure is as follows: The antenna 1 is fed by using a feed network in the electronic device, and the first radiator 11 and the second radiator 12 are separately connected to a radio frequency source RF by using the feed network. The first radiator 11 is connected to a first output end of the feed network, and the second radiator 12 is connected to a second output end of the feed network, so that a phase difference between a feed signal received by the first feed connection point A1 and a feed signal received by the second feed connection point A2 ranges from 180°−45° to 180°+45°. The first output end and the second output end of the feed network may be, for example, two output pins of a balun chip.

Figure 3:
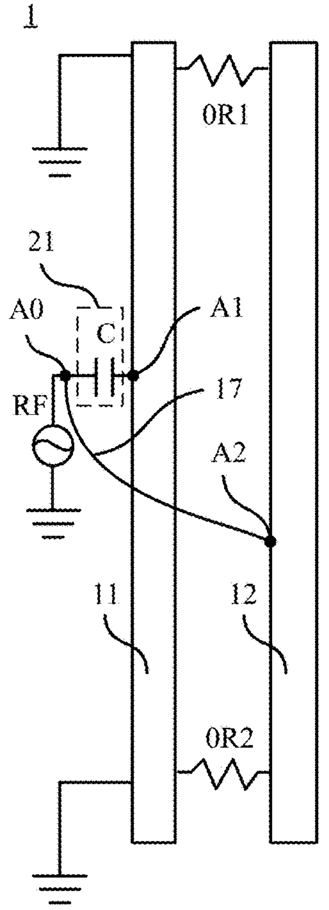
FIG. 3 is a schematic diagram of a principle structure of an antenna according to an embodiment of this application, where a first radiator and a second radiator are connected to a radio frequency source by using a distributed feed structure.

In another implementation, a distributed feed structure may alternatively be used for feeding. Specifically, FIG. 3 is a schematic diagram of a principle structure of an antenna according to an embodiment of this application. In an embodiment, the first radiator 11 and the second radiator 12 are connected to the radio frequency source RF by using a distributed feed structure. Specifically, the distributed feed structure includes a signal transmission line 17, the first radiator 11 has the first feed connection point A1, the second radiator 12 has the second feed connection point A2, a first end of the signal transmission line 17 is connected to the first feed connection point A1, a second end of the signal transmission line 17 is connected to the second feed connection point A2, and the signal transmission line 17 is electrically connected to the radio frequency source RF by using the feed point A0. A line length between the first end of the signal transmission line and the feed point and a line length between the second end of the signal transmission line and the feed point are set, so that a phase difference between a feed signal received by the first feed connection point A1 and a feed signal received by the second feed connection point A2 ranges from 180°−45° to 180°+45°. Further, the distributed feed structure further includes a matching component used for radiator impedance matching, for example, a first matching component 21. The first matching component 21 is connected between the first end of the signal transmission line 17 and the first feed connection point A1, and the first matching component 21 may be a capacitor, or may be an inductor or a jumper resistor. In this implementation, the first matching component 21 is a capacitor C. Specifically, the phase difference may be implemented by selecting signal transmission lines of different lengths and different types, or the phase difference may be implemented by combining matching components of different parameters, such as the first matching component 21.

In an embodiment, the feed point A0 may be connected to the first end of the signal transmission line 17, or may be connected to the second end of the signal transmission line 17, or may be connected between the two ends of the signal transmission line 17. In this implementation, the feed point A0 is connected to the first end of the signal transmission line 17. In this case, the radio frequency source RF provides feeding for the first radiator 11 by using the first end of the signal transmission line 17, and provides feeding for the second radiator 12 by using the second end of the signal transmission line 17. In an embodiment, at one end of the signal transmission line 17, the radio frequency source RF provides, by using the capacitor C, feeding for one of the first radiator 11 and the second radiator 12, and provides, at the other end of the signal transmission line 17, feeding for the other of the first radiator 11 and the second radiator 12. In an embodiment, the feed point A0 is connected between the two ends of the signal transmission line 17. The radio frequency source RF provides feeding for one of the first radiator 11 and the second radiator 12 by using the capacitor C and a part of the signal transmission line, and provides feeding for the other of the first radiator 11 and the second radiator 12 by using another part of the signal transmission line.

A type of the signal transmission line is not limited. For example, the signal transmission line may be a microstrip, may be a coaxial line, or may be another conductive wire disposed in an electronic device, for example, a metal wire on a support, or may be a conductive wire disposed on a rear cover of an electronic device. In addition, a length of the signal transmission line is not limited, and the length does not depart from the implementation scope of this application, provided that the phase difference between the feed signal received by the first feed connection point and the feed signal received by the second feed connection point ranges from 180°−45° to 180°+45°. In an embodiment, a line length of the signal transmission line from the feed point A0 to the first feed connection point A1 is greater than a line length of the signal transmission line from the feed point A0 to the second feed connection point A2, and vice versa, to implement a phase difference required by the feed signal received by the first feed connection point A1 and the feed signal received by the second feed connection point A2.

Figure 4:
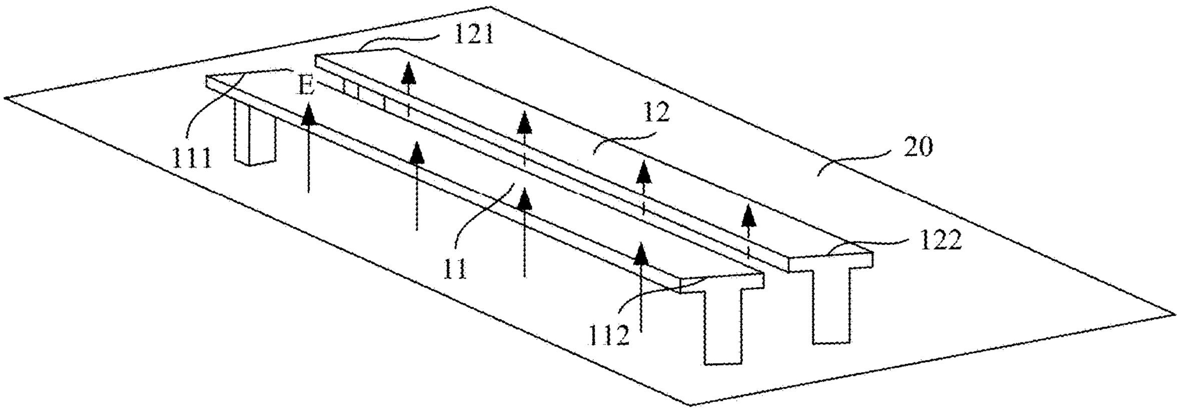
FIG. 4 is a schematic diagram of a three-dimensional structure of an antenna according to an embodiment of this application, where two ends of a first radiator are separately grounded, and two ends of a second radiator are separately grounded.

Further, FIG. 4 is a schematic diagram of a three-dimensional structure of an antenna according to an embodiment of this application. In an implementation, the ground is formed by using the PCB board 20 in the electronic device, the first end 111 and the second end 112 of the first radiator 11 are grounded, and the first end 121 and the second end 122 of the second radiator 12 are grounded. In an embodiment, that two ends of the first radiator 11 are grounded may be considered as that the two ends of the first radiator 11 and the ground are enclosed to form a closed slot. In this case, an operating mode of the first radiator 11 is a closed slot mode. That two ends of the second radiator 12 are grounded may be considered as that the two ends of the second radiator 12 and the ground are enclosed to form another closed slot. In this case, an operating mode of the second radiator 12 is a closed slot mode. In addition, an arrow in FIG. 4 indicates a direction of electric fields generated on two radiators when the antenna is excited. It can be learned that when the antenna is excited, an electric field generated on the first radiator 11 and an electric field generated on the second radiator 12 are both in a direction from the ground to the radiator, namely, a co-directional mode.

Further, when the antenna is excited, a resonance frequency of the first radiator 11 and a resonance frequency of the second radiator 12 are within a same operating frequency band of the antenna. It should be noted that the operating frequency band of the antenna includes communication frequency bands of GSM850/900 MHZ, DCS, PCS, LTE B5/B8/B3/B1/B7, Sub 6G N77/N79, GPS, Wi-Fi, Bluetooth, and the like, for example, a 2.32 GHZ-2.37 GHz frequency band and a 2.57 GHZ-2.62 GHz frequency band, or may be a 2.01 GHZ-2.05 GHz frequency band and a 1.88 GHZ-1.92 GHz frequency band.

It can be learned that, by using the antenna in this embodiment, the phase difference between the feed signals received by the two radiators ranges from 180°−45° to 180°+45°, so that two co-directional electric fields (for example, the electric fields are both in a direction from the ground to the radiator) can be excited on the first radiator and the second radiator, to generate superposition of the electric fields. Compared with a conventional single-radiator antenna, the antenna in this embodiment can excite a plurality of resonance modes in a same operating frequency band without increasing a size in a length direction of the antenna, so that efficiency bandwidth is significantly improved. Alternatively, under a condition of same efficiency bandwidth, compared with a conventional single-radiator antenna or an antenna of a serial structure (as shown in FIG. 1*a*), the antenna in this embodiment of this application is greatly reduced in size in a length direction. Therefore, this can help implement miniaturization of an antenna size, and facilitate a layout design of a plurality of antennas in an electronic device. Further, the first radiator and the second radiator are disposed in parallel and are disposed in a manner in which at least one end of the first radiator is disposed in alignment with at least one end of the second radiator, so that space occupied by the radiators in a length direction of the antenna can be further reduced. This helps further implement miniaturization of an antenna size, and further lays a foundation for enriching layouts of antennas in electronic devices with different IDs (industrial designs, industrial designs).

The first radiator or the second radiator in this embodiment of this application may be of a closed slot structure, or may be of an open slot structure, or may be a combination of a closed slot structure and an open slot structure. A radiator that is grounded at only one end and that is open at the other end may be considered as an open slot structure. The radiator of the open slot structure may operate in a ¼ wavelength mode. A radiator that is grounded at two ends may be considered as a closed slot structure. The radiator of the closed slot structure may operate in a ½ wavelength mode. The "one end that is open" mentioned in this application may also be referred to as an open end. The open end is an ungrounded end of the radiator, and may mean that there is no ground point on a radiator segment within a specific length from an end face of the end. For example, there is no ground point on a radiator segment within a quarter of a total length of the radiator from the end face. It should be understood that an operating wavelength of a radiator matches a resonance frequency of a corresponding radiator. A manner of forming the radiator in the electronic device is not limited. For example, the radiator may be formed by using a metal side frame of the electronic device, or may be formed by using a conductive member disposed in the electronic device, or may be formed by using a PCB or an FPC (Flexible Printed Circuit, flexible printed circuit) disposed in the electronic device, or may be formed by a combination of these forms. The conductive member in the electronic device may be formed by using a conductive patch or a conductive wire on an antenna support. The conductive member may be formed by using a conductive member disposed inside an insulation part of the housing of the electronic device, for example, a conductive member formed by coating the inside of the insulation rear housing with graphene, silver paste, or the like, or a conductive member at a notch of the insulation front housing. The conductive member may alternatively be formed by using a conformal metal mechanical part in the electronic device, or may be formed by being embedded into the insulation part in the electronic device or into a surface of the insulation part in the electronic device, or may be formed by a combination of the foregoing forms.

Figure 5A:
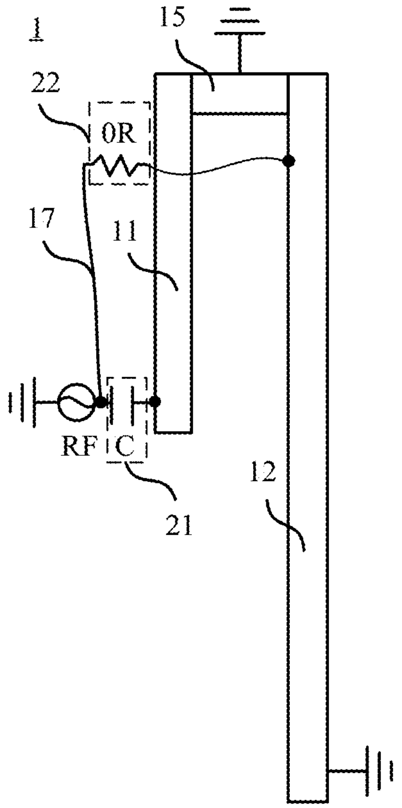
FIG. 5*a* to FIG. 6*b* are schematic diagrams of a principle structure of an antenna according to an embodiment of this application.

Further, refer to FIG. 5*a* to FIG. 6*b*. FIG. 5*a*, FIG. 5*b*, FIG. 6*a*, and FIG. 6*b* are all schematic diagrams of a principle structure of an antenna according to an embodiment of this application. As shown in FIG. 5*a*, the distributed feed structure further includes a second matching component 22 used for radiator impedance matching, and the second matching component 22 is connected between the second end of the signal transmission line 17 and the second feed connection point A2. In an implementation, the first matching component 21 is a capacitor C, and the second matching component is an inductor L.

It should be noted that the matching component may be a capacitor, an inductor, or a jumper resistor (namely, a zero-ohm resistor). Specifically, when a feed connection point of a radiator is away from a ground point of the radiator, the feed connection point may be understood as an electric field strong point on the radiator. Therefore, the matching component may be a capacitor. When a feed connection point of a radiator is close to a ground point of the radiator, the feed connection point may be understood as an electric field strong point that is not on the radiator. Therefore, the matching component may be an inductor or a jumper resistor.

In addition, a manner of disposing the matching component is not limited. The matching component may be welded on a PCB board of an electronic device and electrically connected between a signal transmission line and a corresponding feed connection point by using a spring contact. If a radiator is formed by using an FPC board disposed in the electronic device, the matching component may alternatively be directly welded on the FPC board and electrically connected between a signal transmission line and a corresponding feed connection point.

As shown in FIG. 5*a*, the antenna 1 includes the first radiator 11 and the second radiator 12. One end of the first radiator 11 is grounded, and the other end of the first radiator 11 is open. Two ends of the second radiator 12 are grounded. The first radiator 11 and the second radiator 12 each may be formed by using a conductive member and/or a metal side frame disposed in an electronic device. In this implementation, the grounding component is the metal component 15. Specifically, the metal component 15 may be an embedded metal mechanical part of the electronic device, or may be a metal side frame of the electronic device. The first matching component 21 is a capacitor C, where a capacitance value of the capacitor C is 0.5 pF, and the second matching component 22 is a jumper resistor. In an embodiment, an electrical length of the first radiator 11 is ¼ times an operating wavelength of the first radiator, and an electrical length of the second radiator 12 is ½ times an operating wavelength of the second radiator. In an embodiment, a physical length of the first radiator 11 is ¼ times an operating wavelength of the first radiator ±10%, and a physical length of the second radiator 12 is ½ times an operating wavelength of the second radiator ±10%. It should be understood that, in this embodiment of this application, a physical length of the radiator may be an electrical length of the radiator ±10%.

Figure 5B:
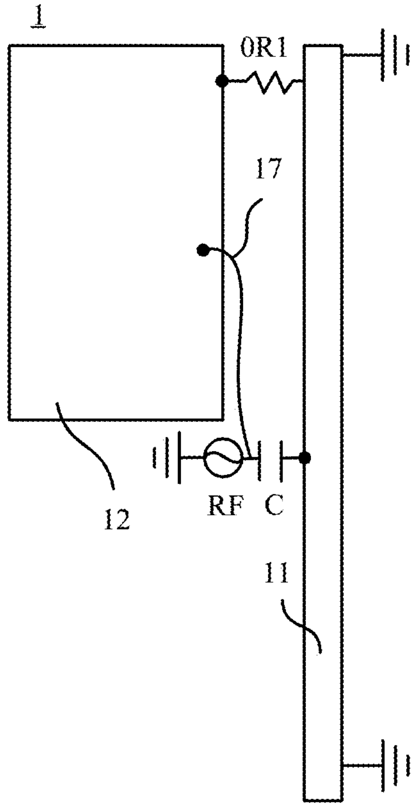

As shown in FIG. 5*b*, two ends of the first radiator 11 are grounded, and one end of the second radiator 12 is grounded and the other end of the second radiator 12 is open. The first radiator 11 of the antenna 1 may be formed by using a metal side frame of an electronic device, and the second radiator 12 may be formed by using a conductive member of the electronic device or an FPC disposed in the electronic device. In an implementation, the grounding component is a jumper resistor 0R1, the first matching component is a capacitor C, and a capacitance value of C is 0.2 pF.

Figure 6A:
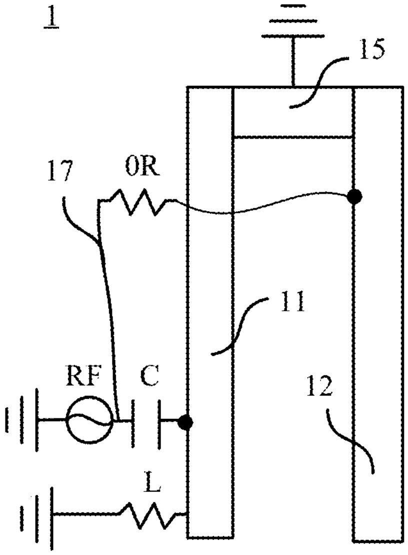

As shown in FIG. 6*a*, one end of each of the first radiator 11 and the second radiator 12 is grounded, and the other end of each of the first radiator 11 and the second radiator 12 is open. The first radiator 11 and the second radiator 12 of the antenna 1 each may be formed by using an FPC and a PCB that are disposed in an electronic device, and/or a metal side frame of the electronic device. In an embodiment, the first radiator 11 and the second radiator 12 may be formed by slotting a PCB of the electronic device. In this implementation, the grounding component is the metal component 15. Specifically, the metal component 15 may be an embedded metal mechanical part of the electronic device, for example, an FPC or a PCB, or may be a metal side frame of the electronic device. The first matching component is a capacitor C, where a capacitance value of C is 1 pF, and the second matching component is a jumper resistor (or referred to as a zero-ohm resistor). In the embodiment shown in FIG. 6*a*, an electrical length of each of the first radiator 11 and the second radiator 12 is ¼ times an operating wavelength of the radiator. In another embodiment, a physical length of each of the first radiator 11 and the second radiator 12 is ¼ times an operating wavelength of the radiator ±10%.

Figure 6B:
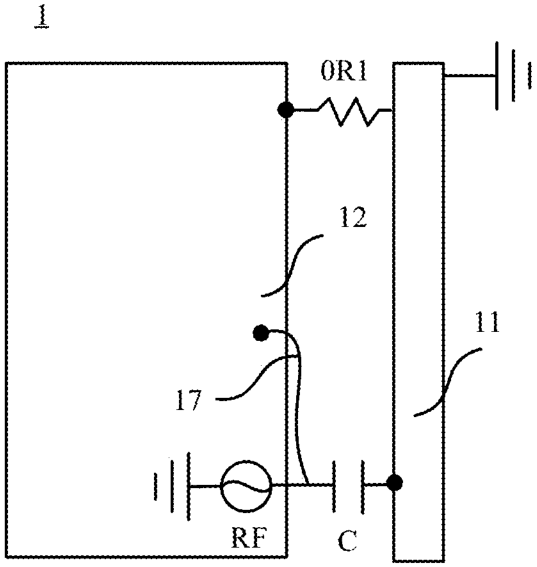

As shown in FIG. 6*b*, one end of each of the first radiator 11 and the second radiator 12 is grounded, and the other end of each of the first radiator 11 and the second radiator 12 is open. The first radiator 11 of the antenna 1 may be formed by using an FPC and a PCB that are disposed in an electronic device, and/or a metal side frame of the electronic device, and the second radiator 12 may be formed by using a conductive member disposed in the electronic device. In an implementation, the first matching component is a capacitor C, where a capacitance value of C is 1 pF, and the grounding component is a jumper resistor 0R1. In the embodiment shown in FIG. 6*a*, an electrical length of each of the first radiator 11 and the second radiator 12 is ¼ times an operating wavelength of the radiator. In another embodiment, a physical length of each of the first radiator 11 and the second radiator 12 is ¼ times an operating wavelength of the radiator ±10%.

In addition, a gap between the first radiator 11 and the second radiator 12 is not limited. To reduce a size in a width direction of the antenna, an overall size of the antenna is further miniaturized, for example, the gap may be less than or equal to 3 mm, or less than or equal to 1 mm. Specifically, the gap may be 3 mm, 2 mm, 1 mm, 0.5 mm, 0.4 mm, or the like. In addition, in this embodiment of this application, when the gap is very small, wide frequency band coverage of the antenna in a same operating frequency band can still be implemented. In another implementation, the gap between the first radiator 11 and the second radiator is less than or equal to 0.1 times an operating wavelength of the antenna, where the operating wavelength of the antenna is related to a center frequency of an operating frequency band of the antenna. In some other implementations, the gap may be 1/300 times a wavelength of the antenna, 0.5/300 times the wavelength of the antenna, or the like.

In an embodiment, as shown in FIG. 6*a*, a tuning inductor L configured to adjust a resonance frequency may be further disposed at an end that is of the first radiator 11 and that is away from the ground point. One end of the inductor L is connected to the first radiator 11, and the other end of the inductor L is grounded. In this implementation, an inductance value of the inductor L is 10 nH, and in another alternative implementation, the parameter of the inductor may alternatively be another value.

It can be learned that, in the antenna in this embodiment of this application, because the radiators of the antenna may be formed by using different parts (such as a conductive member, an FPC, a PCB or a metal side frame) in the electronic device, a position of the antenna in the electronic device is not limited. This improves a degree of freedom of a manner of arranging the antenna in the electronic device, and is conducive to a layout design of a plurality of antennas in the electronic device.

Figure 7C:
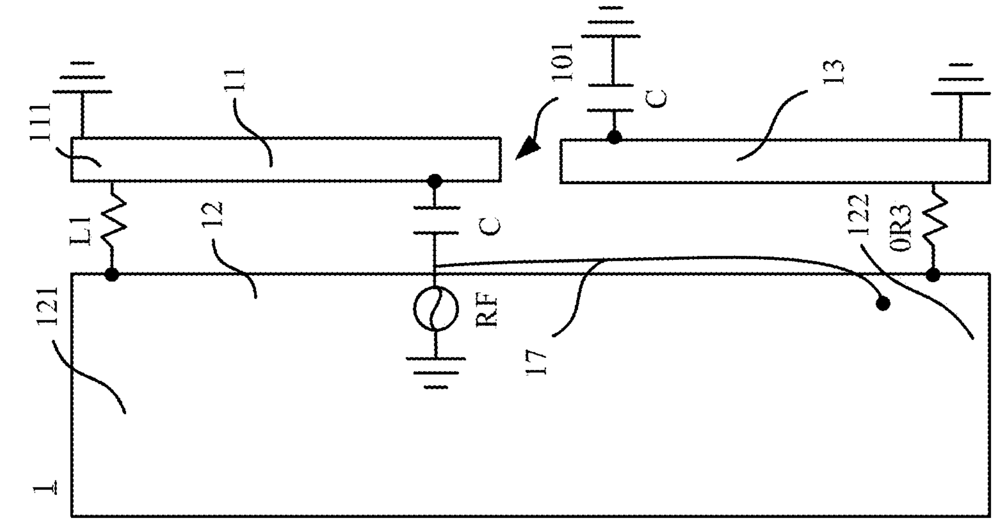
FIG. 7*a* to FIG. 7*c* are schematic diagrams of a principle structure of an antenna according to an embodiment of this application, where there are at least three radiators.
Figure 7B:
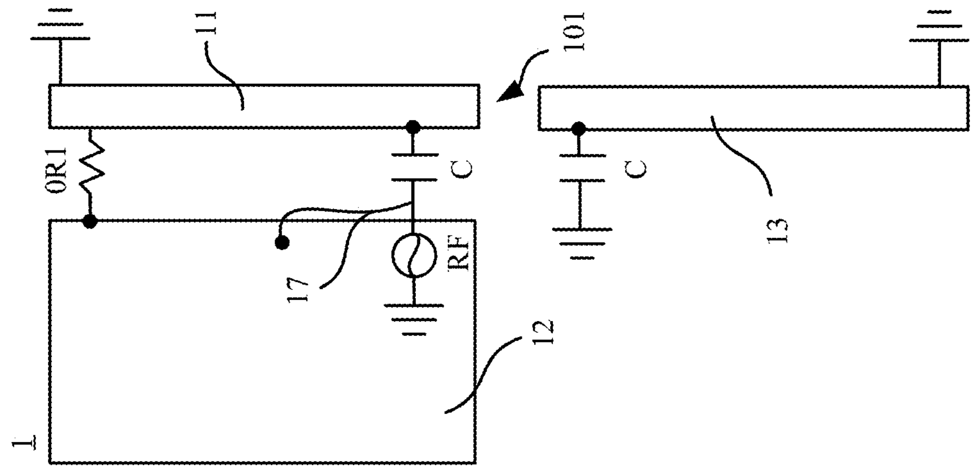
Figure 7A:
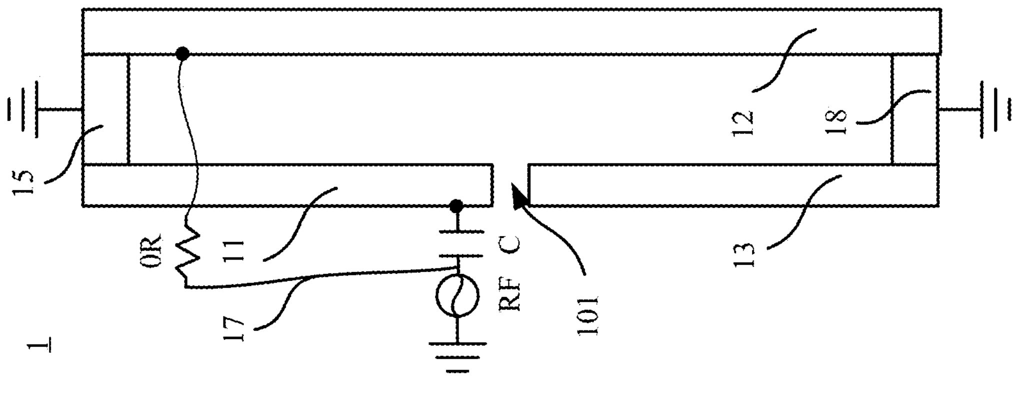

Further, FIG. 7*a* to FIG. 7*c* are all schematic diagrams of a principle structure of an antenna according to an embodiment of this application. In an embodiment, there are three radiators. The antenna structure shown in FIG. 7*a* is basically the same as the antenna structure shown in FIG. 5*a*, and a difference lies in that: The antenna further includes a third radiator 13, and the third radiator 13 and the first radiator 11 are disposed in serial, and are spaced apart end to end to form a slot 101. The third radiator 13 and the first radiator 11 can be coupled through the slot 101. One end that is of the third radiator 13 and that is away from the slot 101 is connected to the second radiator 12 by using a metal component 18, and the metal component 18 is grounded. In an embodiment, the metal component 18 may be formed by using a metal side frame of an electronic device, or may be formed by using a PFC or a PCB disposed in an electronic device. In this implementation, the first matching component is a capacitor C, where a capacitance value of C is 0.5 pF, and the second matching component is a jumper resistor (or referred to as a zero-ohm resistor).

The antenna structure shown in FIG. 7*b* is basically the same as the antenna structure shown in FIG. 6*b*, and a difference lies in that: The antenna further includes a third radiator 13, and the third radiator 13 and the first radiator 11 are disposed in serial, and are spaced apart end to end to form a slot 101. The third radiator 13 and the first radiator 11 can be coupled through the slot 101. One end that is of the third radiator 13 and that is away from the slot 101 is grounded. In an embodiment, the first matching component is a capacitor C, and a capacitance value of C is 1 pF. A tuning matching component is disposed at an end that is of the third radiator 13 and that is close to the slot 101, and is configured to adjust a resonance frequency of the third radiator 13. The tuning matching component is the capacitor C, and a capacitance value of the capacitor C is 0.6 pF.

The antenna structure shown in FIG. 7*c* is basically the same as the antenna structure shown in FIG. 7*b*. A difference lies in that: Two ends of the second radiator are grounded, and a length of the second radiator 12 is ½ times an operating wavelength of the second radiator or a physical length of the second radiator 12 is ½ times an operating wavelength of the second radiator +10%. In the embodiment shown in FIG. 7*c*, the second end 122 of the second radiator 12 is connected to an end that is of the third radiator 13 and that is away from the slot 101 by using a jumper resistor 0R3, and an end that is of the third radiator and that is close to the slot 101 is grounded by using a capacitor C (for example, a capacitance value of C is 0.3 pF). The first end 121 of the second radiator 12 is connected to the first end 111 of the first radiator 11 by using an inductor L1, for example, an inductance value of the inductor L1 is 0.5 nH. In an implementation, the first matching component is a capacitor C (for example, a capacitance value of C is 0.5 pF). In an implementation, the third radiator 13 and the second radiator 12 may alternatively be disposed in serial, are spaced apart end to end to form a slot, and are coupled through the slot.

Figure 8C:
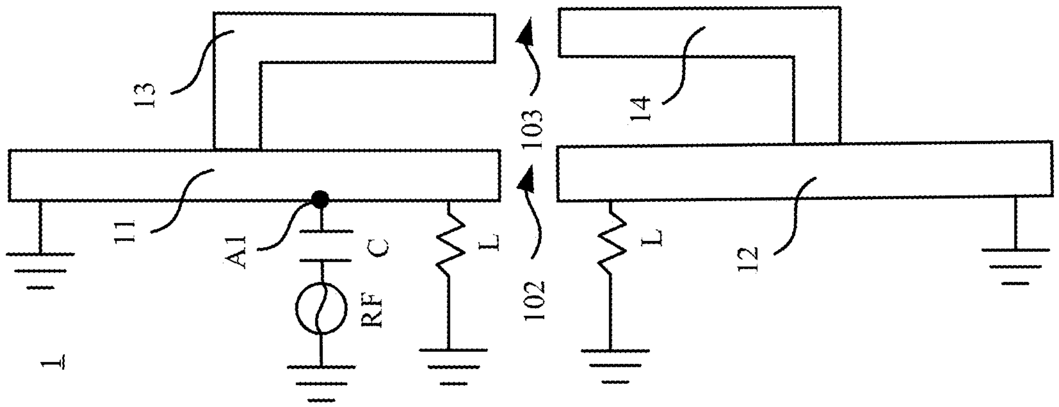
FIG. 8*a* to FIG. 8*c* are schematic diagrams of a principle structure of an antenna according to an embodiment of this application, where there are at least four radiators in FIG. 8*b* and FIG. 8*c;*
Figure 8B:
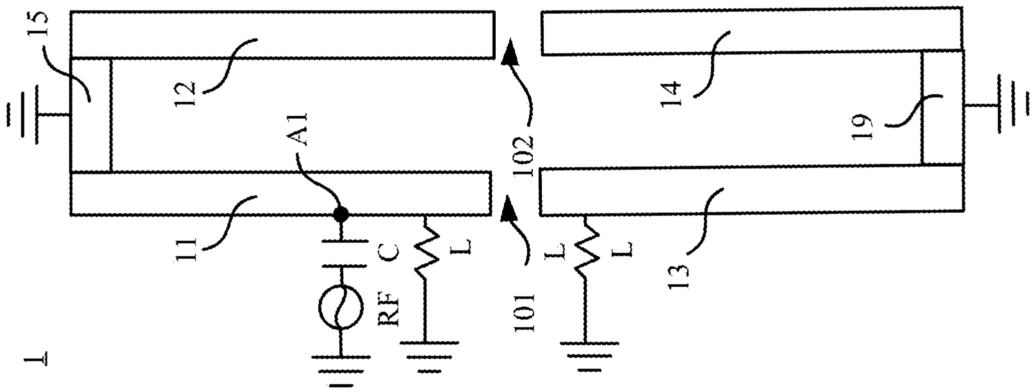
Figure 8A:
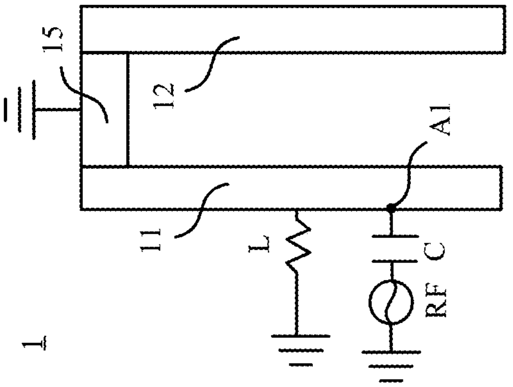

Certainly, a person skilled in the art may understand that energy may alternatively be exchanged between the first radiator 11 and the second radiator 12 in a coupling manner. FIG. 8*a* to FIG. 8*c* are schematic diagrams of a principle structure of an antenna according to an embodiment of this application. In an embodiment, there are four radiators in FIG. 8*b* and FIG. 8*c*. The antenna structure shown in FIG. 8*a* is basically the same as the antenna structure shown in FIG. 6*b*. A difference lies in that: The second radiator 12 is not connected to the radio frequency source RF, and is coupled to the first radiator 11 through a gap between the second radiator 12 and the first radiator 11 for energy exchange. In an implementation, the first matching component is a capacitor C, and a capacitance value of the capacitor C is 0.7 pF. A tuning component L is further disposed on the first radiator 11, and an inductance value of the tuning component L is 7.5 nH.

The antenna structure shown in FIG. 8*b* is basically the same as the antenna structure shown in FIG. 8*a*, and a difference lies in that: The antenna 1 further includes a third radiator 13 and a fourth radiator 14. The third radiator 13 and the first radiator 11 are disposed in serial and are spaced apart end to end to form a slot 101. The fourth radiator 14 and the second radiator 12 are disposed in serial and are spaced apart end to end to form a slot 102. An end that is of the third radiator 13 and that is away from the slot 101 is connected to an end that is of the fourth radiator 14 and that is away from the slot 102 by using a metal component 19, and the metal component 19 is grounded. The first radiator 11 and the third radiator 13 may be coupled through the slot 101 for energy exchange, and the second radiator 12 and the fourth radiator 14 may be coupled through the slot 102 for energy exchange. In an implementation, the first matching component is a capacitor C, and a capacitance value of the capacitor C is 1 pF. A tuning component L is further disposed on the first radiator 11, and an inductance value of the tuning component L is 7.5 nH. A tuning component L is also disposed on the third radiator 13, and an inductance value of the tuning component L is 10 nH.

The antenna structure shown in FIG. 8*c* is basically the same as the antenna structure shown in FIG. 8*b*, and a difference lies in that: The first radiator 11 and the second radiator 12 are disposed in serial and are spaced apart end to end to form a slot 102. Both the third radiator 13 and the fourth radiator 14 are L-shaped. The third radiator 13 and the fourth radiator 14 are disposed in serial and are spaced apart end to end to form a slot 103. An end of the third radiator 13 is connected to the first radiator 11, and an end of the fourth radiator 14 is connected to the second radiator 12. In this implementation, the first matching component is a capacitor C, and a capacitance value of the capacitor C is 1 pF. A tuning component L is further disposed on the first radiator 11, and an inductance value of the tuning component L is 7.5 nH. A tuning component L is also disposed on the second radiator 12, and an inductance value of the tuning component L is 7.5 nH.

According to the antenna provided in this embodiment, efficiency bandwidth of the antenna can be further improved by using a plurality of radiators. In addition, because at least two radiators (for example, the first radiator and the second radiator) in the plurality of radiators are spaced apart in parallel, compared with a conventional multi-radiator antenna, the antenna is smaller in size in a length direction on a premise of meeting same efficiency bandwidth, so that miniaturization of the antenna is implemented.

An embodiment of this application further provides an electronic device 2, including the antenna 1 in any one of the foregoing implementations.

Figure 9A:
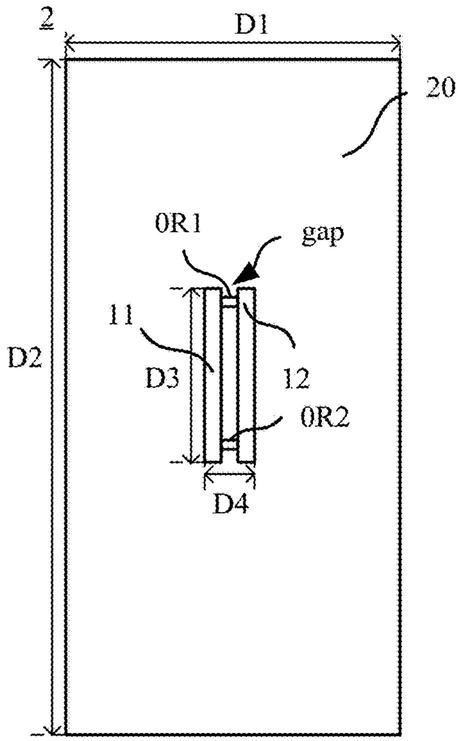
FIG. 9*a* and FIG. 9*b* are schematic diagrams of a partial three-dimensional structure of an electronic device according to an embodiment of this application.
Figure 9B:
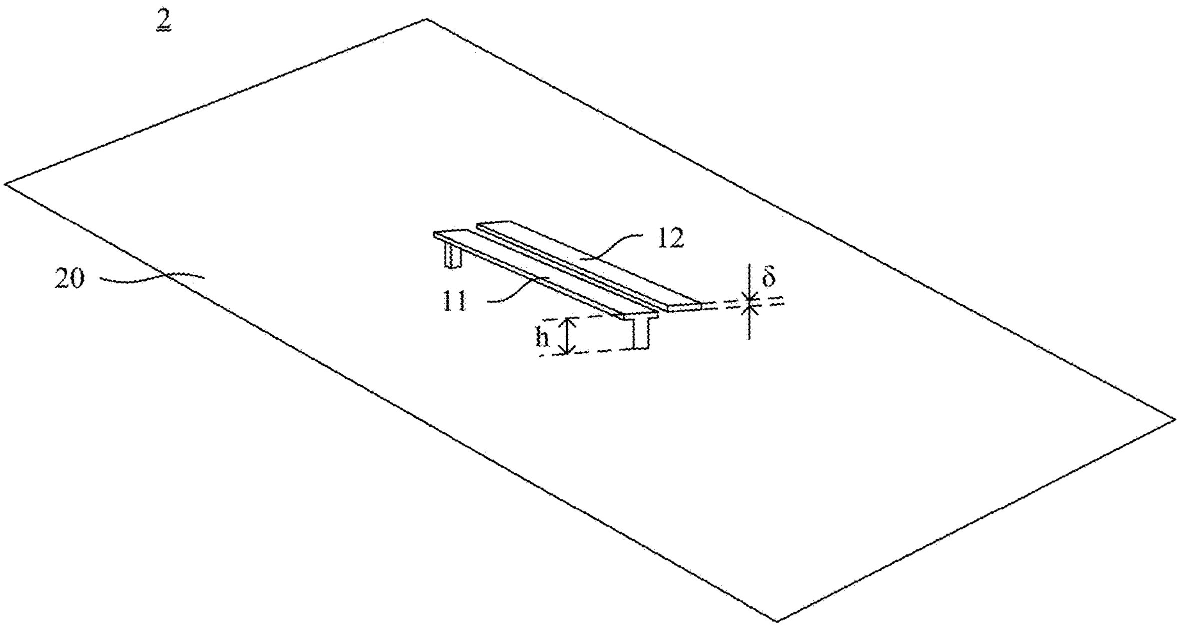

FIG. 9*a* and FIG. 9*b* are schematic diagrams of a partial three-dimensional structure of an electronic device according to an embodiment of this application. In an embodiment, each of the first radiator 11 and the second radiator 12 is formed by using an FPC or a PCB disposed in the electronic device 2, and the ground is formed by using the PCB board 20. The electronic device 2 shown in FIG. 9*a* uses the antenna shown in FIG. 2*b*. In this implementation, a jumper resistor 0R1 is selected as a grounding component of the antenna. In an implementation, an inductor may be selected as the grounding component of the antenna. In an implementation, the grounding component is welded to the PCB board 20 and is connected between the first radiator 11 and the second radiator 12 by using a spring contact. In another implementation, the grounding component may alternatively be disposed in another manner.

Figure 10:
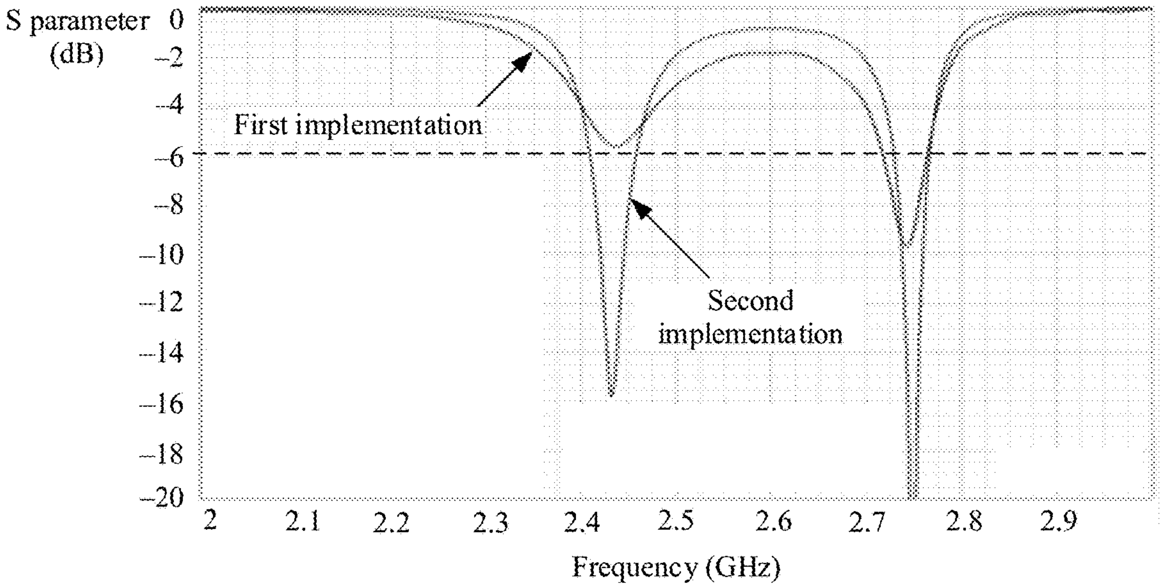
FIG. 10 and FIG. 11 are respectively an S parameter comparison effect curve graph and a radiation efficiency and system efficiency (namely, efficiency) comparison effect curve graph that are of an antenna and that are obtained when a simulation effect test is performed on the antenna according to an embodiment of this application in two implementations.
Figure 11:
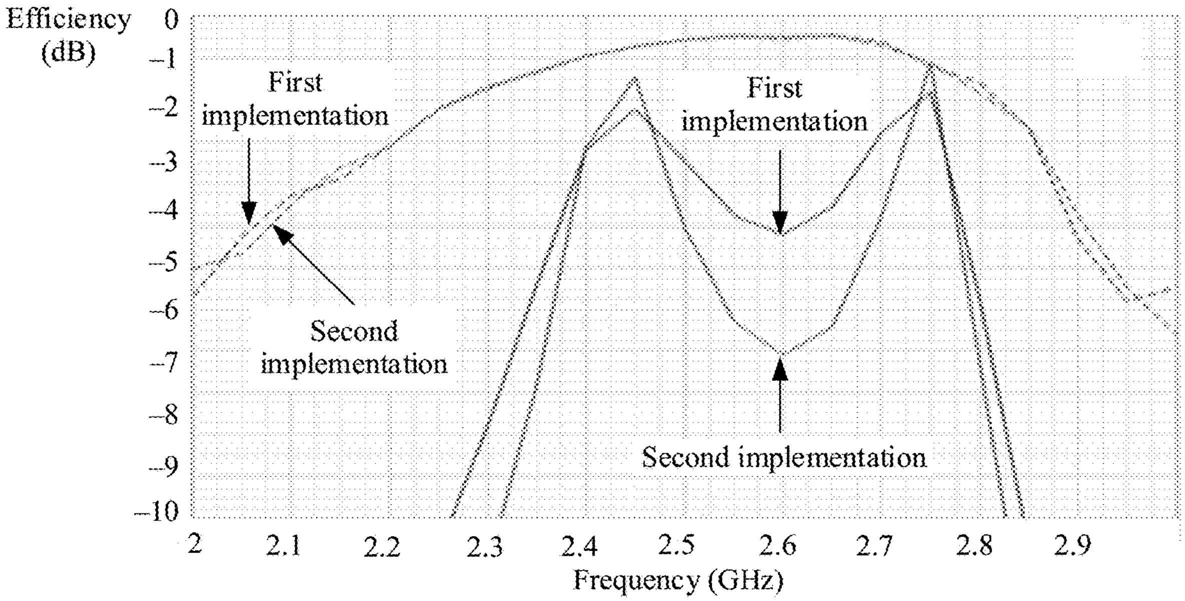

Simulation software is used to perform simulation analysis on the antenna when different grounding components are selected in the electronic device in this embodiment, to obtain effect curve graphs shown in FIG. 10 and FIG. 11.

Simulation effect parameters of the obtained curve graphs shown in FIG. 10 and FIG. 11 are shown in Table 1 below (which is understood with reference to FIG. 9*a* and FIG. 9*b*):

TABLE 1

| Parameters | First implementation | Second implementation |
|---|---|---|
| Width D1 (mm) of the PCB board 20 | 70 | 70 |
| Length D2 (mm) of the PCB board 20 | 150 | 150 |
| Distance D4 (mm) between two sides that are of the first radiator and the second radiator and that are away from each other | 7 | 7 |
| Length D3 (mm) of the first radiator 11 | 40 mm | 40 mm |
| Length D3 (mm) of the second radiator 12 | 40 mm | 40 mm |
| Gap (mm) between the first radiator 11 and the second radiator 12 | 1 | 1 |
| Thickness δ (mm) of a radiator | 0.3 | 0.3 |
| Distance h (mm) between an upper surface of a radiator and the PCB board 20 | 2.9 | 2.9 |
| Grounding component | Capacitor, with a capacitance value of 3 pF | Jumper resistor (zero-ohm resistor) |
| Feed manner | A differential feed structure is used | A differential feed structure is used |

FIG. 10 and FIG. 11 are respectively an S parameter comparison effect curve graph and a radiation efficiency and system efficiency (namely, efficiency) comparison effect curve graph that are of an antenna and that are obtained when a simulation effect test is performed on the antenna according to an embodiment of this application in two implementations.

In FIG. 10, a horizontal coordinate indicates a frequency in a unit of GHz, and a vertical coordinate indicates an S11 parameter in a unit of dB. The S11 parameter is a type of S parameter. S11 indicates a reflection coefficient, and this parameter can indicate whether transmit efficiency of the antenna is good. Specifically, a smaller S11 value indicates less return loss of the antenna, and less energy reflected by the antenna indicates more energy actually entering the antenna.

It can be learned from FIG. 10 that, in a same frequency band, for example, in a range of 2.4 GHZ-2.8 GHz, the antenna in each of the first implementation and the second implementation of this embodiment can generate two resonances, and resonance frequencies of the two resonances are 2.44 GHz and 2.74 GHz, where the lower resonance is generated by the second radiator 12, and the higher resonance is generated by the first radiator 11. It can be further learned from FIG. 10 that, in the second implementation of this embodiment, the S11 values in the two frequency bands of 2.41 GHZ-2.25 GHz and 2.74 GHZ-2.76 GHz are both less than −6 dB. In the first implementation of this embodiment, the S11 value is less than −6 dB only in a frequency band of 2.72 GHZ-2.76 GHz. It should be noted that, in engineering, an S11 value of −6 dB is generally used as a standard. When the S11 value of the antenna is less than −6 dB, it may be considered that the antenna can operate normally, or it may be considered that the transmit efficiency of the antenna is good. It can be learned that, under a condition of meeting same transmission efficiency, the antenna in the second implementation of this embodiment can cover more operating frequency bands.

In FIG. 11, a horizontal coordinate indicates a frequency in a unit of GHz, and a vertical coordinate indicates radiation efficiency and system efficiency of the antenna, where a dashed line indicates the radiation efficiency, and a solid line indicates the system efficiency. The radiation efficiency is a value for measuring a radiation capability of the antenna, and both a metal loss and a dielectric loss are factors affecting the radiation efficiency. The system efficiency is actual efficiency obtained under consideration of antenna port matching, that is, the system efficiency of the antenna is the actual efficiency (namely, efficiency) of the antenna. A person skilled in the art may understand that efficiency is generally indicated by a percentage, and there is a corresponding conversion relationship between the efficiency and dB. Efficiency closer to 0 dB indicates better efficiency of the antenna.

It can be learned from FIG. 11 that, in a same frequency band, under a condition of meeting specific system efficiency condition, the antenna in this embodiment of this application can excite two resonance modes to cover a wide operating frequency band, thereby significantly improving efficiency bandwidth. System efficiency of −5 dB is used as an example. The antenna in the first implementation of this embodiment of this application can meet the system efficiency requirement in both frequency bands of 2.38 GHZ-2.58 GHz and 2.62 GHZ-2.79 GHz, and the antenna in the second implementation of this embodiment of this application can meet the system efficiency requirement in both frequency bands of 2.39 GHZ-2.5 GHz and 2.7 GHZ-2.79 GHz.

Figure 12A:
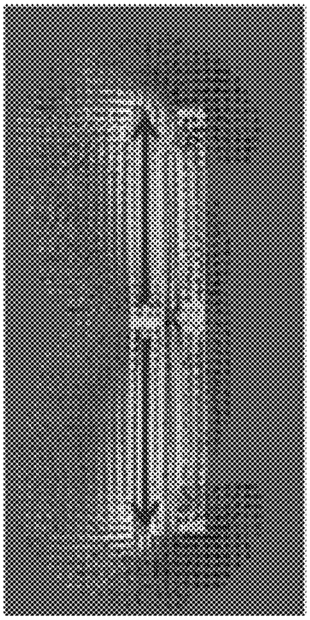
FIG. 12*a* and FIG. 12*b* are respectively current patterns obtained when a simulation effect test is performed on an antenna according to an embodiment of this application at different resonance frequencies.
Figure 12B:
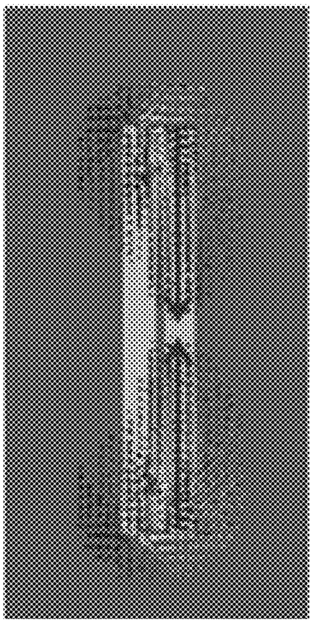
Figure 13A:
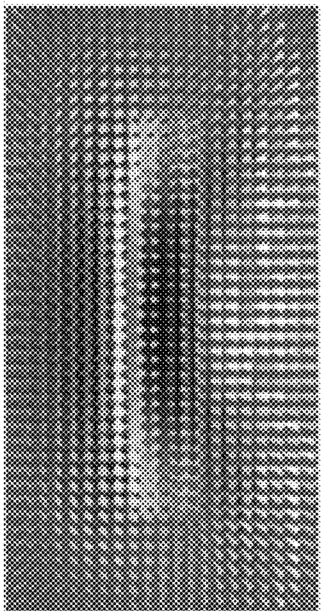
FIG. 13*a* and FIG. 13*b* are respectively electric field patterns obtained when a simulation effect test is performed on an antenna according to an embodiment of this application at different resonance frequencies.
Figure 13B:
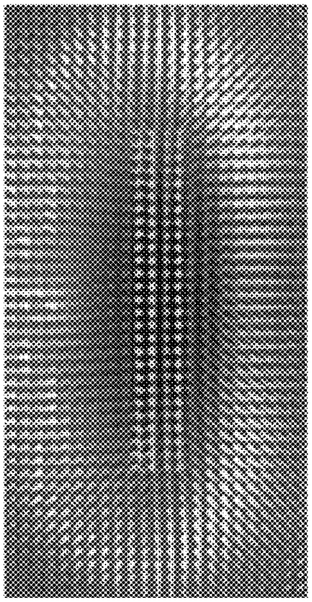
Figure 14A:
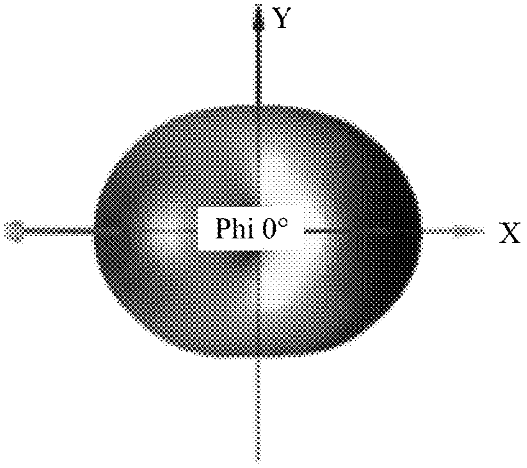
FIG. 14*a* and FIG. 14*b* are respectively radiation patterns obtained when a simulation effect test is performed on an antenna according to an embodiment of this application at different resonance frequencies.
Figure 14B:
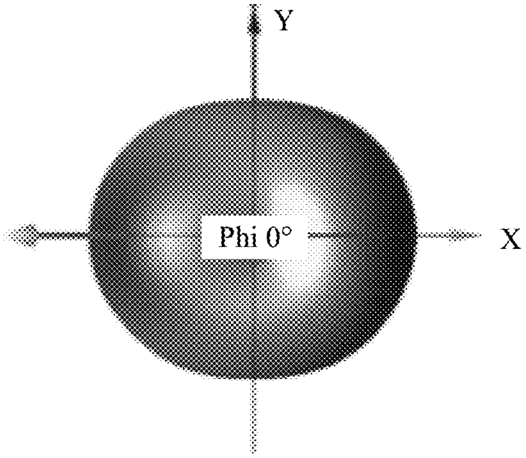

FIG. 12*a* and FIG. 12*b* are respectively current patterns obtained when a simulation effect test is performed on an antenna according to an embodiment of this application at different resonance frequencies. FIG. 13*a* and FIG. 13*b* are respectively electric field patterns obtained when a simulation effect test is performed on an antenna according to an embodiment of this application at different resonance frequencies. FIG. 14*a* and FIG. 14*b* are respectively radiation patterns obtained when a simulation effect test is performed on an antenna according to an embodiment of this application at different resonance frequencies.

In FIG. 12*a* and FIG. 12*b*, an arrow direction indicates a direction of a current generated when the antenna is excited. A first resonance with a resonance frequency of 2.74 GHz is generated by a first radiator (namely, a left radiator in FIG. 12*a*) of the antenna, and a second resonance with a resonance frequency of 2.44 GHz is generated by a second radiator (namely, a right radiator in FIG. 12*a*) of the antenna. In FIG. 13*a* and FIG. 13*b*, an arrow direction indicates a direction of an electric field generated when the antenna is excited. It can be learned that directions of electric fields generated by two radiators in the antenna are consistent, and are all in a direction from the ground to the radiator. In another implementation, directions of electric fields generated by two radiators in the antenna may alternatively be in a direction from the radiator to the ground.

In FIG. 14*a* and FIG. 14*b*, a deeper color indicates stronger radiation intensity. It can be learned from FIG. 14*a* and FIG. 14*b* that radiation directions of the antenna at a first resonance frequency and a second resonance frequency are approximately the same, that is, radiation intensity generated in an X-axis direction is strong, and radiation intensity generated in a Z-axis direction is weak. It can be learned that currents, electric fields, and radiation characteristics generated by the antenna at the first resonance frequency and the second resonance frequency are basically the same.

Figure 15:
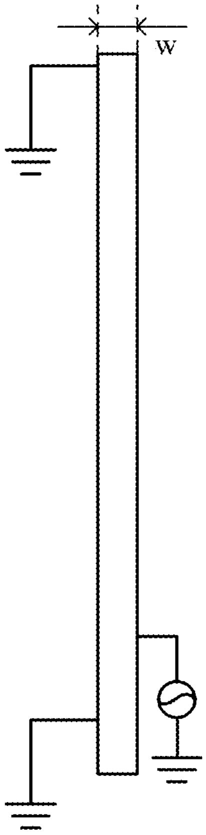
FIG. 15 is a schematic diagram of a principle structure of an antenna in a second reference design, where there is one radiator.

FIG. 15 is a schematic diagram of a principle structure of an antenna in a second reference design, where there is one radiator.

Figure 16:
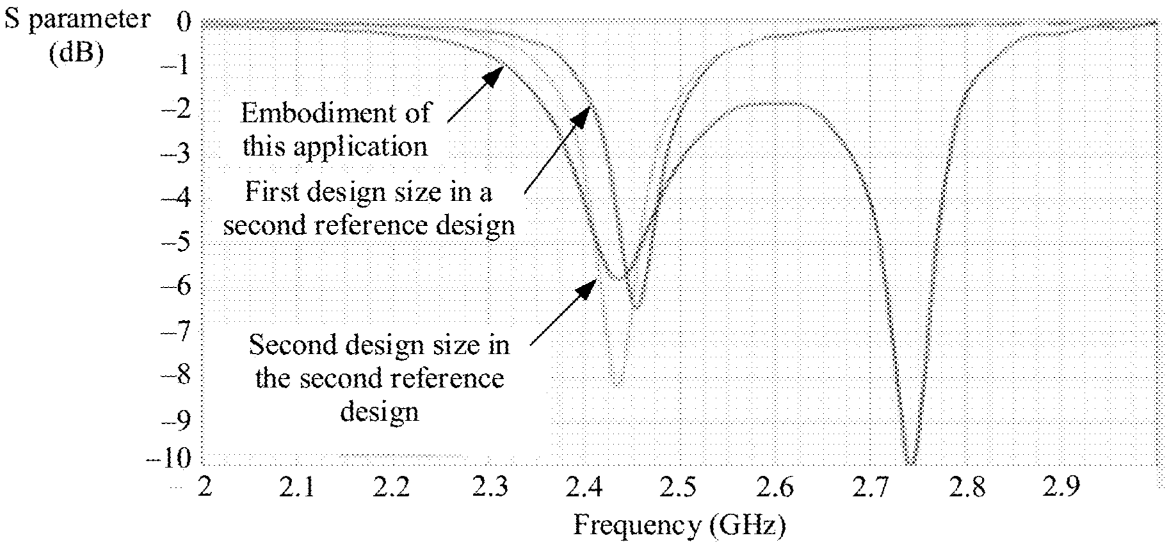
FIG. 16 is an S parameter comparison effect curve graph obtained when a simulation effect test is separately performed on an antenna according to an embodiment of this application and an antenna with two design sizes in a second reference design.
Figure 17:
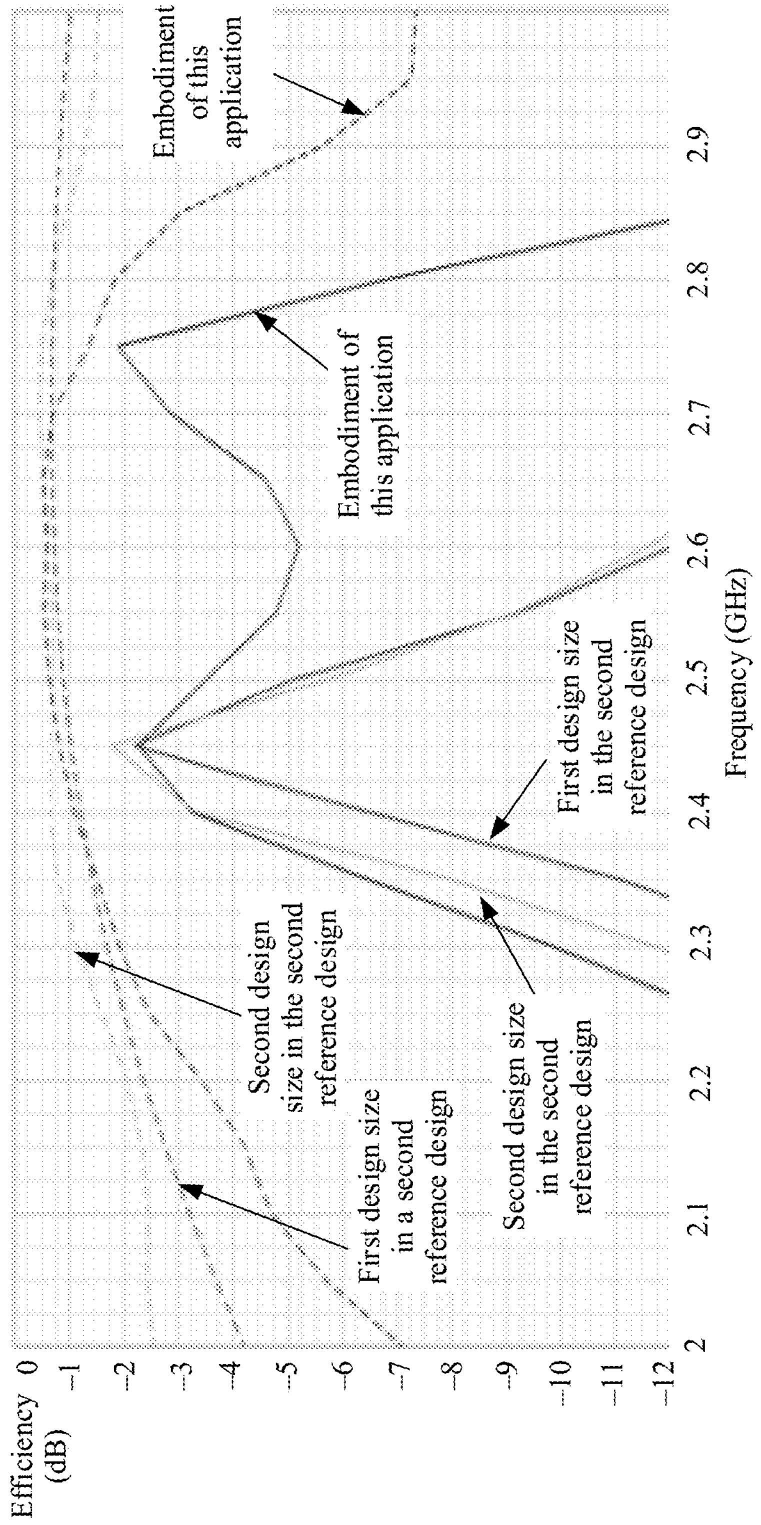
FIG. 17 is a radiation efficiency and system efficiency (namely, efficiency) comparison effect curve graph obtained when a simulation effect test is separately performed on an antenna according to an embodiment of this application and an antenna with two design sizes in a second reference design.

Simulation software is used to perform simulation analysis on the antenna provided in this embodiment and the antenna with two design sizes in the second reference design, to obtain effect curve graphs shown in FIG. 16 and FIG. 17.

Simulation effect parameters of the obtained curve graphs shown in FIG. 16 and FIG. 17 are shown in the following Table 2. For parameters of the antenna in this embodiment, refer to the parameters in the second implementation in Table 1.

TABLE 2

| Parameters | First design size | Second design size |
|---|---|---|
| Antenna width W (mm) | 3 | 7 |

It should be noted that a length of the antenna in this embodiment of this application is the same as a length of the antenna in the second reference design. When the second design size is used in the second reference design, a width of the antenna and a width of the antenna in this embodiment of this application are the same, and both are 7 mm.

Figure 18:
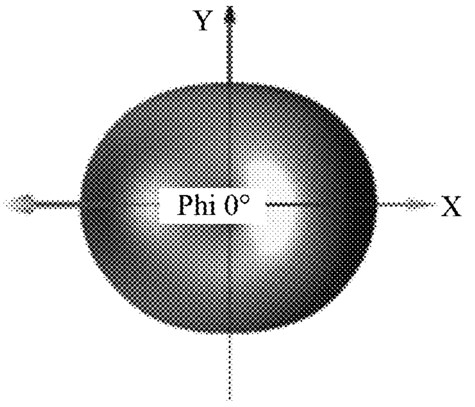
FIG. 18 and FIG. 19 are radiation patterns obtained when a simulation effect test is separately performed on an antenna according to an embodiment of this application and an antenna with a second design size in a second reference design.
Figure 19:
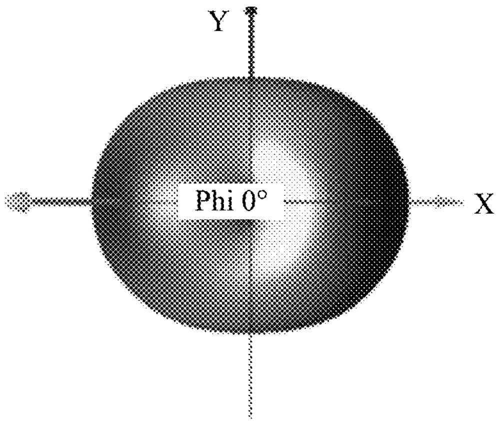

FIG. 16 is an S parameter comparison effect curve graph obtained when a simulation effect test is separately performed an antenna according to an embodiment of this application and an antenna with two design sizes in a second reference design. FIG. 17 is a radiation efficiency and system efficiency (namely, efficiency) comparison effect curve graph obtained when a simulation effect test is separately performed on an antenna according to an embodiment of this application and an antenna with two design sizes in a second reference design. FIG. 18 and FIG. 19 are radiation patterns obtained when a simulation effect test is separately performed on an antenna according to an embodiment of this application and an antenna with a second design size in a second reference design.

Analysis principles in FIG. 16 and FIG. 17 are similar to those in FIG. 10 and FIG. 11. Details are not described herein again. It can be learned that, compared with the antenna with two design sizes in the second reference design, the antenna in this embodiment of this application can cover more operating frequency bands under a condition of meeting same transmit efficiency. In addition, in a same frequency band, under a condition of meeting specific system efficiency, the antenna in this embodiment of this application can excite two resonance modes to cover a wide operating frequency band, thereby significantly improving efficiency bandwidth.

It can be learned from FIG. 18 and FIG. 19 that, at a 2.44 GHz operating frequency, radiation patterns generated by the antenna according to this embodiment of this application and the antenna with the second design size in the second reference design are approximately the same, that is, radiation intensity generated in an X-axis direction is strong, and radiation intensity generated in a Z-axis direction is weak. It can be learned from the above that, when sizes (namely, lengths of the antennas and widths of the antennas) of the antennas are the same, efficiency bandwidth of the antenna in this embodiment of this application is more than twice efficiency bandwidth of the antenna in the second reference design, and a radiation characteristic of the antenna basically remains unchanged.

Figure 20:
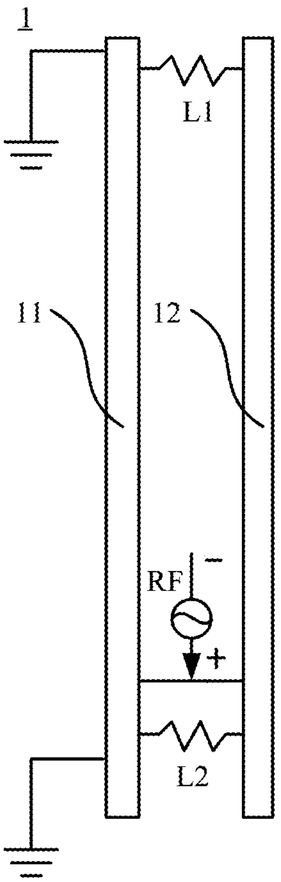
FIG. 20 and FIG. 21 are respectively a schematic diagram of a principle structure of an antenna in a third reference design and a schematic diagram of a principle structure of an antenna in a fourth reference design, where the antenna in the third reference design is fed in a symmetric feeding manner, and the antenna in the fourth reference design is fed in a coupled feeding manner.
Figure 21:
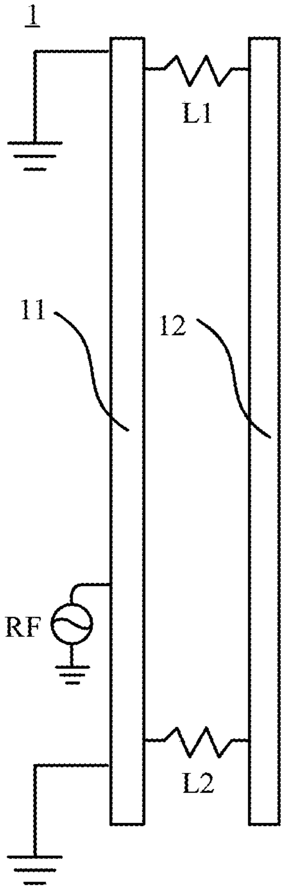

FIG. 20 and FIG. 21 are respectively a schematic diagram of a principle structure of an antenna in a third reference design and a schematic diagram of a principle structure of an antenna in a fourth reference design, where the antenna in the third reference design is fed in a symmetric feeding manner, and the antenna in the fourth reference design is fed in a coupled feeding manner. Symmetric feeding may be understood as that: Feed signals received by two radiators have a same amplitude and a same phase.

Simulation software is used to perform simulation analysis on the antenna in this embodiment of this application, the antenna in the third reference design, and the antenna in the fourth reference design, to obtain electric field patterns shown in FIG. 22*a* to FIG. 24*c*. In the figures, a direction of a triangle arrow indicates a direction of an electric field. In this embodiment of this application, a differential feed structure is used.

Figure 22A:
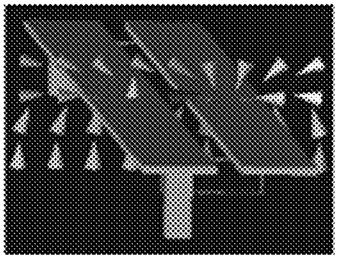
FIG. 22*a* to FIG. 22*c* are electric field patterns obtained when a simulation effect test is performed on an antenna according to an embodiment of this application at different operating frequencies.
Figure 22B:
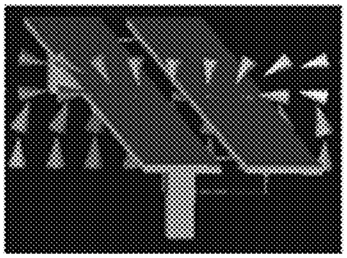
Figure 22C:
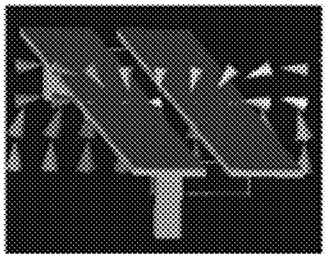

It can be learned from FIG. 22*a* to FIG. 22*c* that, when the antenna in this embodiment of this application is at a first resonance frequency of 2.74 GHz, a second resonance frequency of 2.44 GHZ, and an intermediate frequency of 2.59 GHZ, electric fields of the antenna are all in a direction from the ground to the radiator. It can be learned that, the antenna in this embodiment of this application can excite two co-directional electric fields on two radiators at any frequency in an operating frequency band, to generate superposition of electric fields (which may be understood as that no radiation efficiency pit is generated), thereby implementing wide efficiency bandwidth.

Figure 23A:
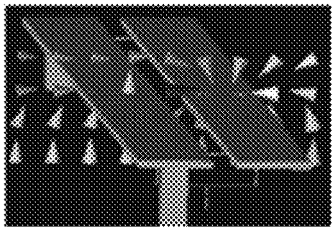
FIG. 23*a* to FIG. 23*c* are electric field patterns obtained when a simulation effect test is performed on an antenna in a third reference design at different operating frequencies.
Figure 23B:
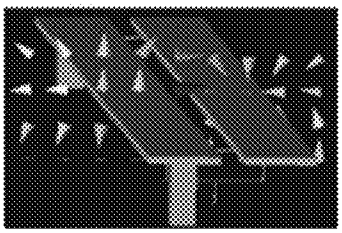
Figure 23C:
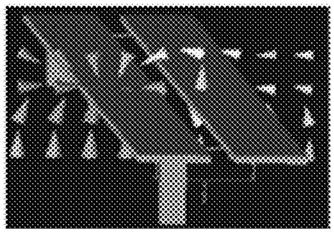

It can be learned from FIG. 23*a* to FIG. 23*c* that, when the antenna in the third reference design is at a resonance frequency of 2.66 GHz and a resonance frequency of 2.87 GHz, electric fields of the antenna are all in a direction from the ground to the radiator, namely, a co-directional mode. However, when the antenna in the third reference design is at an intermediate frequency of 2.77 GHz, an electric field generated by a left radiator in FIG. 23*b* and an electric field generated by a right radiator in FIG. 23*b* are opposite in direction. Therefore, superposition of electric fields cannot be generated (which may be understood as that a radiation efficiency pit is generated). Consequently, wide efficiency bandwidth cannot be implemented.

Figure 24A:
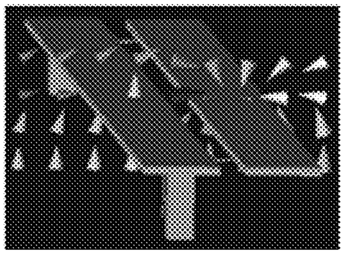
FIG. 24*a* to FIG. 24*c* are electric field patterns obtained when a simulation effect test is performed on an antenna in a fourth reference design at different operating frequencies.
Figure 24B:
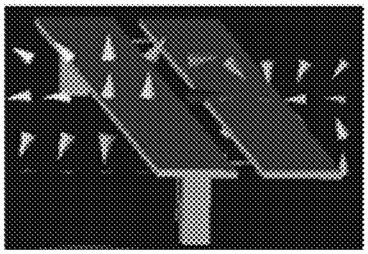
Figure 24C:
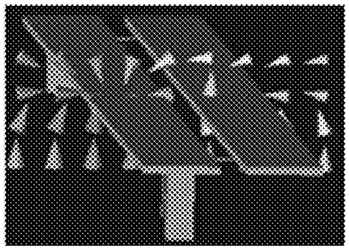

Analysis principles in FIG. 24*a* to FIG. 24*c* are similar to those in FIG. 23*a* to FIG. 23*c*. It can be learned that the antenna in the fourth reference design cannot generate superposition of electric fields (which may be understood as that a radiation efficiency pit is generated) at any frequency in an operating frequency band of the antenna. Consequently, wide efficiency bandwidth cannot be implemented.

Figure 25A:
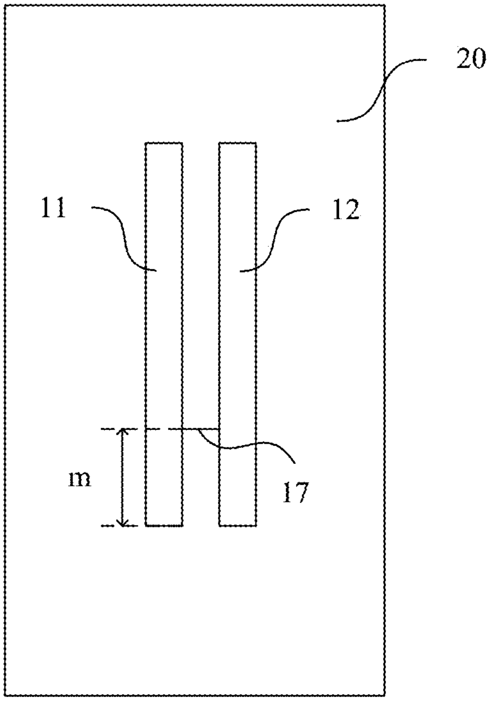
FIG. 25*a* and FIG. 25*b* are respectively a schematic diagram of a partial three-dimensional structure of an electronic device and a schematic diagram of a principle structure of an antenna according to an embodiment of this application, where a first radiator and a second radiator are connected to a radio frequency source by using a distributed feed structure, and a first feed connection point is 6 mm away from a second end of the first radiator.
Figure 25B:
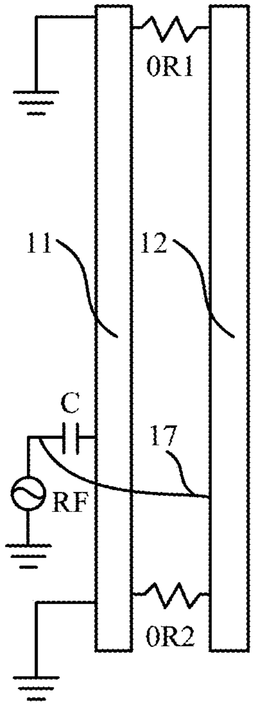
Figure 26A:
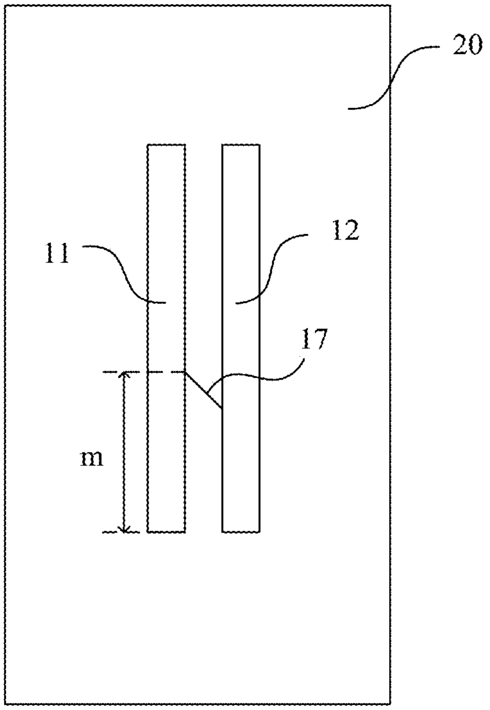
FIG. 26*a* and FIG. 26*b* are respectively a schematic diagram of a partial three-dimensional structure of an electronic device and a schematic diagram of a principle structure of an antenna according to an embodiment of this application, where a first radiator and a second radiator are connected to a radio frequency source by using a distributed feed structure, and a first feed connection point is 11 mm away from a second end of the first radiator.
Figure 26B:
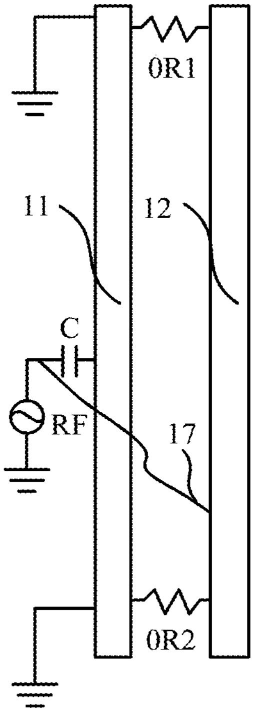
Figure 27A:
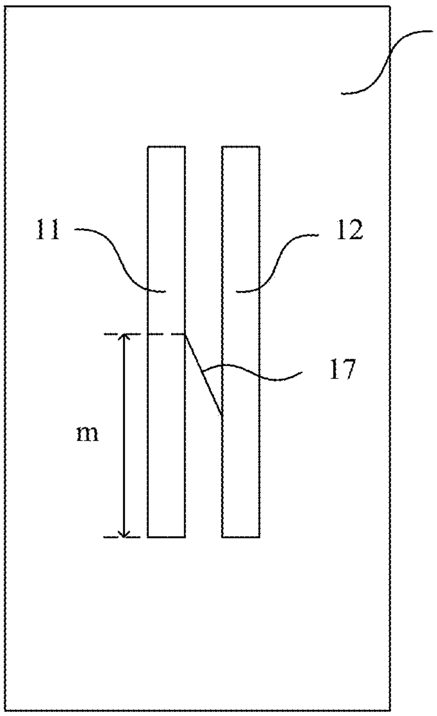
FIG. 27*a* and FIG. 27*b* are respectively a schematic diagram of a partial three-dimensional structure of an electronic device and a schematic diagram of a principle structure of an antenna according to an embodiment of this application, where a first radiator and a second radiator are connected to a radio frequency source by using a distributed feed structure, and a first feed connection point is 16 mm away from a second end of the first radiator.
Figure 27B:
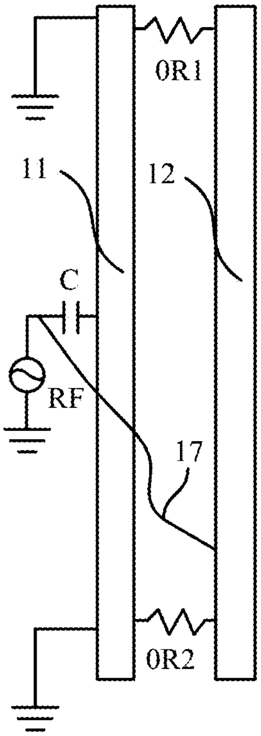

Refer to FIG. 25*a* to FIG. 27*b*. An antenna is fed by using a distributed feed structure. In an embodiment, a first matching component is a capacitor C, and a capacitance value of C is 0.3 pF. In an embodiment, for other parameters of the antenna, refer to the second implementation in Table 1. FIG. 25*a* and FIG. 25*b* are respectively a schematic diagram of a partial three-dimensional structure of an electronic device and a schematic diagram of a principle structure of an antenna according to an embodiment of this application. In an embodiment, a distance m between a first feed connection point and a second end of a first radiator is 6 mm. FIG. 26*a* and FIG. 26*b* are respectively a schematic diagram of a partial three-dimensional structure of an electronic device and a schematic diagram of a principle structure of an antenna according to an embodiment of this application. In an embodiment, a distance m between a first feed connection point and a second end of a first radiator is 11 mm. FIG. 27*a* and FIG. 27*b* are respectively a schematic diagram of a partial three-dimensional structure of an electronic device and a schematic diagram of a principle structure of an antenna according to an embodiment of this application. In an embodiment, a distance m between a first feed connection point and a second end of a first radiator is 16 mm.

It should be noted that a larger distance between the first feed connection point and the second end of the first radiator indicates a longer length of a transmission line and a larger phase difference of feed signals between the two radiators. In an embodiment, when m=16 mm, a phase difference between a feed signal received by the first radiator 11 and a feed signal received by the second radiator 12 is close to 180°−45° to 180°+45°.

Figure 28:
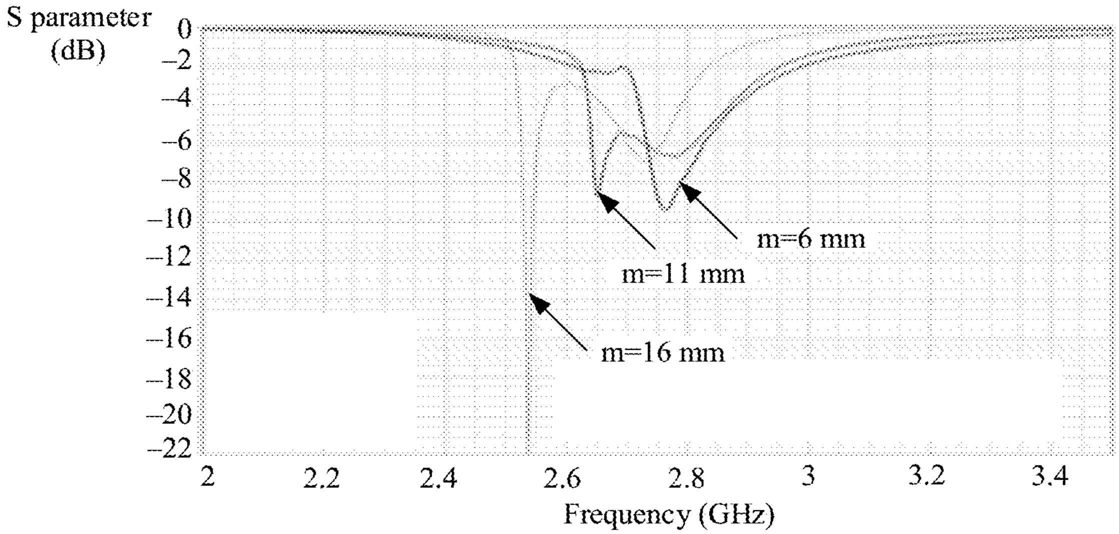
FIG. 28 is an S parameter comparison effect curve graph obtained when a simulation effect test is separately performed on an electronic device according to an embodiment of this application at positions at which a first feed connection point is 6 mm, 11 mm, and 16 mm away from a second end of a first radiator.
Figure 29:
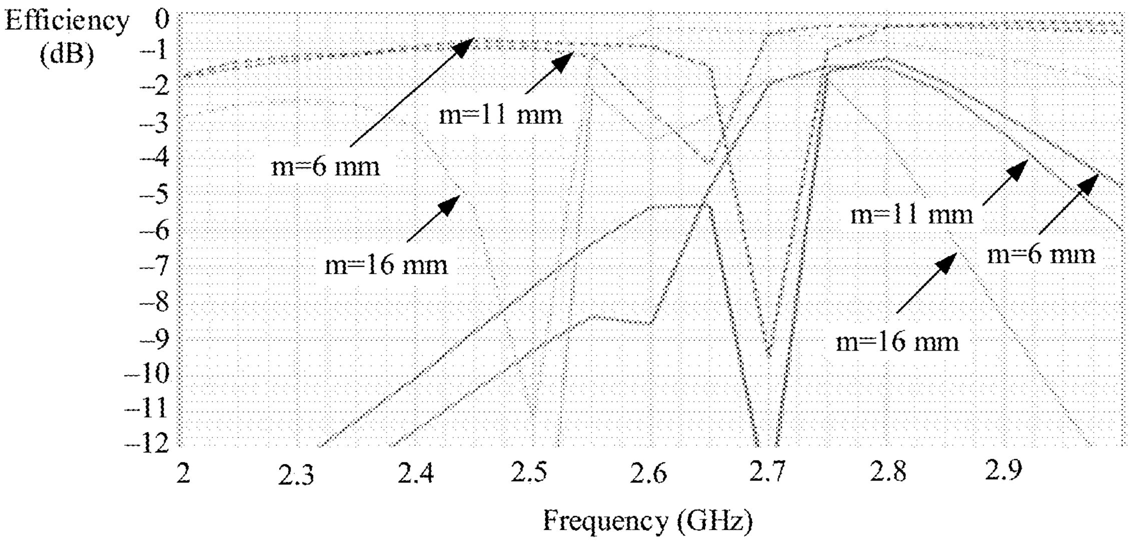
FIG. 29 is a radiation efficiency and system efficiency (namely, efficiency) comparison effect curve graph obtained when a simulation effect test is separately performed on an electronic device according to an embodiment of this application at positions at which a first feed connection point is 6 mm, 11 mm, and 16 mm away from a second end of a first radiator.

Simulation software is used to perform simulation analysis on the antenna in the foregoing three implementations of this embodiment, to obtain effect curve graphs in FIG. 28 and FIG. 29.

FIG. 28 and FIG. 29 are respectively an S parameter comparison effect curve graph and a radiation efficiency and system efficiency (namely, efficiency) comparison effect curve graph that are obtained when a simulation effect test is separately performed on an electronic device according to an embodiment of this application at positions at which a first feed connection point is 6 mm, 11 mm, and 16 mm away from a second end of a first radiator.

Analysis principles in FIG. 28 and FIG. 29 are similar to those in FIG. 10 and FIG. 11. Details are not described herein again. It can be seen from FIG. 29 that, as a phase difference of feed signals increases (which may be understood as lengthening of a signal transmission line), a radiation efficiency pit of an antenna gradually shifts towards a low frequency.

Based on the foregoing analysis, it can be learned that, compared with m=6 mm and m=11 mm, when m=16 mm, in this embodiment of this application, more operating frequency bands can be covered under a condition of meeting same transmit efficiency. In addition, in a same frequency band, under a condition of meeting specific system efficiency, the antenna in this embodiment of this application can excite two resonance modes to cover a wide operating frequency band, thereby significantly improving efficiency bandwidth.

Figure 30A:
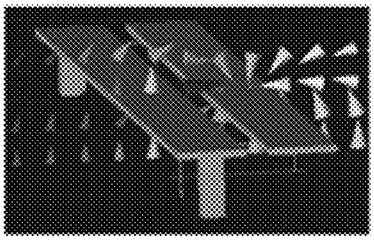
FIG. 30*a* to FIG. 30*c* are electric field patterns obtained when a simulation effect test is performed on an antenna according to an embodiment of this application at different operating frequencies, where a first feed connection point of the antenna is 6 mm away from a second end of a first radiator.
Figure 30B:
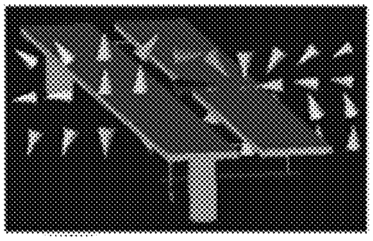
Figure 30C:
Figure 31A:
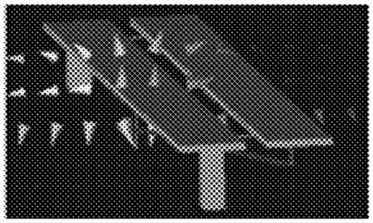
FIG. 31*a* to FIG. 31*c* are electric field patterns obtained when a simulation effect test is performed on an antenna according to an embodiment of this application at different operating frequencies, where a first feed connection point of the antenna is 16 mm away from a second end of a first radiator.
Figure 31B:
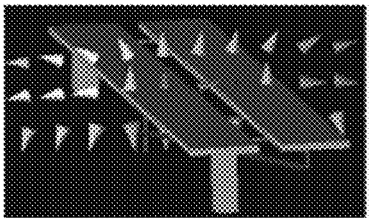
Figure 31C:
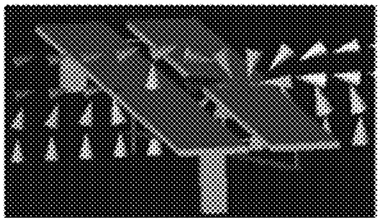

FIG. 30*a* to FIG. 30*c* are electric field patterns obtained when a simulation effect test is performed on an antenna according to an embodiment of this application at different operating frequencies, where a first feed connection point of the antenna is 6 mm away from a second end of a first radiator. FIG. 31*a* to FIG. 31*c* are electric field patterns obtained when a simulation effect test is performed on an antenna according to an embodiment of this application at different operating frequencies, where a first feed connection point of the antenna is 16 mm away from a second end of a first radiator. Analysis principles in FIG. 30*a* to FIG. 31*c* are similar to those in FIG. 22*a* to FIG. 22*c*. It can be learned from FIG. 30*a* to FIG. 31*c* that when a phase difference between a feed signal received by the first radiator 11 and a feed signal received by the second radiator 12 is close to 180°−45° to 180°+45°, two co-directional electric fields can be excited on the two radiators, to generate superposition of the electric fields (which may be understood as that no radiation efficiency pit is generated), thereby implementing wide efficiency bandwidth.

Figure 32:
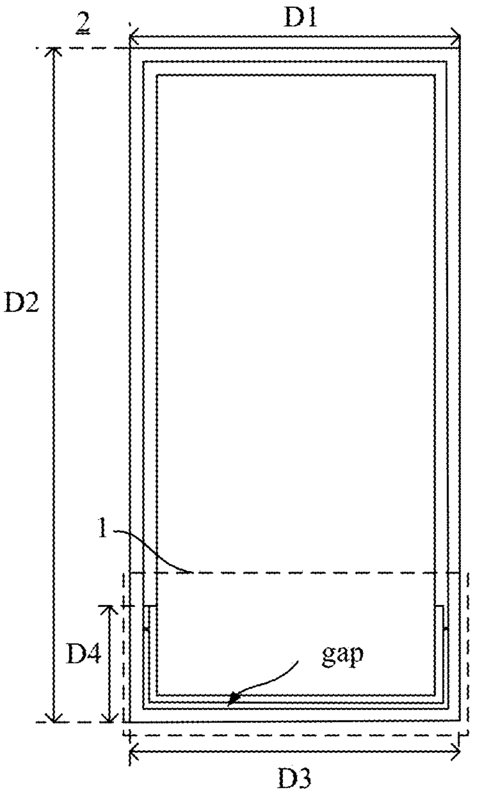
FIG. 32 is a schematic diagram of a three-dimensional structure of an electronic device according to an embodiment of this application.
Figure 33A:
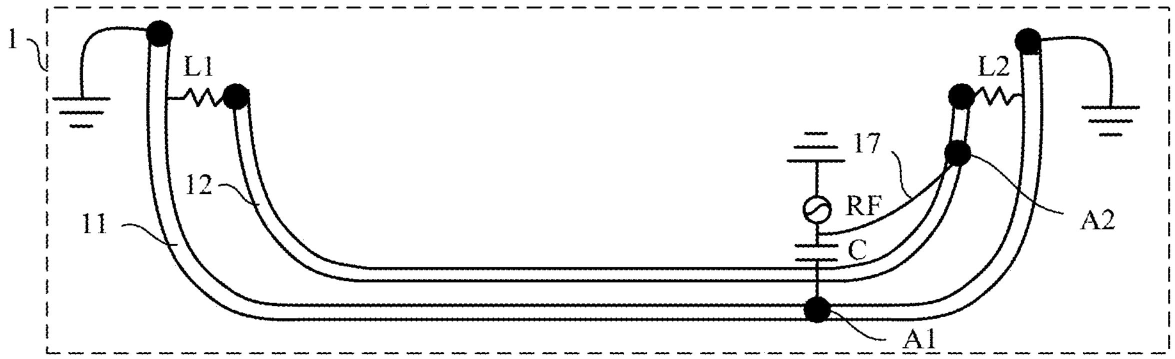
FIG. 33*a* and FIG. 33*b* are schematic diagrams of a principle structure of an antenna in an electronic device according to an embodiment of this application.
Figure 33B:
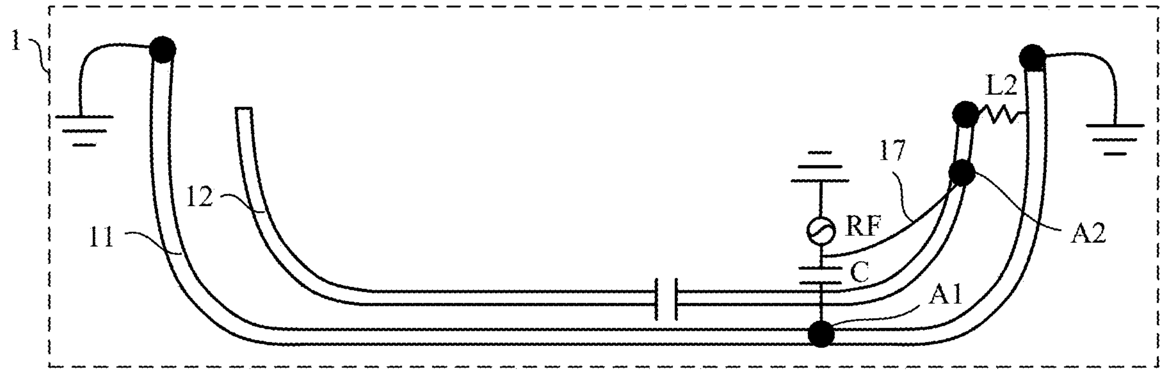

Refer to FIG. 32 to FIG. 33*b*. FIG. 32 is a schematic diagram of a three-dimensional structure of an electronic device according to an embodiment of this application. In an embodiment, the antenna 1 is located at the lower part of the electronic device 2. FIG. 33*a* and FIG. 33*b* are schematic diagrams of a principle structure of an antenna in an electronic device according to an embodiment of this application. An antenna structure used by the electronic device in this embodiment is shown in FIG. 33*a*. The antenna structure in FIG. 33*a* is basically the same as the structure in FIG. 3. A difference lies in that the first radiator 11 of the antenna 1 is formed by using a metal side frame of the electronic device, the second radiator 12 of the antenna 1 is formed by using a conductive member in the electronic device 2, a length of the second radiator 12 is slightly shorter than a length of the first radiator 11, and a gap between the two radiators is less than 3 mm, for example, may be approximately 1 mm or less than 1 mm, and the grounding component uses an inductor L1 and an inductor L2. In another alternative implementation, as shown in FIG. 33*b*, the second radiator 12 may alternatively be formed by using a meta-material (Meta-material) structure or a metasurface (Metasurface) structure. For example, the meta-material structure has a negative dielectric constant and a negative magnetic permeability at the same time, and further has a negative refraction coefficient. Therefore, the meta-material structure may be used in the antenna field, to further implement miniaturization of the antenna.

Figure 34:
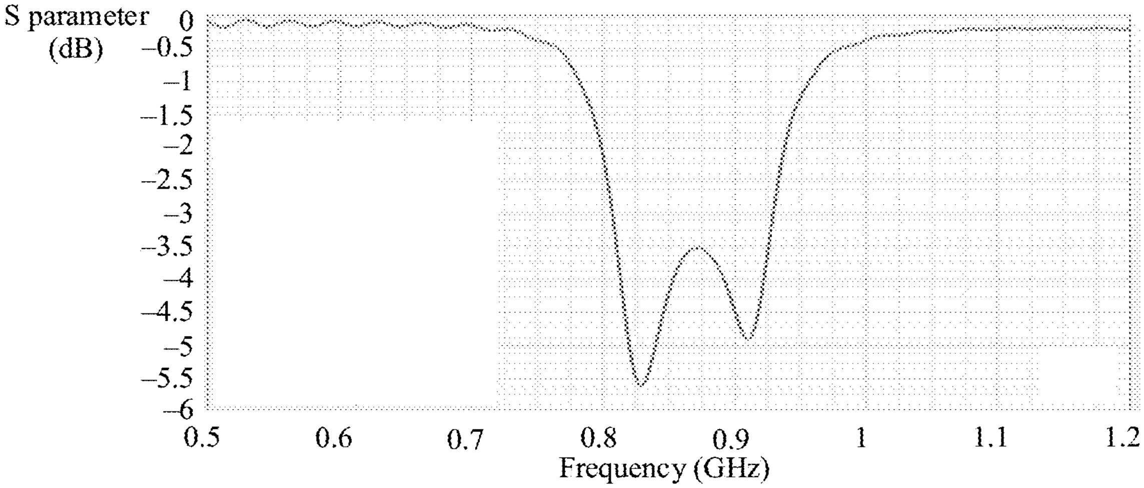
FIG. 34 and FIG. 35 are respectively an S parameter effect curve graph and a radiation efficiency and system efficiency (namely, efficiency) effect curve graph that are obtained when a simulation effect test is performed on an antenna according to an embodiment of this application.
Figure 35:
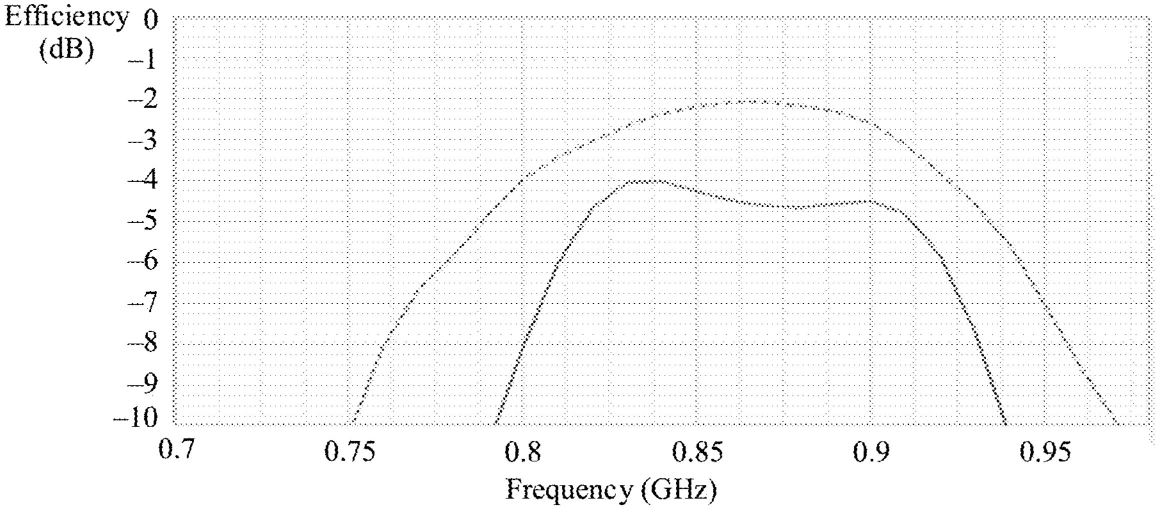

Simulation software is used to perform simulation analysis on the antenna in the electronic device in this embodiment, to obtain effect curve graphs shown in FIG. 34 and FIG. 35.

Simulation effect parameters of the obtained curve graphs shown in FIG. 34 and FIG. 35 are shown in Table 3 below (which is understood with reference to FIG. 32).

TABLE 3

| Parameters | First implementation |
|---|---|
| Width D1 (mm) of the electronic device | 78 |
| Length D2 (mm) of the electronic device | 158 |
| Distance D3 (mm) between two ends of the first radiator | 78 |
| Distance D4 (mm) between the first end of the first radiator and a bottom edge of the electronic device | 28.5 |
| Length of the first radiator 11 | ½ times an operating wavelength of the radiator |
| Length of the second radiator 12 | ½ times an operating wavelength of the radiator |
| Gap (mm) between the first radiator 11 and the second radiator 12 | 1 |
| Thickness δ (mm) of a radiator | 0.3 |
| Distance h (mm) between an upper surface of a radiator and the PCB board 20 | 2.6 |
| Grounding component | Inductance value of L1 = inductance value of L2 = 0.5 nH |
| First matching component | Capacitance value of C = 1.5 pF |
| Feed manner | A distributed feed structure is used |

In addition, in the electronic device in this embodiment, the vicinity of the first radiator 11 and the second radiator 12 may be partially filled with air. For example, air with a dielectric constant of Er=1 and a loss angle of LT=0.01 is filled in the middle of the antenna, and a filling length may be, for example, 18 mm. Further, a uniform medium may be filled into the second radiator 12 (namely, a conductive member), for example, a thermoplastic plastic PCABS with a dielectric constant of Er=3 and a loss angle of LT=0.01 may be filled, where a filling width may be, for example, 23 mm, and a filling thickness may be, for example, 0.6 mm. Further, a thermoplastic plastic PCABS with a dielectric constant of Er=3 and a loss angle of LT=0.01 may also be filled into the metal side frame of the electronic device, where a filling width may be, for example, 3 mm, and a filling thickness may be, for example, 4 mm. Certainly, a person skilled in the art may understand that the electronic device may alternatively select a filler of another type or another parameter.

FIG. 34 and FIG. 35 are respectively an S parameter effect curve graph and a radiation efficiency and system efficiency (namely, efficiency) effect curve graph that are obtained when a simulation effect test is performed on an antenna according to an embodiment of this application.

Analysis principles in FIG. 34 and FIG. 35 are similar to those in FIG. 10 and FIG. 11. Details are not described herein again. The antenna in this embodiment of this application can excite two resonance modes, where a higher resonance (with a resonance frequency of 0.91 GHz) is generated by the second radiator 12, and a lower resonance (with a resonance frequency of 0.91 GHz) is generated by the first radiator 11. It can be learned that, in this embodiment of this application, more operating frequency bands can be covered under a condition of meeting same transmit efficiency. In addition, in a same frequency band, under a condition of meeting specific system efficiency, the antenna in this embodiment of this application can excite two resonance modes to cover a wide operating frequency band, thereby significantly improving efficiency bandwidth.

Figure 36A:
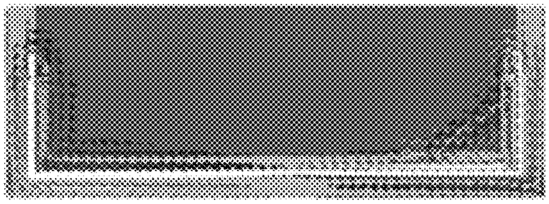
FIG. 36*a* and FIG. 36*b* are current patterns obtained when a simulation effect test is performed on an antenna according to an embodiment of this application at different resonance frequencies.
Figure 36B:
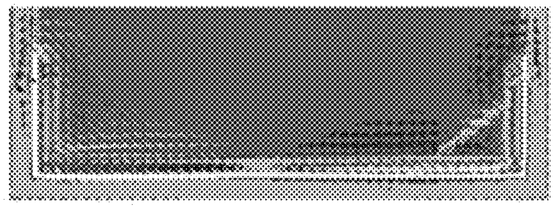
Figure 37A:
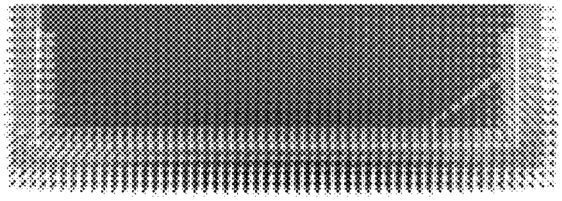
FIG. 37*a* and FIG. 37*b* are electric field patterns obtained when a simulation effect test is performed on an antenna according to an embodiment of this application at different resonance frequencies.
Figure 37B:
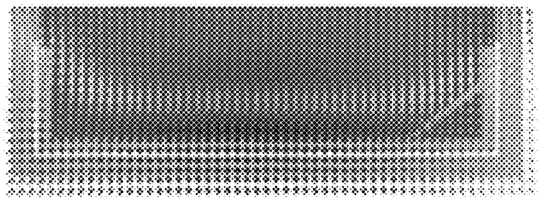
Figure 38A:
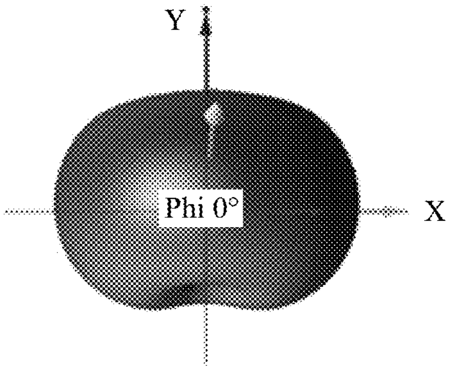
FIG. 38*a* and FIG. 38*b* are radiation patterns obtained when a simulation effect test is performed on an antenna according to an embodiment of this application at different resonance frequencies.
Figure 38B:
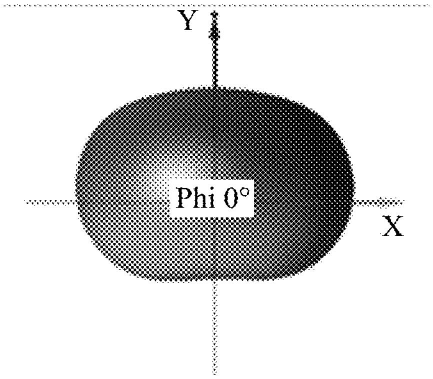

FIG. 36*a* and FIG. 36*b* are current patterns obtained when a simulation effect test is performed on an antenna according to an embodiment of this application at different resonance frequencies. FIG. 37*a* and FIG. 37*b* are electric field patterns obtained when a simulation effect test is performed on an antenna according to an embodiment of this application at different resonance frequencies. FIG. 38*a* and FIG. 38*b* are radiation patterns obtained when a simulation effect test is performed on an antenna according to an embodiment of this application at different resonance frequencies. Analysis principles in FIG. 36*a* to FIG. 38*b* are similar to those in FIG. 12*a* to FIG. 14*b*. It can be learned that electric fields generated by the two radiators in the antenna are all in a direction from the ground to the radiator. It can be learned from FIG. 38*a* and FIG. 38*b* that radiation directions of the antenna at a first resonance frequency of 0.83 GHz and a second resonance frequency of 0.91 GHz are approximately the same. Therefore, it can be learned that currents, electric fields, and radiation characteristics generated by the antenna at the first resonance frequency and the second resonance frequency are basically the same.

Figure 39:
FIG. 39 is a schematic diagram of a principle structure of an antenna in a fifth reference design, where there is one radiator and the radiator is formed by using a metal side frame of an electronic device.

FIG. 39 is a schematic diagram of a principle structure of an antenna in a fifth reference design, where there is one radiator and the radiator is formed by using a metal side frame of an electronic device.

Simulation software is used to perform simulation analysis on the antenna in this embodiment, and the antenna in the fifth reference design, to obtain effect curve graphs shown in FIG. 40 to FIG. 43. A size and a related parameter of the antenna in the fifth reference design are the same as those of the antenna in this embodiment of this application. For a simulation parameter in this embodiment of this application, refer to the foregoing Table 3.

Figure 40:
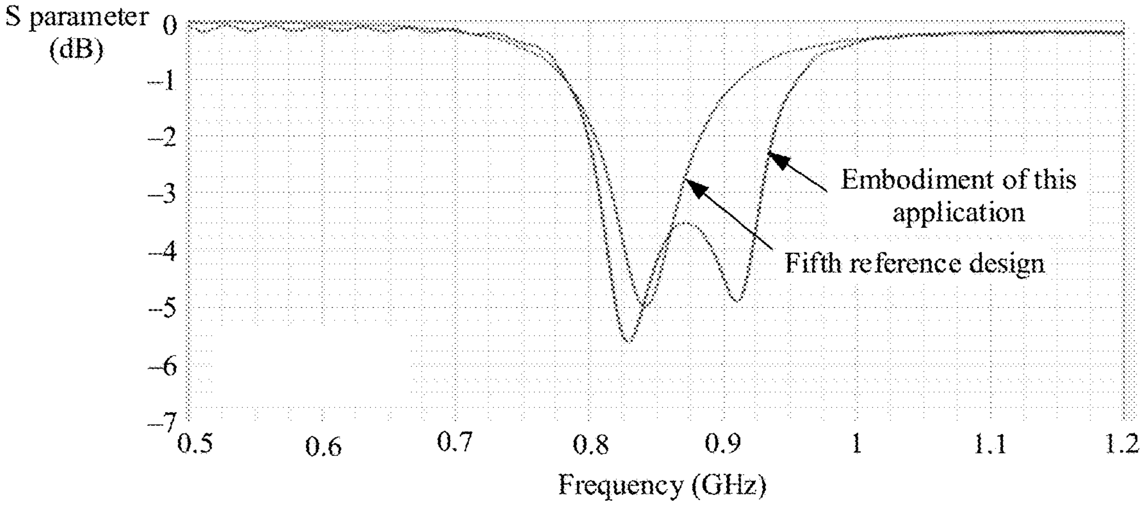
FIG. 40 is an S parameter comparison effect curve graph obtained when a simulation effect test is performed on an antenna according to an embodiment of this application and an antenna in a fifth reference design.

FIG. 40 is an S parameter comparison effect curve graph obtained when a simulation effect test is performed on an antenna according to an embodiment of this application and an antenna in a fifth reference design.

An analysis principle in FIG. 40 is similar to that in FIG. 10. Details are not described herein again. It can be learned that, compared with the antenna in the fifth reference design, the antenna in this embodiment of this application can cover more operating frequency bands under a condition of meeting same transmit efficiency.

Figure 41:
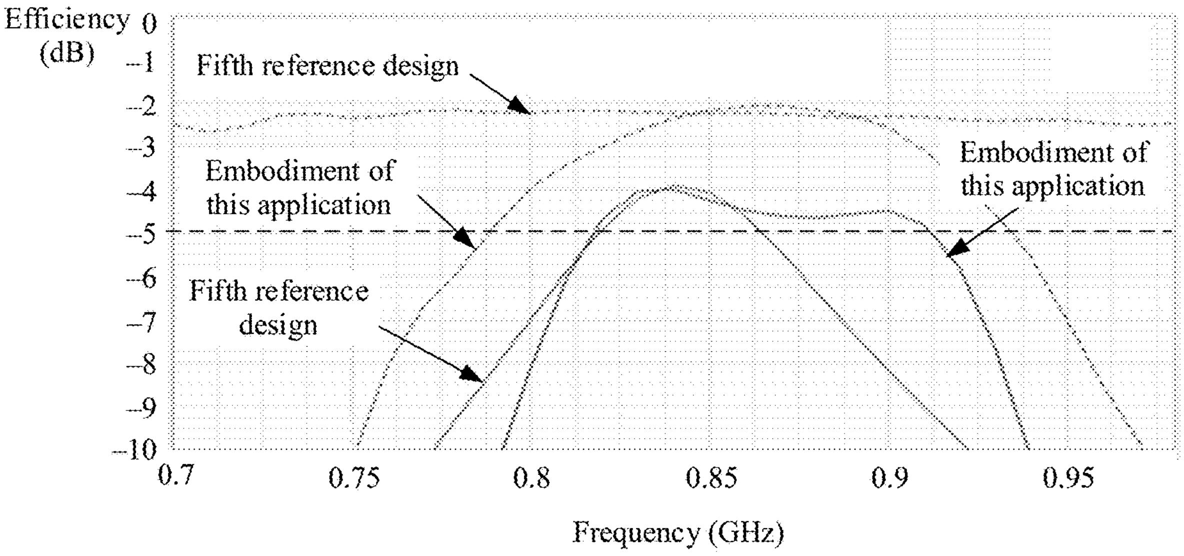
FIG. 41, FIG. 42, and FIG. 43 are respectively radiation efficiency and system efficiency (namely, efficiency) comparison effect curve graphs obtained when a simulation effect test is separately performed on an electronic device according to an embodiment of this application and an electronic device that uses an antenna in a fifth reference design in free space, a beside head and hand right scenario, and a beside head and hand left scenario.
Figure 42:
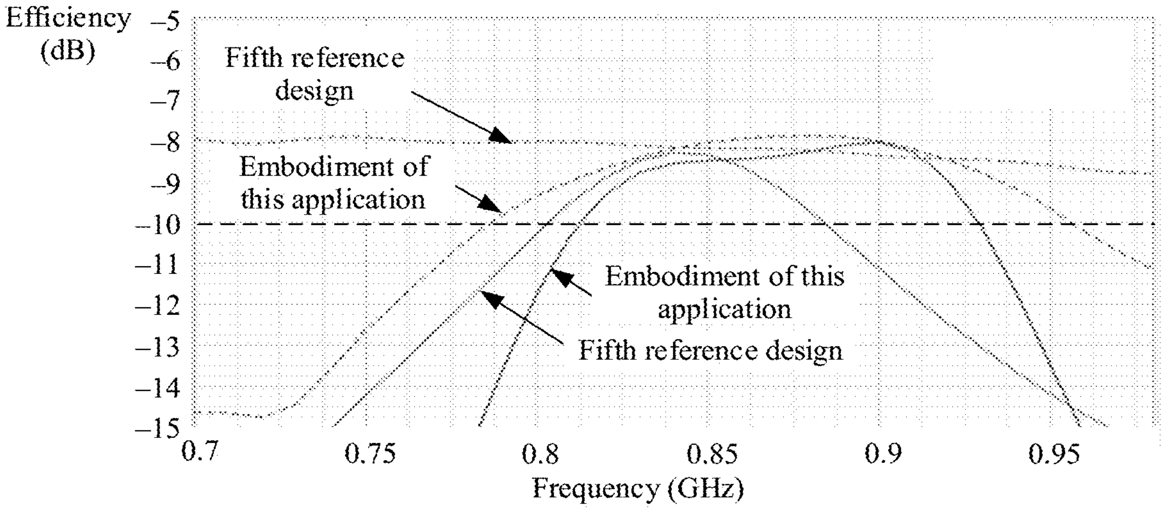
Figure 43:
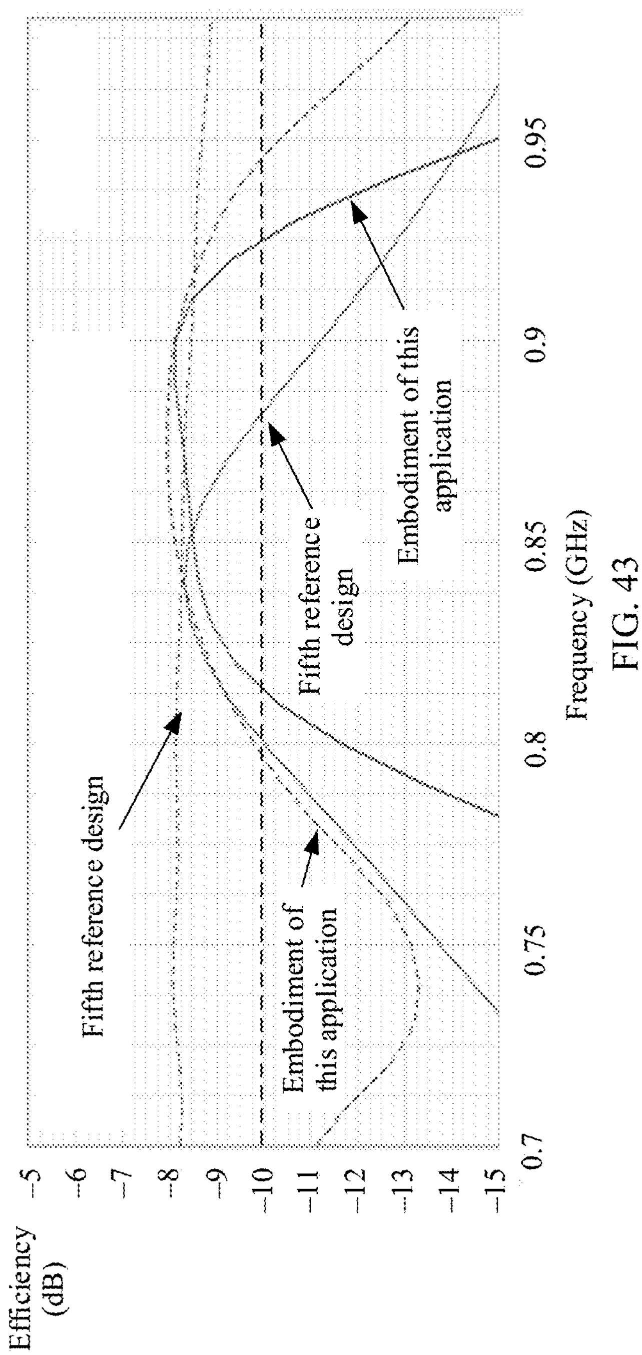

FIG. 41, FIG. 42, and FIG. 43 are respectively radiation efficiency and system efficiency (namely, efficiency) comparison effect curve graphs obtained when a simulation effect test is separately performed on an electronic device according to an embodiment of this application and an electronic device that uses an antenna in a fifth reference design in free space, a beside head and hand right scenario, and a beside head and hand left scenario.

A person skilled in the art may understand that a beside head and hand holding scenario refers to a scenario in which the electronic device is held with the hand and approaches or touches the head, for example, a call scenario. A beside head and hand left scenario refers to a scenario in which the electronic device is held with the left hand and approaches or touches the head. A beside head and hand right scenario refers to a scenario in which the electronic device is held with the right hand and approaches or touches the head. A free space scenario refers to a scenario in which the electronic device is in a free placement state, for example, a scenario in which the electronic device is freely placed on a platform (for example, a table) or a mobile phone fixing bracket.

It can be learned from FIG. 41, FIG. 42, and FIG. 43 that, regardless of whether in free space, a beside head and hand left scenario, or a beside head and hand right scenario, under a condition of meeting specific system efficiency, the antenna in this embodiment of this application can excite two resonance modes to cover a wide operating frequency band, thereby significantly improving efficiency bandwidth.

Figure 44:
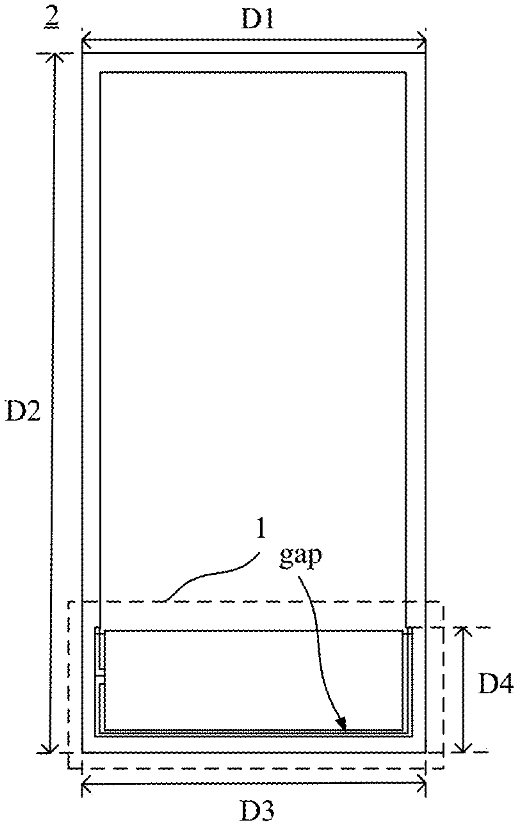
FIG. 44 is a schematic diagram of a three-dimensional structure of an electronic device according to an embodiment of this application.
Figure 45A:
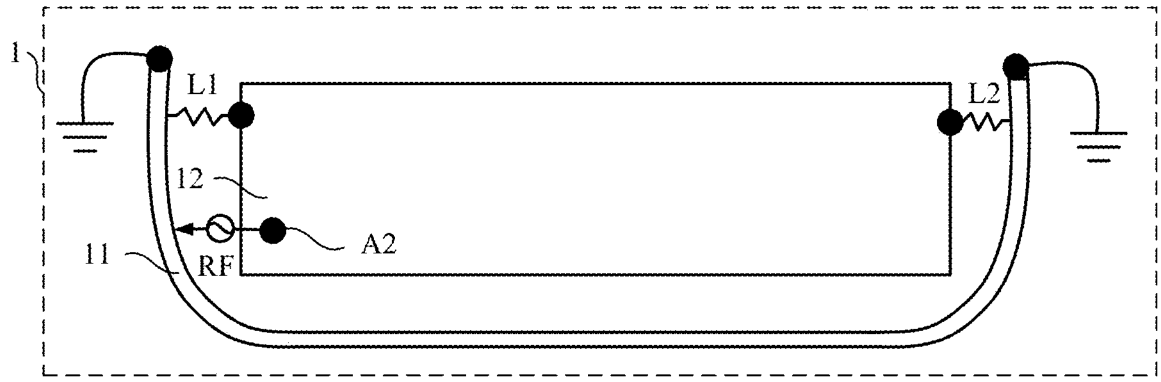
FIG. 45*a* and FIG. 45*b* are schematic diagrams of a principle structure of an antenna according to an embodiment of this application, where the antenna in FIG. 45*a* uses a differential feed structure, and the antenna in FIG. 45*b* uses a distributed feed structure.

FIG. 44 is a schematic diagram of a three-dimensional structure of an electronic device according to an embodiment of this application, where an antenna of the electronic device uses a structure shown in FIG. 45*a*. FIG. 45*a*, FIG. 45*b*, FIG. 45*c*, and FIG. 45*d* are schematic diagrams of a principle structure of an antenna according to an embodiment of this application.

Figure 45B:
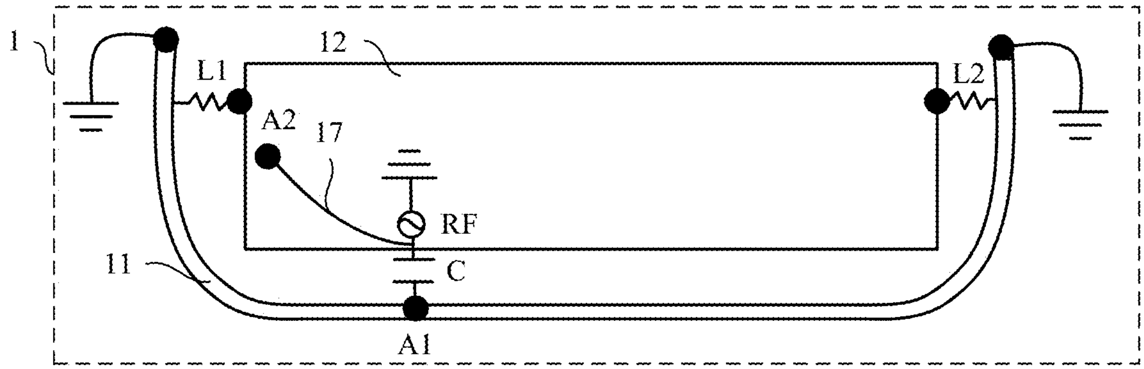
Figure 45C:
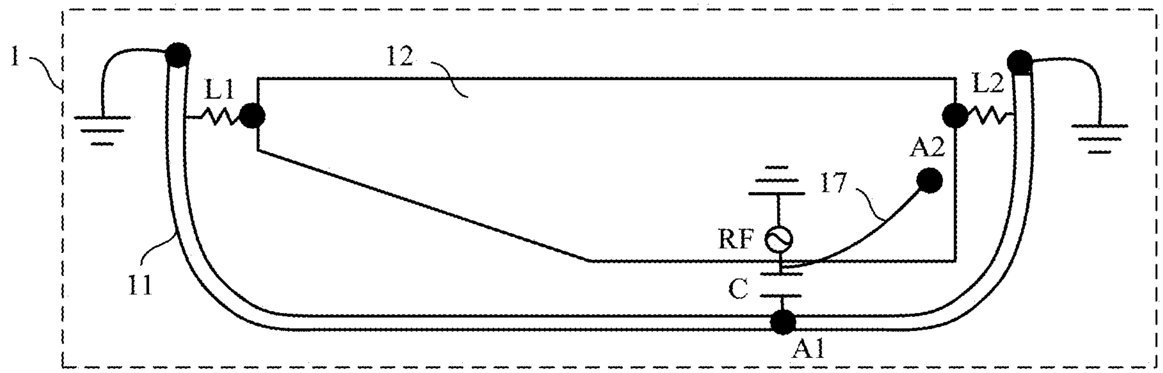
FIG. 45*c* and FIG. 45*d* are schematic diagrams of a principle structure of an antenna according to an embodiment of this application, where a second radiator in FIG. 45*c* uses a specially-shaped conductive member, and a second radiator in FIG. 45*d* uses a metasurface structure.
Figure 45D:
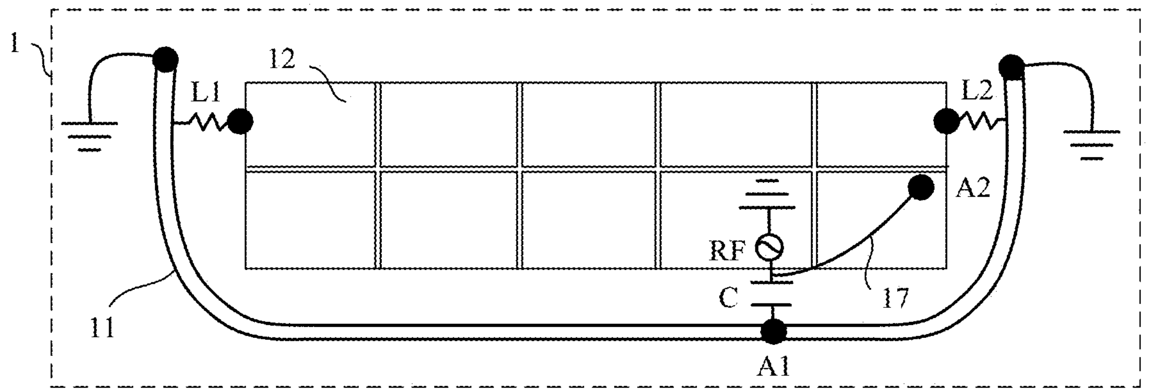

The antenna structure in FIG. 45*a* is basically the same as the structure in FIG. 33*a*, and a difference lies in that: The second radiator 12 of the antenna is formed by using a conductive member disposed in the electronic device. In an implementation, the second radiator 12 is attached to an inner surface of a rear cover of the electronic device. In an implementation, a height of the second radiator 12 exceeds the metal side frame by a specific distance in a thickness direction of the electronic device, for example, exceeds 0 mm to 1 mm, or may exceed 0.7 mm. In an implementation, the antenna is fed by using a differential feed structure. In an implementation, as shown in FIG. 45*b*, the antenna may alternatively be fed by using a distributed feed structure. In an implementation, as shown in FIG. 45*c*, the second radiator of the antenna may use a specially-shaped conductive member. In an implementation, as shown in FIG. 45*d*, the second radiator of the antenna may alternatively use a metasurface structure. For the metasurface structure, refer to the foregoing description.

Figure 46:
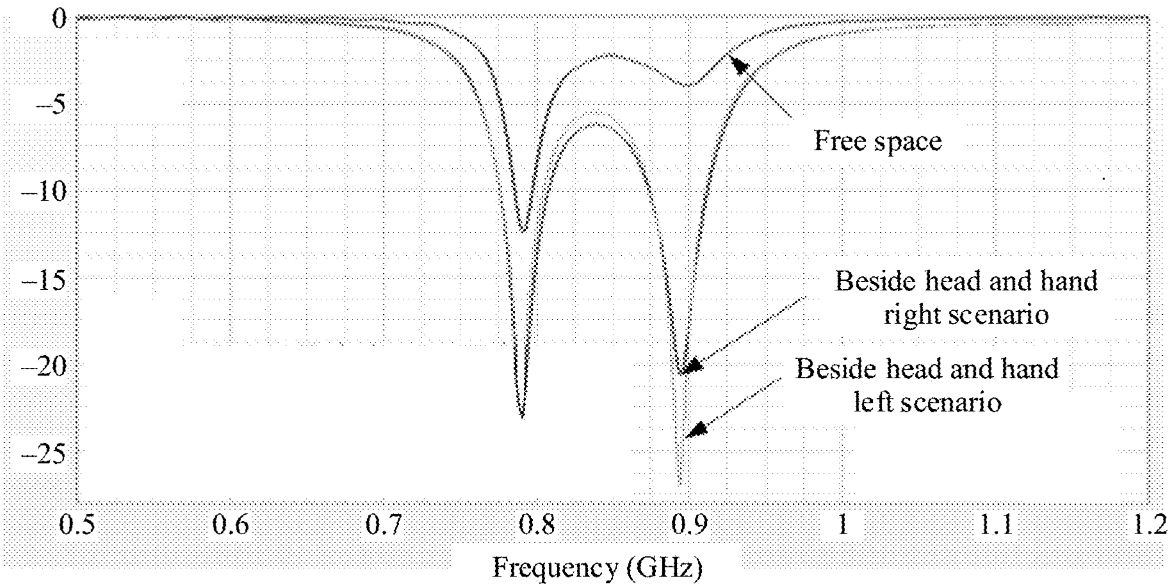
FIG. 46 is an S parameter comparison effect curve graph obtained when a simulation effect test is separately performed on an electronic device according to an embodiment of this application in free space, a beside head and hand right scenario, and a beside head and hand left scenario.
Figure 47:
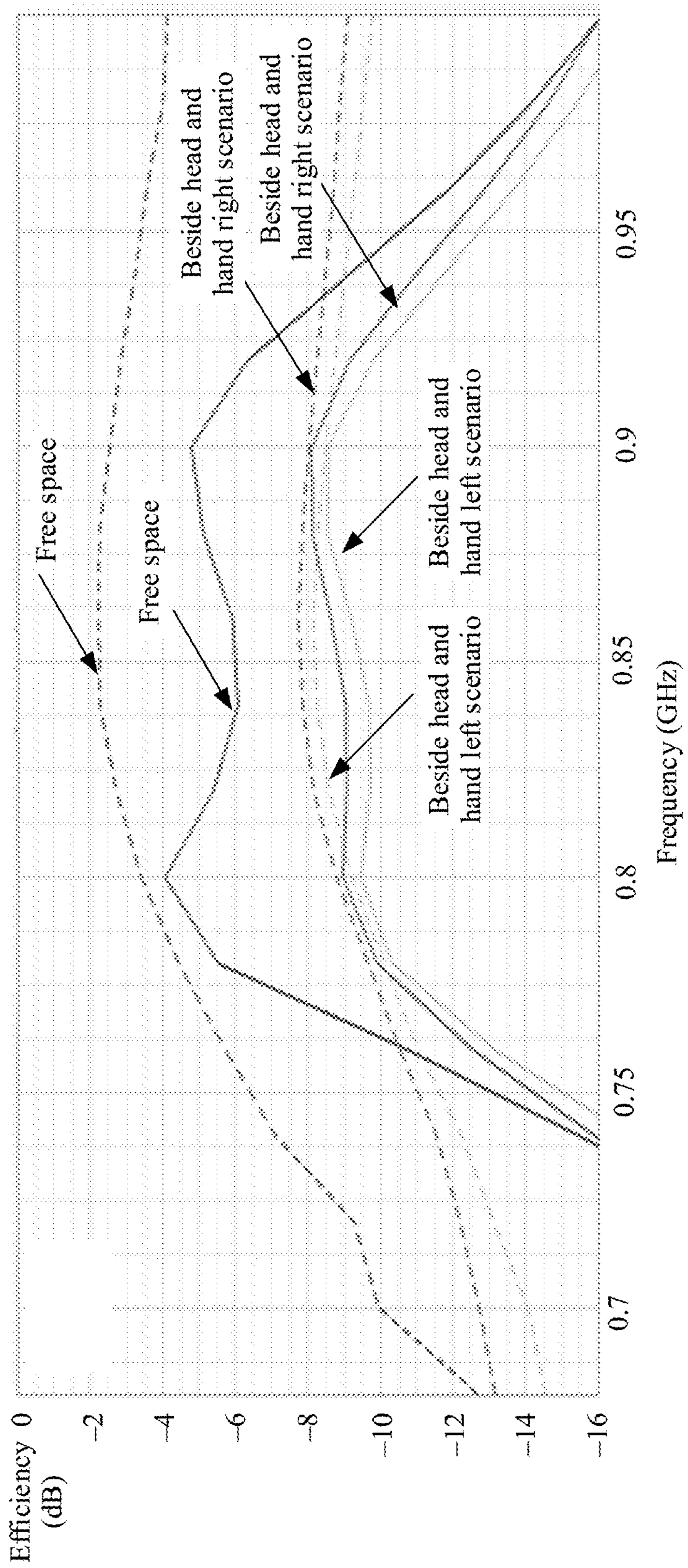
FIG. 47 is a radiation efficiency and system efficiency (namely, efficiency) comparison effect curve graph obtained when a simulation effect test is separately performed on an electronic device according to an embodiment of this application in free space, a beside head and hand right scenario, and a beside head and hand left scenario.

Simulation software is used to perform simulation analysis on the antenna in the electronic device in this embodiment, to obtain effect curve graphs shown in FIG. 46 and FIG. 47.

Simulation effect parameters of the obtained curve graphs shown in FIG. 46 and FIG. 47 are shown in Table 4 below (which is understood with reference to FIG. 44).

TABLE 4

| Parameters | This embodiment |
|---|---|
| Width D1 (mm) of the electronic device | 78 |
| Length D2 (mm) of the electronic device | 158 |
| Distance D3 (mm) between two ends of the first radiator | 78 |
| Distance D4 (mm) between the first end of the first radiator and a bottom edge of the electronic device | 28 |
| Length of the first radiator 11 | ½ times an operating wavelength of the radiator |
| Length of the second radiator 12 | ½ times an operating wavelength of the radiator |
| Gap (mm) between the first radiator 11 and the second radiator 12 | 1 |
| Distance h (mm) between an upper surface of a radiator and the PCB board 20 | 3 mm |
| Grounding component | Inductance value of L1 = inductance value of L2 = 0.5 nH |
| First matching component | / |
| Feed manner | A differential feed structure is used |

FIG. 46 is an S parameter comparison effect curve graph obtained when a simulation effect test is separately performed on an electronic device according to an embodiment of this application in free space, a beside head and hand right scenario, and a beside head and hand left scenario. FIG. 47 is a radiation efficiency and system efficiency (namely, efficiency) comparison effect curve graph obtained when a simulation effect test is separately performed on an electronic device according to an embodiment of this application in free space, a beside head and hand right scenario, and a beside head and hand left scenario.

An analysis principle in FIG. 46 is similar to that in FIG. 10, and an analysis principle in FIG. 47 is similar to that in each of FIG. 41, FIG. 42, and FIG. 43. Details are not described herein again. It can be learned that a lower resonance is generated by the first radiator (a metal side frame), and a higher resonance is generated by the second radiator (a conductive member). In this embodiment of this application, more operating frequency bands can be covered under a condition of meeting same transmit efficiency in free space, a beside head and hand left scenario, and a beside head and hand right scenario. In addition, under a condition of meeting specific system efficiency condition, the antenna in this embodiment of this application can excite two resonance modes to cover a wide operating frequency band, thereby significantly improving efficiency bandwidth.

Figure 48A:
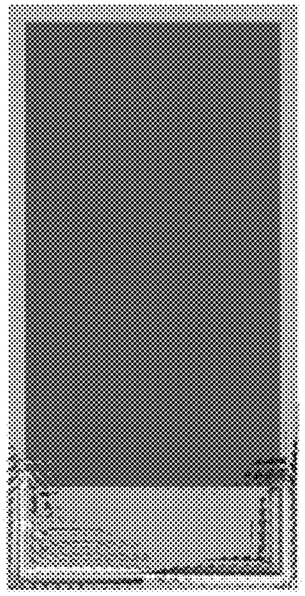
FIG. 48*a* and FIG. 48*b* are current patterns obtained when a simulation effect test is performed on an antenna according to an embodiment of this application at different resonance frequencies.
Figure 48B:
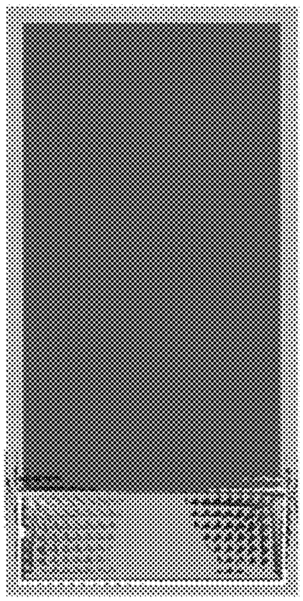
Figure 49A:
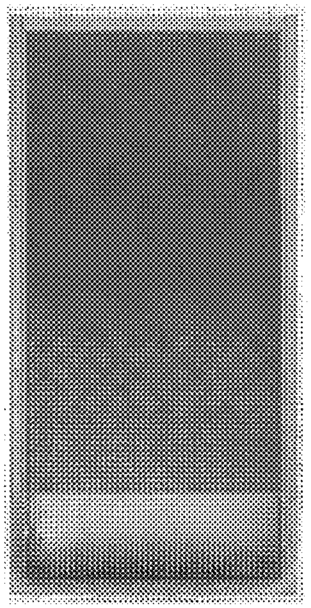
FIG. 49*a* and FIG. 49*b* are electric field patterns obtained when a simulation effect test is performed on an antenna according to an embodiment of this application at different resonance frequencies.
Figure 49B:
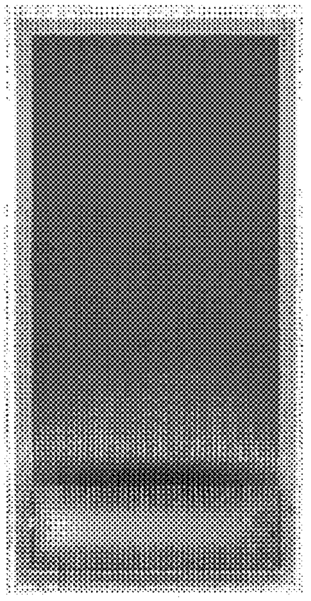
Figure 50A:
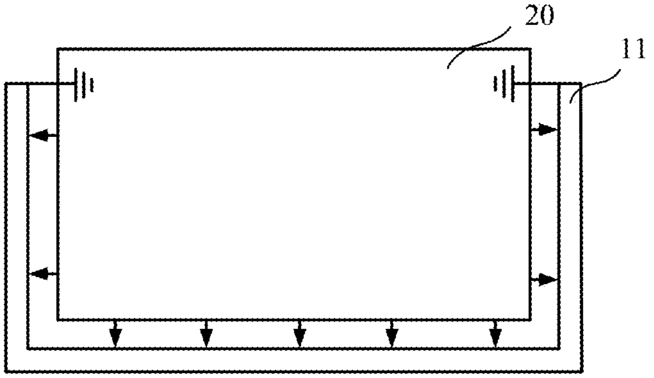
FIG. 50*a* and FIG. 50*b* are schematic diagrams of an electric field direction of an electronic device according to an embodiment of this application.
Figure 50B:
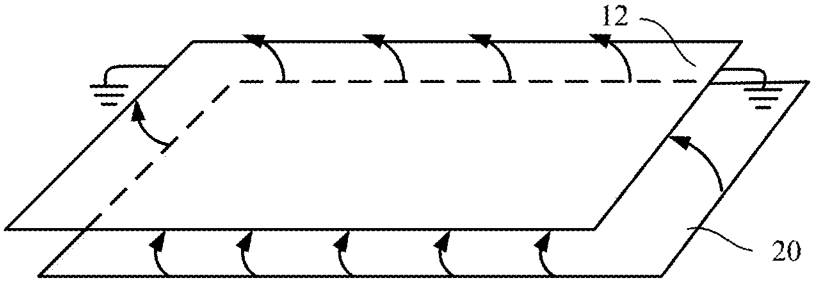
Figure 51A:
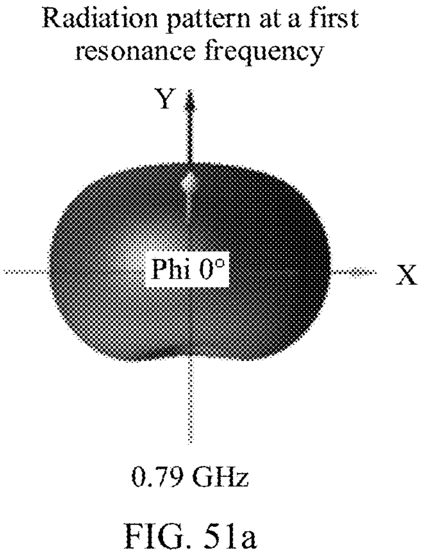
FIG. 51*a* and FIG. 51*b* are radiation patterns obtained when a simulation effect test is performed on an antenna according to an embodiment of this application at different resonance frequencies.
Figure 51B:
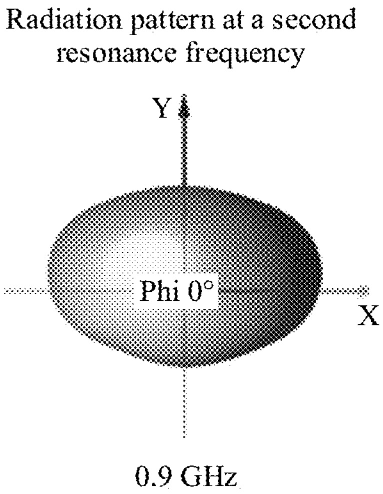

FIG. 48*a* and FIG. 48*b* are current patterns obtained when a simulation effect test is performed on an antenna according to an embodiment of this application at different resonance frequencies. FIG. 49*a* and FIG. 49*b* are electric field patterns obtained when a simulation effect test is performed on an antenna according to an embodiment of this application at different resonance frequencies. FIG. 50*a* and FIG. 50*b* are schematic diagrams of an electric field direction of an electronic device according to an embodiment of this application. FIG. 51*a* and FIG. 51*b* are radiation patterns obtained when a simulation effect test is performed on an antenna according to an embodiment of this application at different resonance frequencies.

Analysis principles in FIG. 48*a* to FIG. 49*b* are similar to those in FIG. 12*a* to FIG. 14*b*. Details are not described herein again. It can be learned that electric fields generated by the two radiators in the antenna are all in a direction from the ground to the radiator. It can be learned from FIG. 51*a* and FIG. 51*b* that radiation directions of the antenna at a first resonance frequency of 0.79 GHz and a second resonance frequency of 0.9 GHz are both horizontal radiation directions, and are approximately the same. It can be learned that currents, electric fields, and radiation characteristics generated by the antenna at the first resonance frequency and the second resonance frequency are basically the same.

Figure 52:
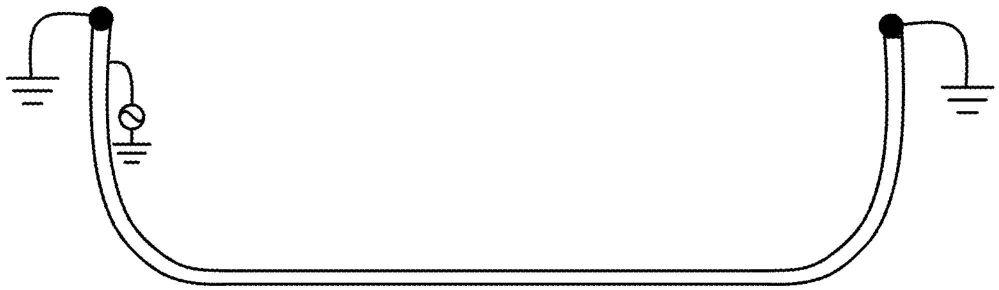
FIG. 52 is a schematic diagram of a structure of an antenna in a sixth reference design, where there is one radiator and the radiator is formed by using a metal side frame of an electronic device, and a feed connection point of the antenna is close to an end of the radiator.

FIG. 52 is a schematic diagram of a structure of an antenna in a sixth reference design, where there is one radiator and the radiator is formed by using a metal side frame of an electronic device, and a feed connection point of the antenna is close to an end of the radiator.

Figure 53:
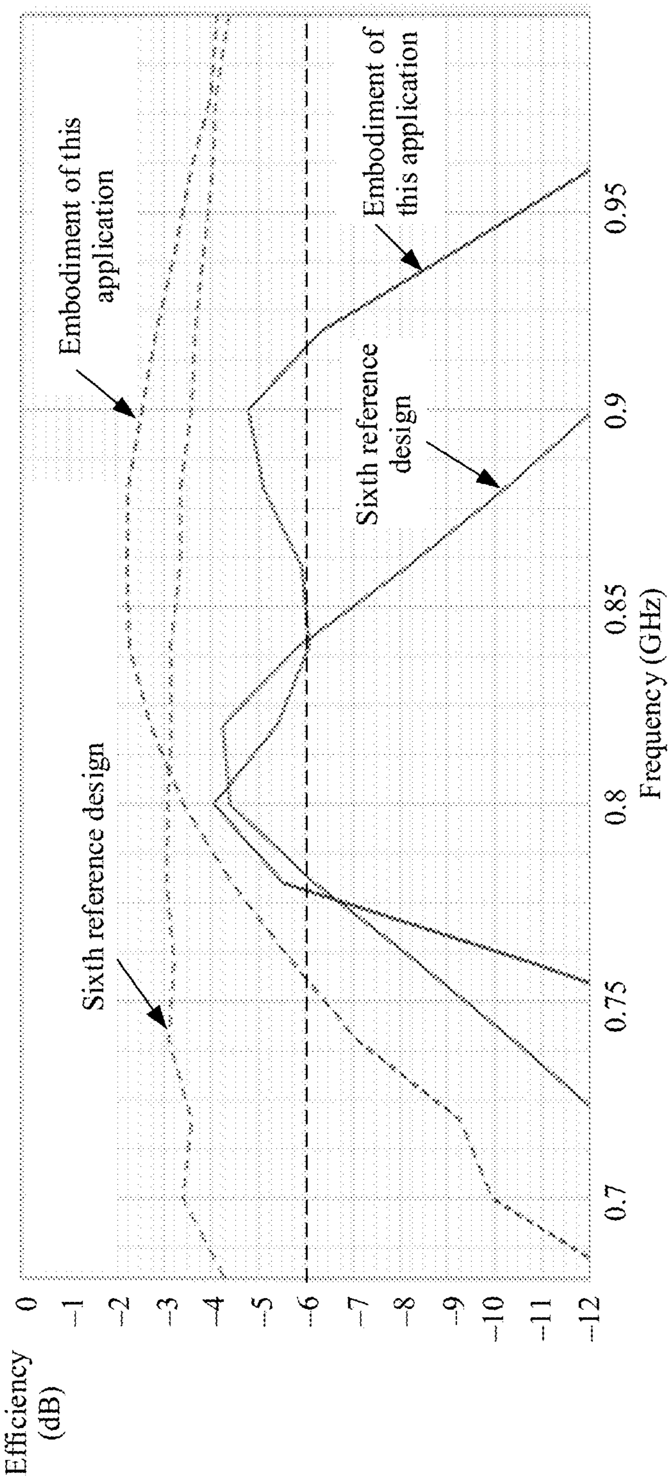
FIG. 53 is a radiation efficiency and system efficiency (namely, efficiency) comparison effect curve graph obtained when a simulation effect test is separately performed on an electronic device according to an embodiment of this application and an electronic device that uses an antenna in a sixth reference design in free space.
Figure 54:
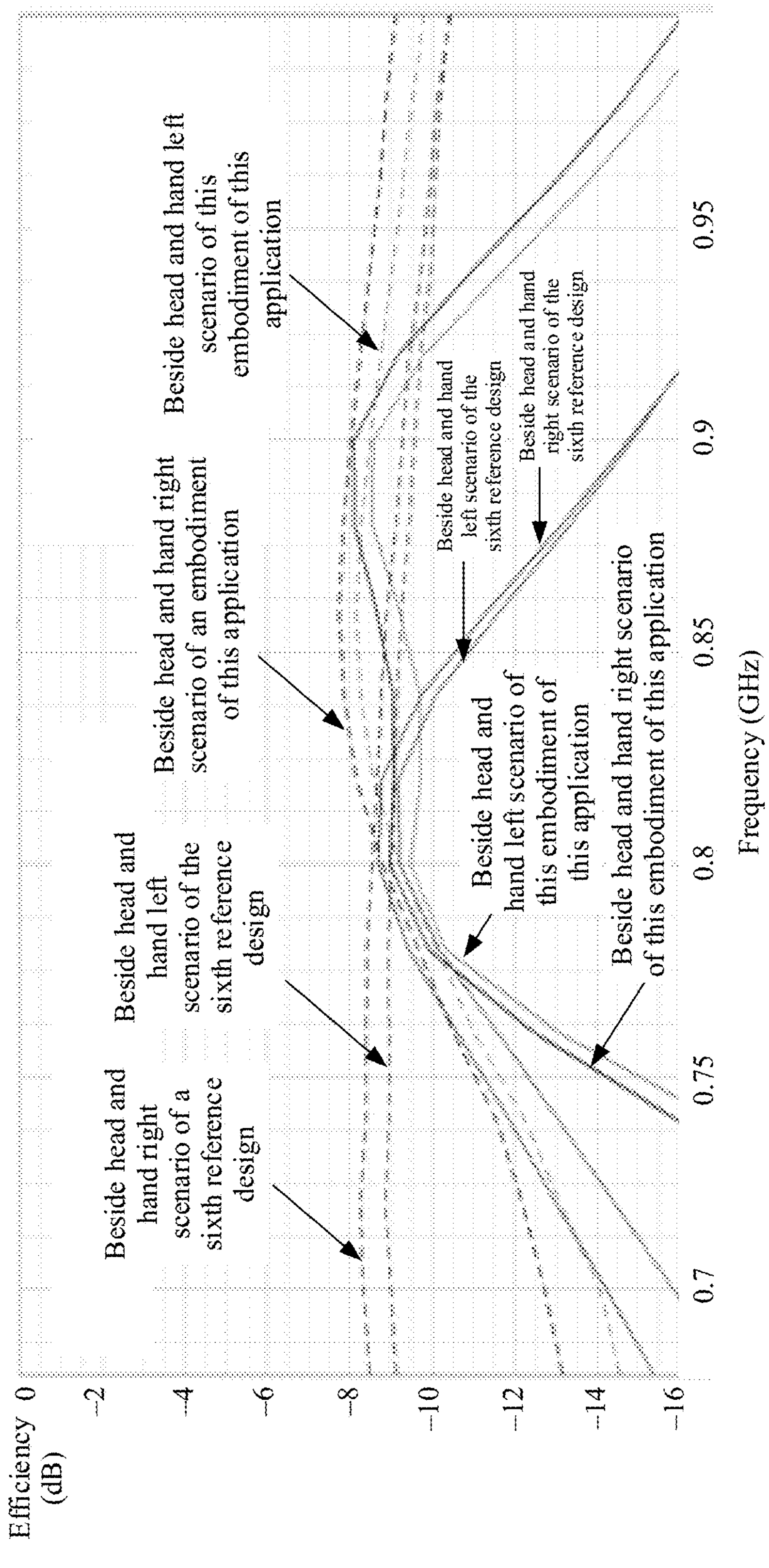
FIG. 54 is a radiation efficiency and system efficiency (namely, efficiency) comparison effect curve graph obtained when a simulation effect test is separately performed on an electronic device according to an embodiment of this application and an electronic device that uses an antenna in a sixth reference design in a beside head and hand right scenario and a beside head and hand left scenario.

Simulation software is used to perform simulation analysis on the antenna in this embodiment, and the antenna in the sixth reference design, to obtain effect curve graphs shown in FIG. 53 and FIG. 54. A size and a related parameter of the antenna in the sixth reference design are the same as those of the antenna in this embodiment of this application. For a simulation parameter in this embodiment of this application, refer to the foregoing Table 4. It can be learned from FIG. 53 that, compared with the antenna in the sixth reference design, the antenna in this embodiment of this application is improved by approximately 1 dB in radiation efficiency and is approximately doubled in efficiency bandwidth in a same frequency band. It can be learned from FIG. 54 that, regardless of whether in free space, a beside head and hand left scenario, or a beside head and hand right scenario, under a condition of meeting specific system efficiency, the antenna in this embodiment of this application can excite two resonance modes to cover a wide operating frequency band, thereby significantly improving efficiency bandwidth.

Figure 55:
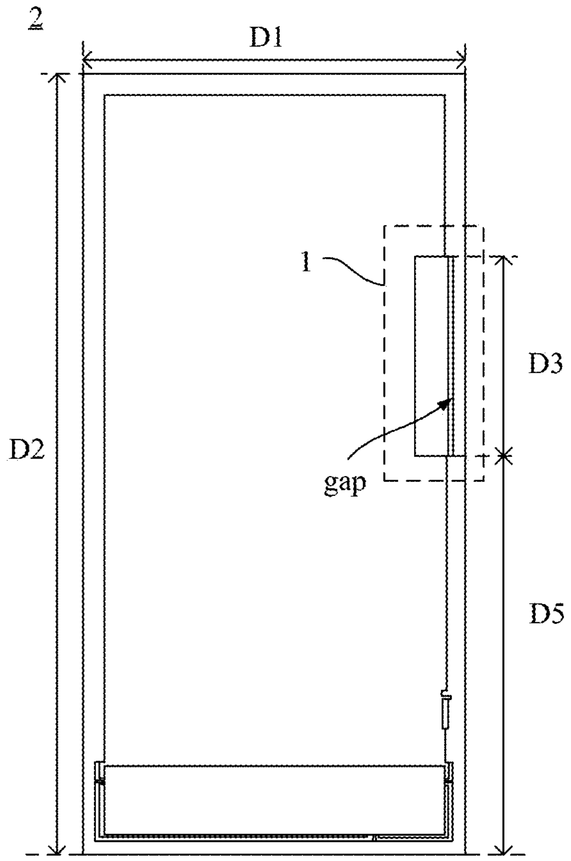
FIG. 55 is a schematic diagram of a three-dimensional structure of an electronic device according to an embodiment of this application.
Figure 56:
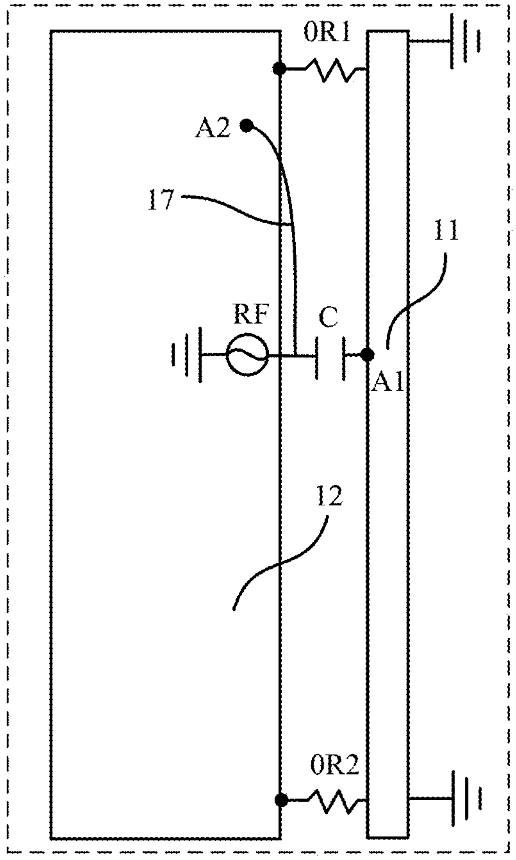
FIG. 56 is a schematic diagram of a structure of an antenna according to an embodiment of this application.

FIG. 55 is a schematic diagram of a three-dimensional structure of an electronic device according to an embodiment of this application. FIG. 56 is a schematic diagram of a structure of an antenna according to an embodiment of this application. The antenna structure in FIG. 56 is basically the same as the structure in FIG. 45*b*. A difference lies in that: The antenna is located on a side edge of the electronic device, and the first radiator 11 is formed by using a metal side frame of the electronic device, and is strip-shaped. In an embodiment, the second radiator 12 is formed by using a conductive member of the electronic device. In an embodiment, the second radiator 12 is plate-shaped/sheet-shaped. In an embodiment, both the first radiator 11 and the second radiator 12 are strip-shaped. In an embodiment, the grounding component uses a jumper resistor 0R1 and a jumper resistor 0R2.

In this embodiment of this application, that the antenna is located on a side edge of the electronic device may mean that the antenna is located on a left side edge or a right side edge of the electronic device. Specifically, the antenna may be located on a right side of the electronic device and above a middle part. Simulation software is used to perform simulation analysis on the antenna in the electronic device in this embodiment, to obtain effect curve graphs shown in FIG. 57 and FIG. 58.

Figure 57:
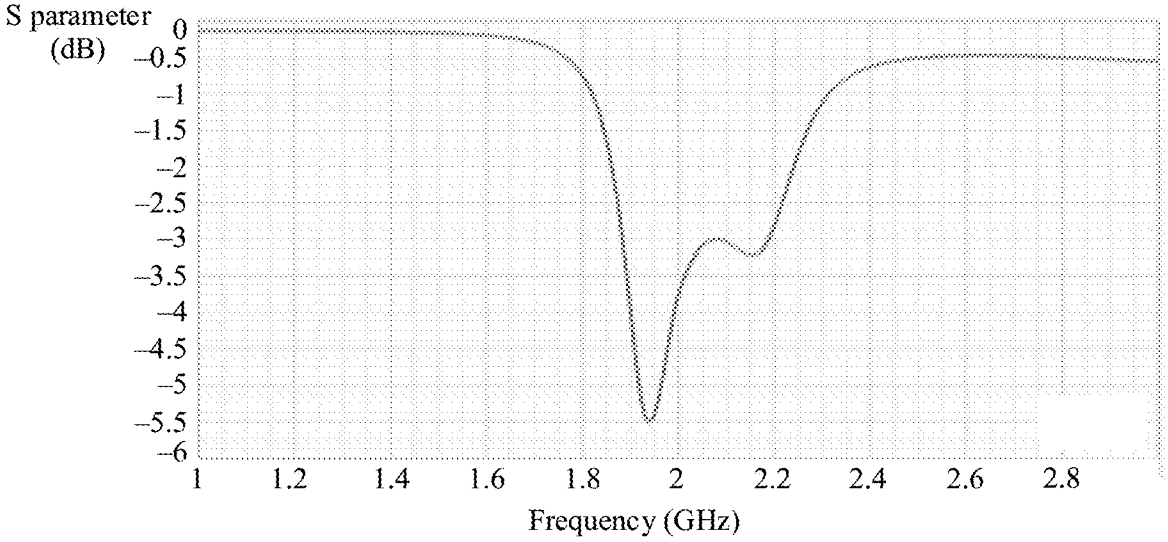
FIG. 57 and FIG. 58 are respectively an S parameter effect curve graph and a radiation efficiency and system efficiency (namely, efficiency) comparison effect curve graph that are obtained when a simulation effect test is performed on an electronic device according to an embodiment of this application.
Figure 58:
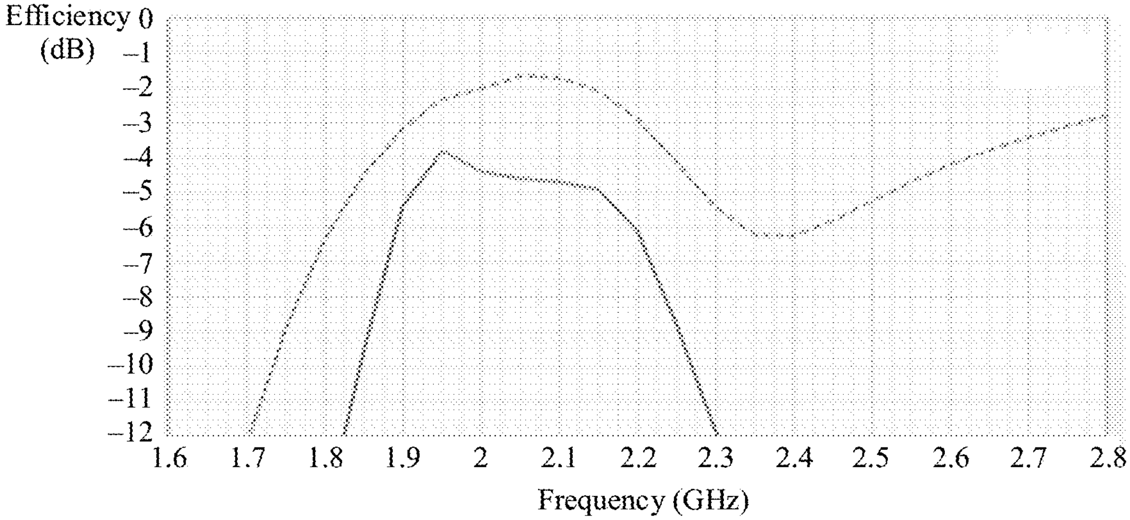

Simulation effect parameters of the obtained curve graphs shown in FIG. 57 and FIG. 58 are shown in Table 5 below (which is understood with reference to FIG. 55).

TABLE 5

| Parameters | This embodiment |
|---|---|
| Width D1 (mm) of the electronic device | 78 |
| Length D2 (mm) of the electronic device | 158 |
| Length D3 (mm) of the first radiator 11 | 40 |
| Length D3 (mm) of the second radiator 12 | 40 |
| Distance D5 (mm) between a bottom of the antenna and a bottom of the electronic device | 81 |
| Gap (mm) between the first radiator 11 and the second radiator 12 | 1 |
| Distance h (mm) between an upper surface of a radiator and the PCB board 20 | 3 |
| Grounding component | Jumper resistor (zero-ohm resistor) |
| First matching component | Capacitance value of C = 1 pF |
| Feed manner | A distributed feed structure is used |

FIG. 57 and FIG. 58 are respectively an S parameter effect curve graph and a radiation efficiency and system efficiency (namely, efficiency) comparison effect curve graph that are obtained when a simulation effect test is performed on an electronic device according to an embodiment of this application.

Analysis principles in FIG. 57 and FIG. 58 are similar to those in FIG. 10 and FIG. 11. Details are not described herein again. The antenna in this embodiment of this application can excite two resonance modes. In an implementation, a higher resonance of 2.16 GHz is generated by the second radiator 12, and a lower resonance of 1.94 GHz is generated by the first radiator 11. It can be learned that, in this embodiment of this application, more operating frequency bands can be covered under a condition of meeting same transmit efficiency. In addition, in a same frequency band, under a condition of meeting specific system efficiency, the antenna in this embodiment of this application can excite two resonance modes to cover a wide operating frequency band, thereby significantly improving efficiency bandwidth.

Figure 59A:
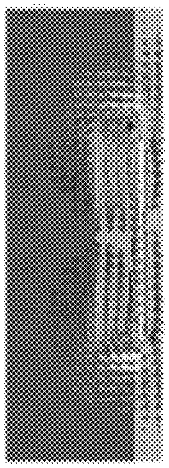
FIG. 59*a* and FIG. 59*b* are current patterns obtained when a simulation effect test is performed on an antenna according to an embodiment of this application at different resonance frequencies.
Figure 59B:
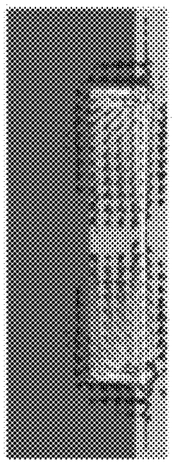
Figure 60A:
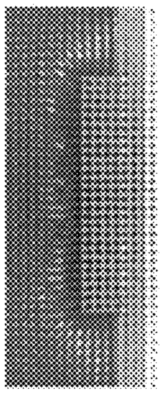
FIG. 60*a* and FIG. 60*b* are electric field patterns obtained when a simulation effect test is performed on an antenna according to an embodiment of this application at different resonance frequencies.
Figure 60B:
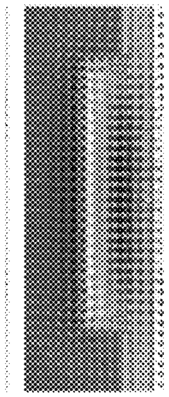
Figure 61A:
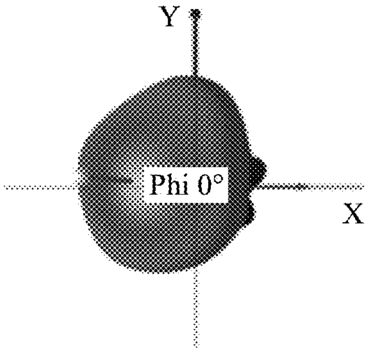
FIG. 61*a* and FIG. 61*b* are radiation patterns obtained when a simulation effect test is performed on an antenna according to an embodiment of this application at different resonance frequencies.
Figure 61B:
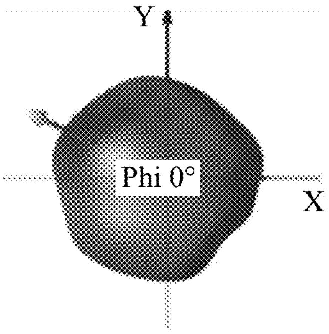

FIG. 59*a* and FIG. 59*b* are current patterns obtained when a simulation effect test is performed on an antenna according to an embodiment of this application at different resonance frequencies. FIG. 60*a* and FIG. 60*b* are electric field patterns obtained when a simulation effect test is performed on an antenna according to an embodiment of this application at different resonance frequencies. FIG. 61*a* and FIG. 61*b* are radiation patterns obtained when a simulation effect test is performed on an antenna according to an embodiment of this application at different resonance frequencies.

Analysis principles in FIG. 59*a* to FIG. 61*b* are similar to those in FIG. 12*a* to FIG. 14*b*. It can be learned that electric fields generated by two radiators in the antenna are all in a direction from the ground to the radiator. It can be learned from FIG. 61*a* to FIG. 61*b* that radiation directions of the antenna at a first resonance frequency and a second resonance frequency are approximately the same. Therefore, it can be learned that currents, electric fields, and radiation characteristics generated by the antenna at the first resonance frequency and the second resonance frequency are basically the same.

Figure 62:
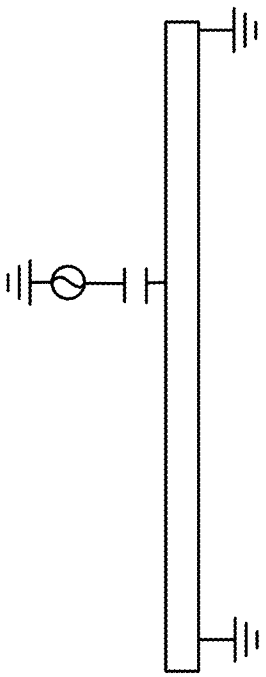
FIG. 62 is a schematic diagram of a principle structure of an antenna in a seventh reference design, where there is one radiator and the radiator is formed by using a metal side frame of an electronic device.

FIG. 62 is a schematic diagram of a principle structure of an antenna in a seventh reference design, where there is one radiator and the radiator is formed by using a metal side frame of an electronic device.

Figure 63:
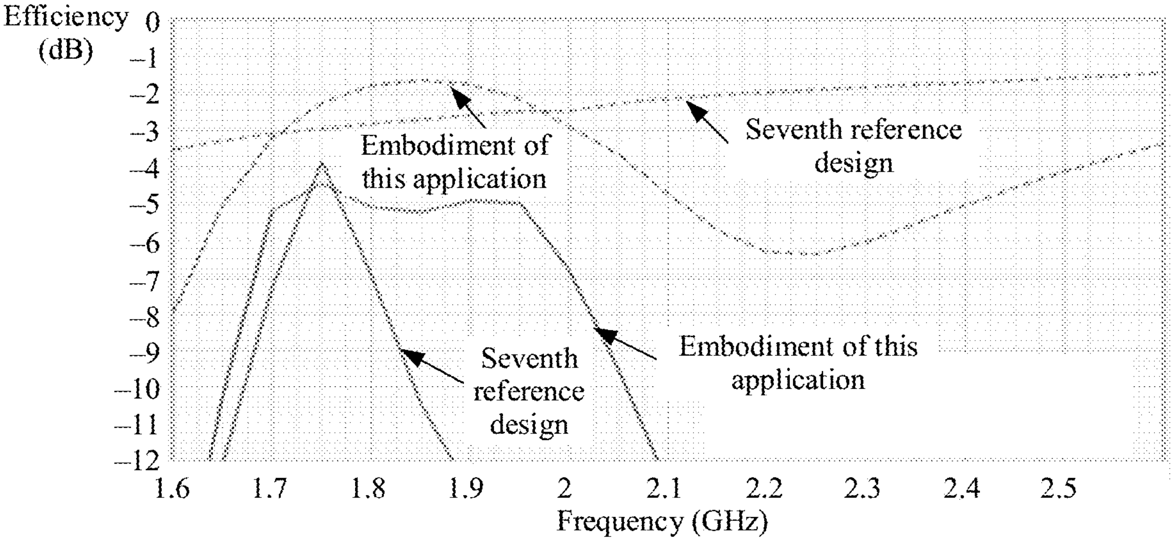
FIG. 63 is a radiation efficiency and system efficiency (namely, efficiency) comparison effect curve graph obtained when a simulation effect test is separately performed on an electronic device according to an embodiment of this application and an electronic device that uses an antenna in a seventh reference design in free space.
Figure 64:
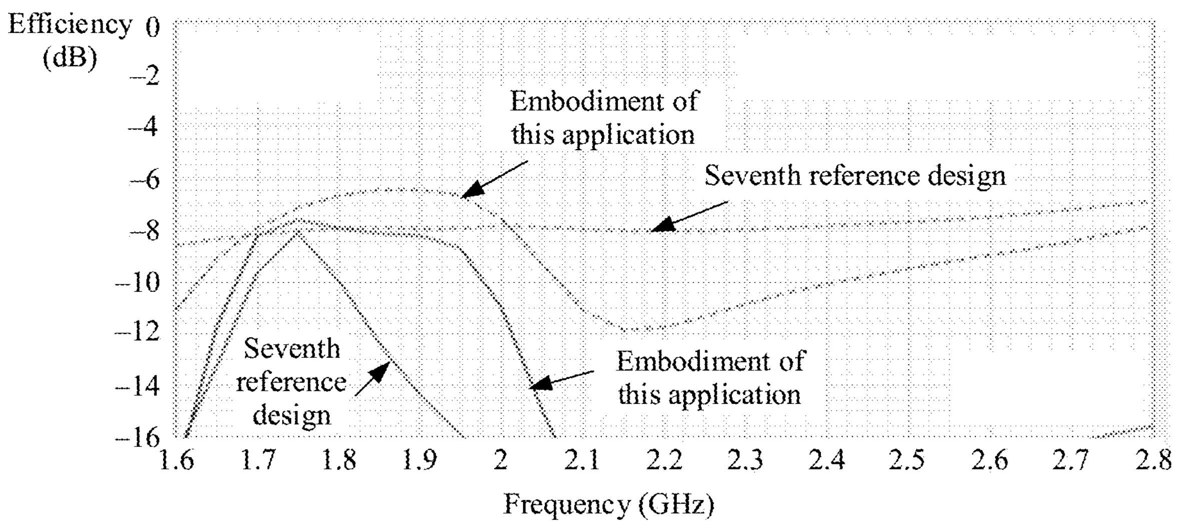
FIG. 64 is a radiation efficiency and system efficiency (namely, efficiency) comparison effect curve graph obtained when a simulation effect test is separately performed on an electronic device according to an embodiment of this application and an electronic device that uses an antenna in a seventh reference design in a beside head and hand right scenario.
Figure 65:
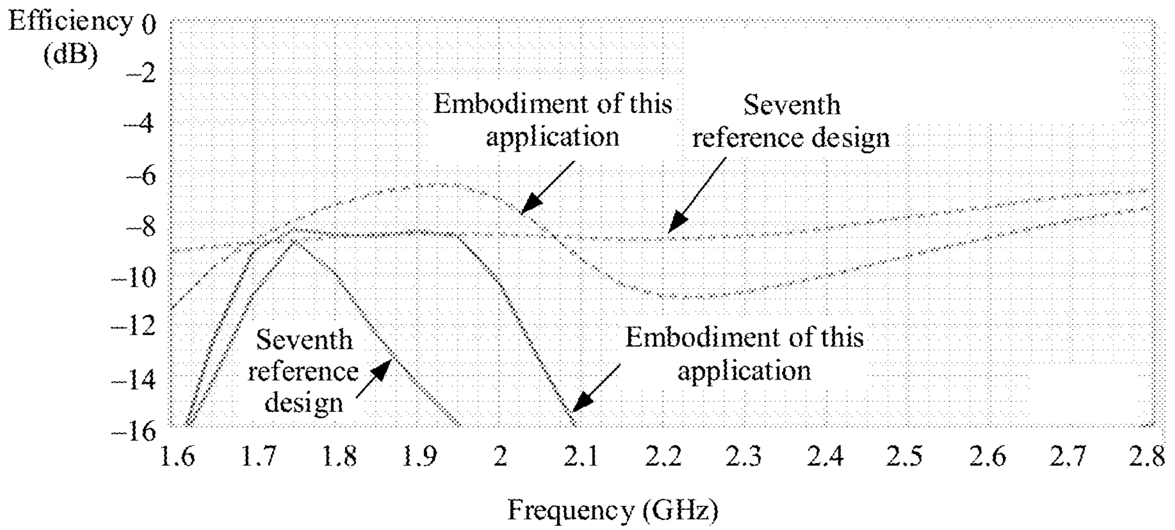
FIG. 65 is a radiation efficiency and system efficiency (namely, efficiency) comparison effect curve graph obtained when a simulation effect test is separately performed on an electronic device according to an embodiment of this application and an electronic device that uses an antenna in a seventh reference design in a beside head and hand left scenario.

Simulation software is used to perform simulation analysis on the antenna provided in this embodiment, and the antenna in the seventh reference design, to obtain effect curve graphs shown in FIG. 63 to FIG. 65. FIG. 63 is a radiation efficiency and system efficiency (namely, efficiency) comparison effect curve graph obtained when a simulation effect test is separately performed on an electronic device according to an embodiment of this application and an electronic device that uses an antenna in a seventh reference design in free space. FIG. 64 is a radiation efficiency and system efficiency (namely, efficiency) comparison effect curve graph obtained when a simulation effect test is separately performed on an electronic device according to an embodiment of this application and an electronic device that uses an antenna in a seventh reference design in a beside head and hand right scenario. FIG. 65 is a radiation efficiency and system efficiency (namely, efficiency) comparison effect curve graph obtained when a simulation effect test is separately performed on an electronic device according to an embodiment of this application and an electronic device that uses an antenna in a seventh reference design in a beside head and hand left scenario. A size and a related parameter of the antenna in the seventh reference design are the same as those of the antenna in this embodiment of this application. For a simulation parameter in this embodiment of this application, refer to the foregoing Table 5. It can be learned from FIG. 63 that, compared with the antenna in the seventh reference design, the antenna in this embodiment of this application is improved by approximately 1 dB in radiation efficiency and is approximately doubled in efficiency bandwidth in a same frequency band. It can be learned from FIG. 64 that, in the beside head and hand right scenario, compared with the antenna in the seventh reference design, the antenna in this embodiment of this application is improved by approximately 1.5 dB in radiation efficiency, and is improved by more than one time in efficiency bandwidth in a same frequency band. It can be learned from FIG. 65 that, in the beside head and hand left scenario, compared with the antenna in the seventh reference design, the antenna in this embodiment of this application is improved by approximately 2 dB in radiation efficiency and is improved by more than one time in efficiency bandwidth in a same frequency band.

Simulation software is used to perform simulation analysis on the antenna provided in this embodiment of this application and the antenna in the seventh reference design, to obtain SAR value data tables shown in Table 6 and Table 7. A size and a related parameter of the antenna in the seventh reference design are the same as those of the antenna in this embodiment of this application. For a simulation parameter in this embodiment of this application, refer to the foregoing Table 5.

TABLE 6

| This embodiment of this application | | | |
|---|---|---|---|
| Input power 24 dBm | Resonance frequency | 1.94 GHz | 2.15 GHz |
| FS system efficiency | Back-5 mm | −2.61 | −2.53 |
| | Left-5 mm | −3.35 | −4.8 |
| Simulated SAR value | Back-5 mm | 1.40 | 1.36 |
| | Left-5 mm | 0.40 | 0.36 |
| Normalized efficiency | FS normalization | −5 | −5 |
| Normalized SAR value | Back-5 mm | 0.81 | 0.77 |
| | Left-5 mm | 0.27 | 0.34 |

TABLE 7

| Seventh reference design | | |
|---|---|---|
| Input power 24 dBm | Resonance frequency | 1.94 GHz |
| FS system efficiency | Back-5 mm | −3.66 |
| | Left-5 mm | −4.08 |
| Simulated SAR value | Back-5 mm | 1.66 |
| | Left-5 mm | 0.51 |
| Normalized efficiency | FS normalization | −5 |
| Normalized SAR value | Back-5 mm | 1.22 |
| | Left-5 mm | 0.41 |

A person skilled in the art may understand that an SAR (specific absorption rate, full name in English "Specific Absorption Rate") refers to electromagnetic power absorbed by a human body tissue per unit mass, measured in W/kg. Internationally, an SAR value is commonly used to measure thermal effect by radiation of an electronic device. The normalized SAR value indicates a SAR value measured when the normalized antenna efficiency is −5 dB (the normalized efficiency shown in the table). "Back—5 mm" indicates a scenario in which a back of the electronic device is 5 mm away from a body, and "Left—5 mm" indicates a scenario in which a left side of the electronic device is 5 mm away from the body when a user watches the display.

It can be learned from Table 6 that, in this embodiment, an SAR value of the antenna measured in a scenario in which an output power is 24 dBm, a resonance frequency is 1.94 GHz, and a back of the electronic device is 5 mm away from a body is 0.81 W/kg, and an SAR value of the antenna measured in a scenario in which a left side of the electronic device is 5 mm away from the body is 0.27 W/kg. An SAR value of the antenna measured in a scenario in which a resonance frequency is 2.15 GHz and a back of the electronic device is 5 mm away from a body is 0.77 W/kg, and an SAR value of the antenna measured in a scenario in which a left side of the electronic device is 5 mm away from the body when a user watches the display is 0.34 W/kg.

It can be learned from Table 7 that, in the antenna in the seventh reference design, an SAR value of the antenna measured in a scenario in which an output power is 24 dBm, a resonance frequency is 1.94 GHZ, and a back of the electronic device is 5 mm away from a body is 1.22 W/kg, and an SAR value of the antenna measured in a scenario in which a left side of the electronic device is 5 mm away from the body when a user watches the display is 0.41 W/kg.

It can be learned that electric fields generated by the first radiator and the second radiator of the antenna in this embodiment are orthogonal, and a low SAR value characteristic of a back of a conductive member antenna can improve a high SAR value characteristic of a back of a metal side frame antenna. Therefore, compared with the antenna in the seventh reference design, the antenna in this embodiment of this application is reduced by approximately 2 dB in both SAR values on the back and the side.

Figure 66:
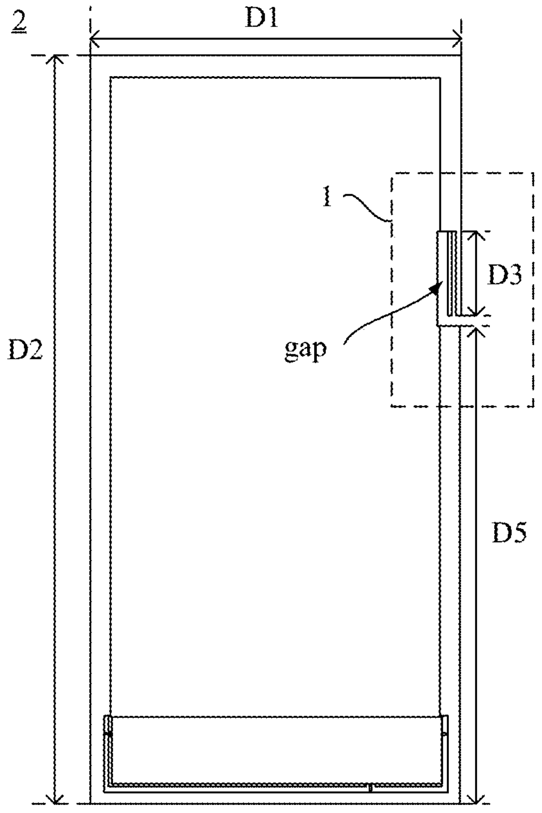
FIG. 66 is a schematic diagram of a three-dimensional structure of an electronic device according to an embodiment of this application.

FIG. 66 is a schematic diagram of a three-dimensional structure of an electronic device according to an embodiment of this application. In an embodiment, an antenna is located on a side edge of the electronic device. In an embodiment, an antenna may alternatively be located at a bottom edge or a top edge of the electronic device. In an embodiment, each of a first radiator and a second radiator is formed by using a metal side frame of the electronic device.

Figure 67:
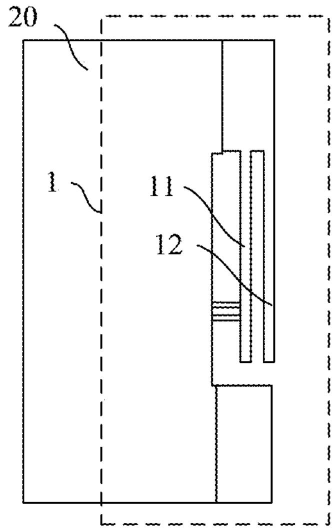
FIG. 67 and FIG. 68 are schematic diagrams of a partial three-dimensional structure of an electronic device according to an embodiment of this application, where an antenna in FIG. 67 uses a differential feed structure, and an antenna in FIG. 68 uses a distributed feed structure.
Figure 68:
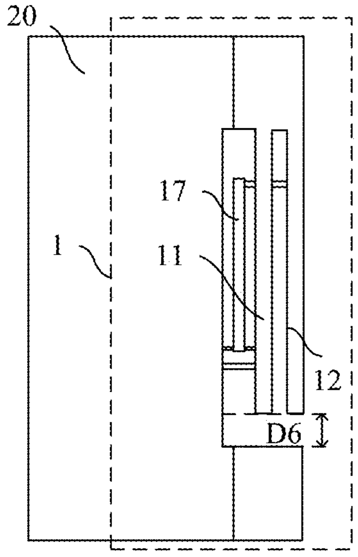

An antenna structure in this embodiment is shown in FIG. 68. For a schematic diagram of the antenna structure in FIG. 68, refer to FIG. 6*a*. The antenna structure in FIG. 68 is basically the same as the antenna structure in FIG. 55. A difference lies in that each of first radiator and the second radiator is formed by using a metal side frame of the electronic device. In an embodiment, the antenna may be formed by providing a slot in the middle of a metal side frame segment of the electronic device, and a direction of providing the slot is an extension direction of the metal side frame. In an embodiment, a second end of the first radiator is open, and a second end of the second radiator is open. In an embodiment, the antenna uses a distributed feed structure. In an embodiment, the antenna may alternatively use a differential feed structure. As shown in FIG. 67, the antenna may be fed by using a coupled feed structure. For a schematic diagram of an antenna structure in FIG. 67, refer to FIG. 8*a*.

Figure 69:
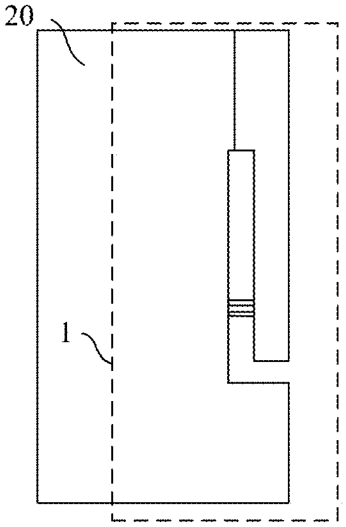
FIG. 69 is a schematic diagram of a partial three-dimensional structure of an antenna in an eighth reference design, where there is one radiator and the radiator is formed by using a metal side frame of an electronic device.
Figure 70:
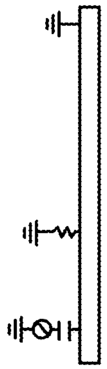
FIG. 70 is a schematic diagram of a structure of an antenna in an eighth reference design.

FIG. 69 is a schematic diagram of a partial three-dimensional structure of an antenna in an eighth reference design, where there is one radiator and the radiator is formed by using a metal side frame of an electronic device. FIG. 70 is a schematic diagram of a structure of an antenna in an eighth reference design.

In this embodiment of this application, simulation software is used to perform simulation analysis by using an antenna that uses a distributed feed structure, an antenna that uses a coupled feed structure, and an antenna in an eighth reference design, to obtain simulation comparison effect curve graphs shown in FIG. 71 to FIG. 73*b*.

Simulation effect parameters of the obtained curve graphs shown in FIG. 71 to FIG. 73*b* are shown in Table 8 below (which is understood with reference to FIG. 66 and FIG. 68).

TABLE 8

| Parameters | An implementation | Another implementation |
|---|---|---|
| Width D1 (mm) of the electronic device | 78 | 78 |
| Length D2 (mm) of the electronic device | 158 | 158 |
| Distance D5 (mm) between a bottom of the antenna and a bottom of the electronic device | 103 | 103 |
| Slot D6 (mm) between the bottom of the antenna and the metal side frame | 2 | 2 |
| Length D3 (mm) of the first radiator 11 | 18 | 18 |
| Length D3 (mm) of the second radiator 12 | 18 | 18 |
| Gap (mm) between the first radiator 11 and the second radiator 12 | 1 | 1 |
| Thickness δ (mm) of a radiator | 1 | 1 |
| Distance h (mm) between an upper surface of a radiator and the PCB board 20 | 3 | 3 |
| Grounding component | Jumper resistor (zero-ohm resistor) | Jumper resistor (zero-ohm resistor) |
| Tuning component of the first radiator | Inductance value of L = 10 nH | Inductance value of L = 7.5 nH |
| First matching component | Capacitance value of C = 1 pF | Capacitance value of C = 0.7 pF |
| Feed manner | A distributed feed structure is used | A coupled feed structure is used |

In addition, in the electronic device in this embodiment, the metal side frame may be layered in an X direction, and the metal side frame may be further filled with a uniform medium, for example, a thermoplastic PCABS with a dielectric constant of Er=3 and a loss angle of LT=0.01. The antenna in the eighth reference design has only one radiator, a thickness of the radiator is 3 mm, and another related parameter of the antenna is the same as that of an antenna (namely, an antenna that uses coupled feeding) in another implementation of this embodiment.

Figure 71:
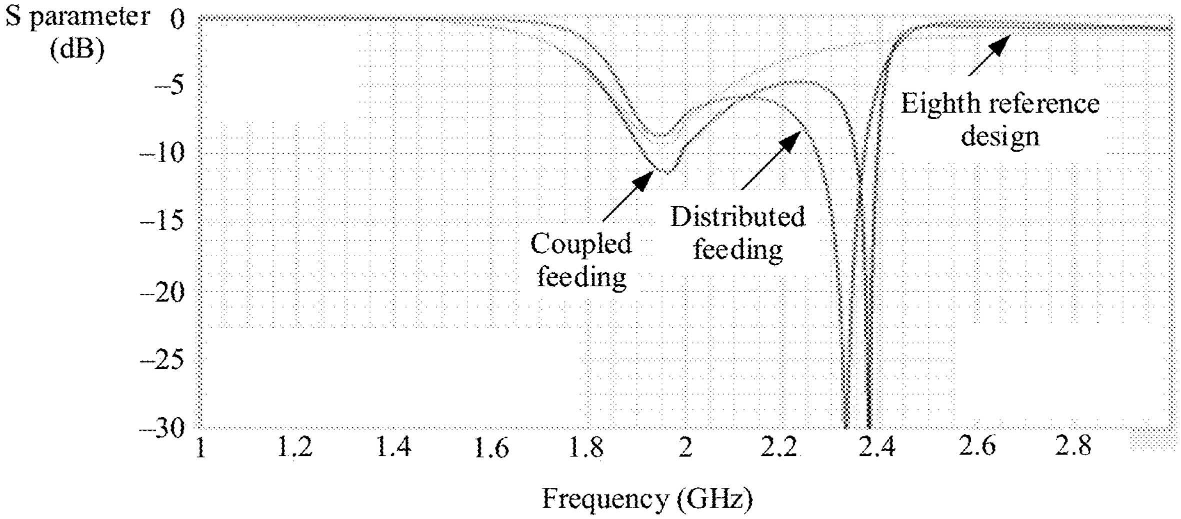
FIG. 71 and FIG. 72 are an S parameter comparison effect curve graph and a radiation efficiency and system efficiency (namely, efficiency) comparison effect curve graph that are obtained when a simulation effect test is separately performed on an electronic device according to an embodiment of this application by using a coupled feed antenna, a distributed feed antenna, and an antenna in an eighth reference design.
Figure 72:
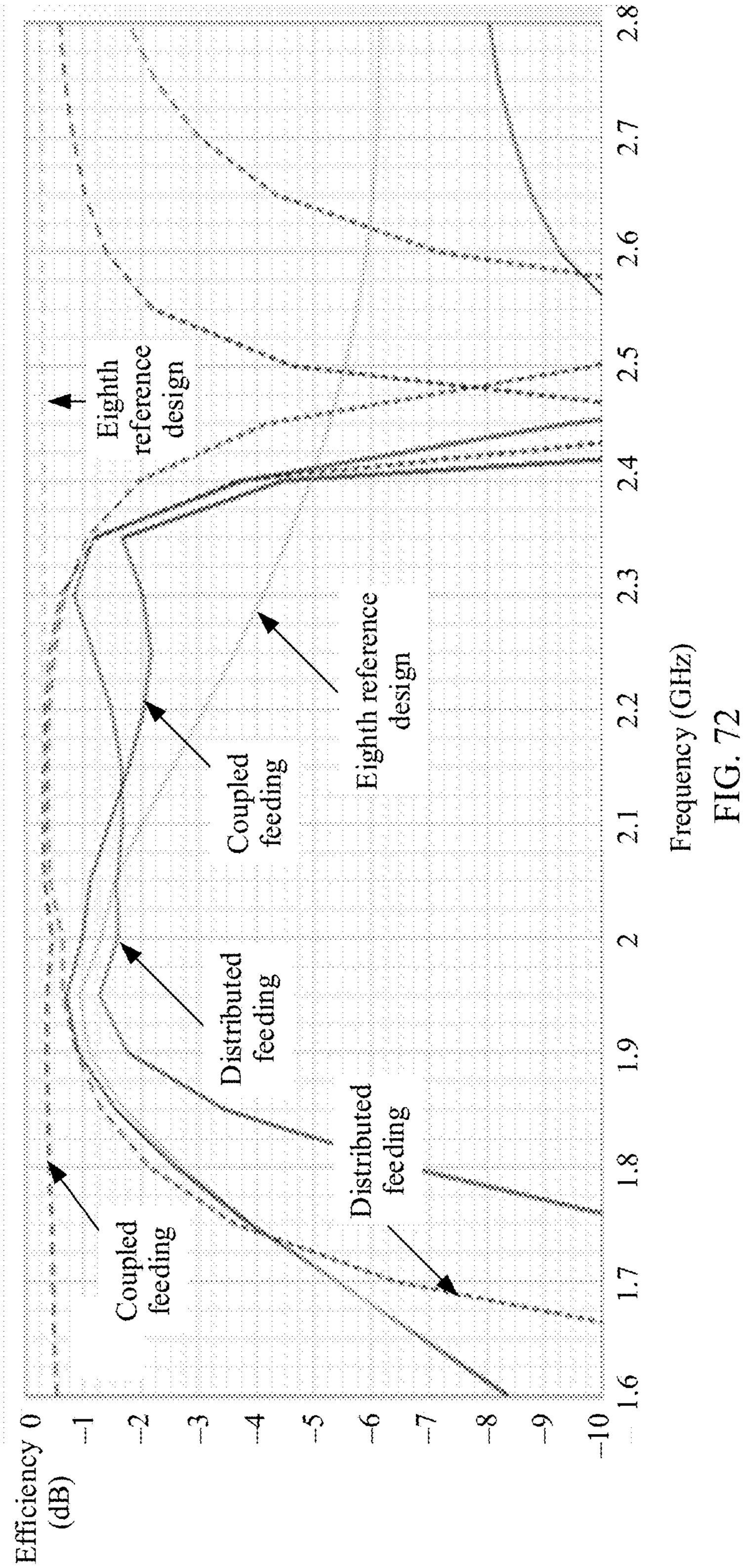

FIG. 71 and FIG. 72 are an S parameter comparison effect curve graph and a radiation efficiency and system efficiency (namely, efficiency) comparison effect curve graph that are obtained when a simulation effect test is separately performed on an electronic device according to an embodiment of this application by using a coupled feed antenna, a distributed feed antenna, and an antenna in an eighth reference design.

Analysis principles in FIG. 71 and FIG. 72 are similar to those in FIG. 10 and FIG. 11. Details are not described herein again, where a lower resonance of 1.79 GHz is generated by the first radiator (an inner metal side frame), and a higher resonance of 2.34 GHz is generated by the second radiator (an outer metal side frame). It can be learned that, regardless of whether a distributed feed structure or a coupled feed structure is used, in this embodiment of this application, more operating frequency bands can be covered under a condition of meeting same transmit efficiency. In addition, in a same frequency band, under a condition of meeting specific system efficiency, the antenna in this embodiment of this application can excite two resonance modes to cover a wide operating frequency band, thereby significantly improving efficiency bandwidth.

Figure 73A:
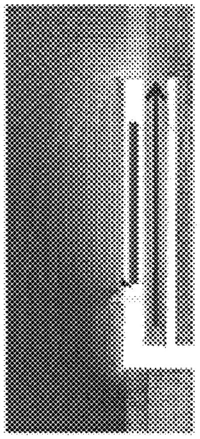
FIG. 73*a* and FIG. 73*b* are current patterns obtained when a simulation effect test is performed on an antenna according to an embodiment of this application at different resonance frequencies, where the antenna uses a distributed feed structure.
Figure 73B:
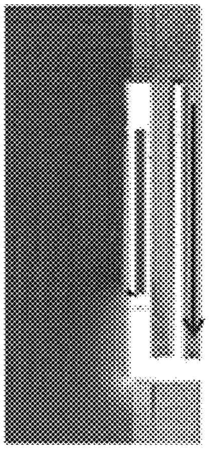
Figure 74A:
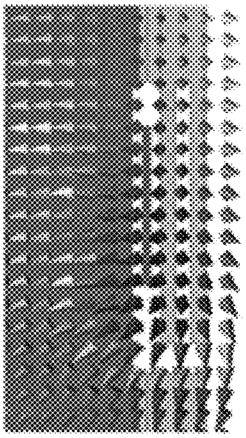
FIG. 74*a* and FIG. 74*b* are electric field patterns obtained when a simulation effect test is performed on an antenna according to an embodiment of this application at different resonance frequencies, where the antenna uses a distributed feed structure.
Figure 74B:
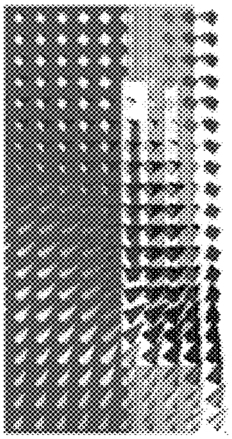
Figure 75A:
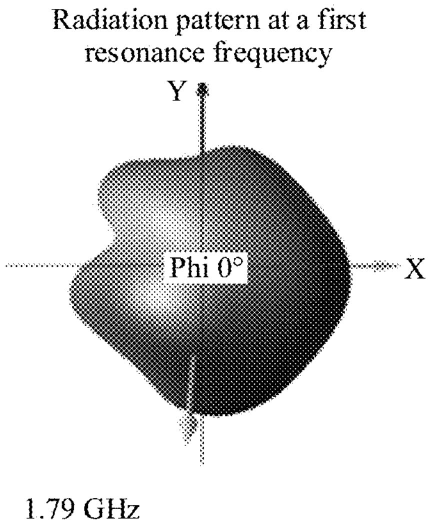
FIG. 75*a* and FIG. 75*b* are radiation patterns obtained when a simulation effect test is performed on an antenna according to an embodiment of this application at different resonance frequencies, where the antenna uses a distributed feed structure.
Figure 75B:
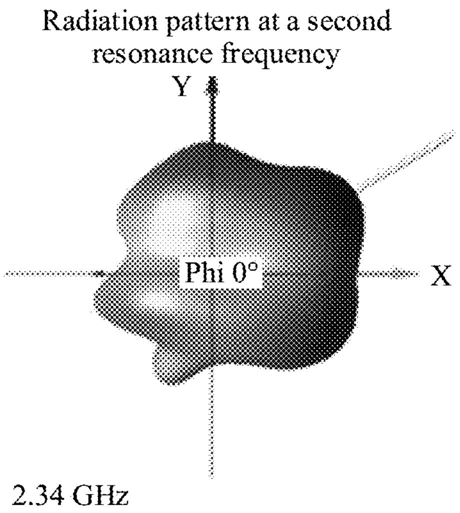

FIG. 73*a* and FIG. 73*b* are current patterns obtained when a simulation effect test is performed on an antenna according to an embodiment of this application at different resonance frequencies. FIG. 74*a* and FIG. 74*b* are electric field patterns obtained when a simulation effect test is performed on an antenna according to an embodiment of this application at different resonance frequencies. FIG. 75*a* and FIG. 75*b* are radiation patterns obtained when a simulation effect test is performed on an antenna according to an embodiment of this application at different resonance frequencies, where the antenna uses a distributed feed structure.

Analysis principles in FIG. 73*a* to FIG. 75*b* are similar to those in FIG. 12*a* to FIG. 14*b*. It can be learned that electric fields generated by two radiators in the antenna are all in a direction from the ground to the radiator. It can be learned from FIG. 75*a* and FIG. 75*b* that radiation directions of the antenna at a first resonance frequency and a second resonance frequency are approximately the same. Therefore, it can be learned that currents, electric fields, and radiation characteristics generated by the antenna at the first resonance frequency and the second resonance frequency are basically the same.

Figure 76:
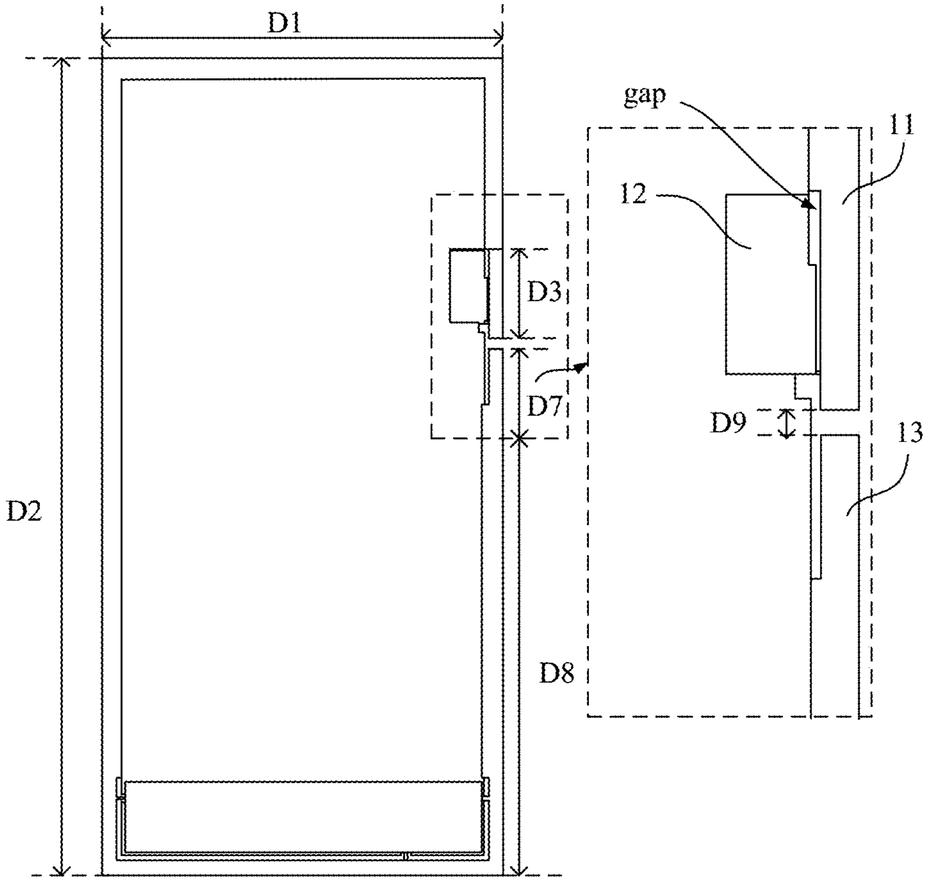
FIG. 76 is a schematic diagram of a three-dimensional structure of an electronic device according to an embodiment of this application, where a schematic diagram of a three-dimensional structure of an antenna in the electronic device is shown in a dashed line box, and there are at least three radiators.

FIG. 76 is a schematic diagram of a three-dimensional structure of an electronic device according to an embodiment of this application, where a schematic diagram of a three-dimensional structure of an antenna in the electronic device is shown in a dashed line box. In an embodiment, there are three radiators. In an embodiment, an antenna is located on a side edge of the electronic device. For a schematic diagram of a structure of the antenna, refer to FIG. 7*b*. The structure of the antenna is basically the same as the structure in FIG. 68, and a difference lies in that the antenna further includes a third radiator 13. The third radiator 13 and the second radiator 12 are disposed in serial and are spaced apart end to end to form a slot. In an embodiment, each of the first radiator 11 and the third radiator 13 is formed by using a metal side frame of the electronic device, and is located outside. In an embodiment, the second radiator 12 is formed by using a conductive member in the electronic device, and is located inside. In an embodiment, the second radiator 12 is attached to an inner surface of a rear cover of the electronic device. In an embodiment, a height of the second radiator 12 exceeds the metal side frame by a specific distance in a thickness direction of the electronic device, for example, exceeds 0 mm to 1 mm, or may exceed 0.7 mm.

Figure 77:
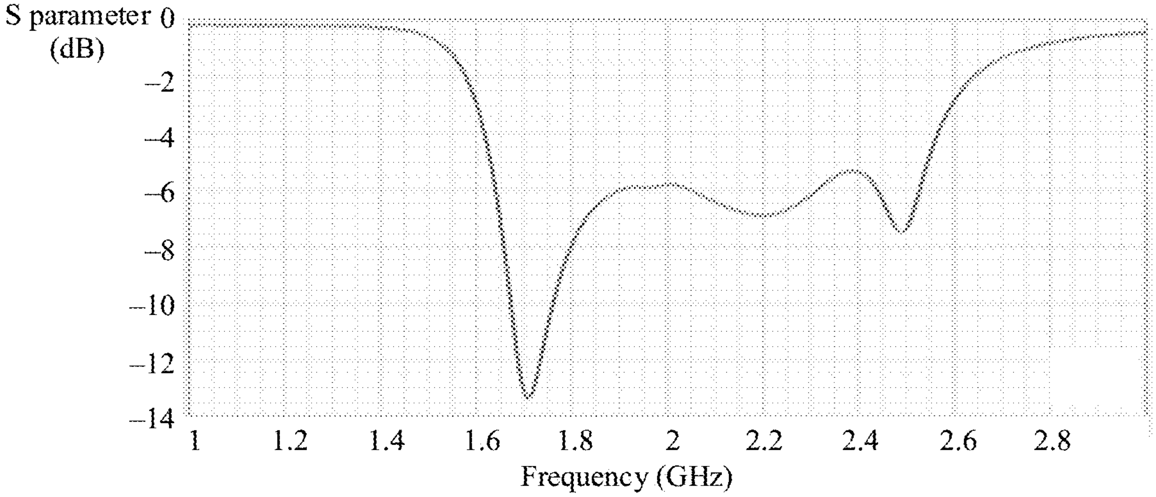
FIG. 77 and FIG. 78 are respectively an S parameter effect curve graph and a radiation efficiency and system efficiency (namely, efficiency) comparison effect curve graph that are obtained when a simulation effect test is performed on an electronic device according to an embodiment of this application.
Figure 78:
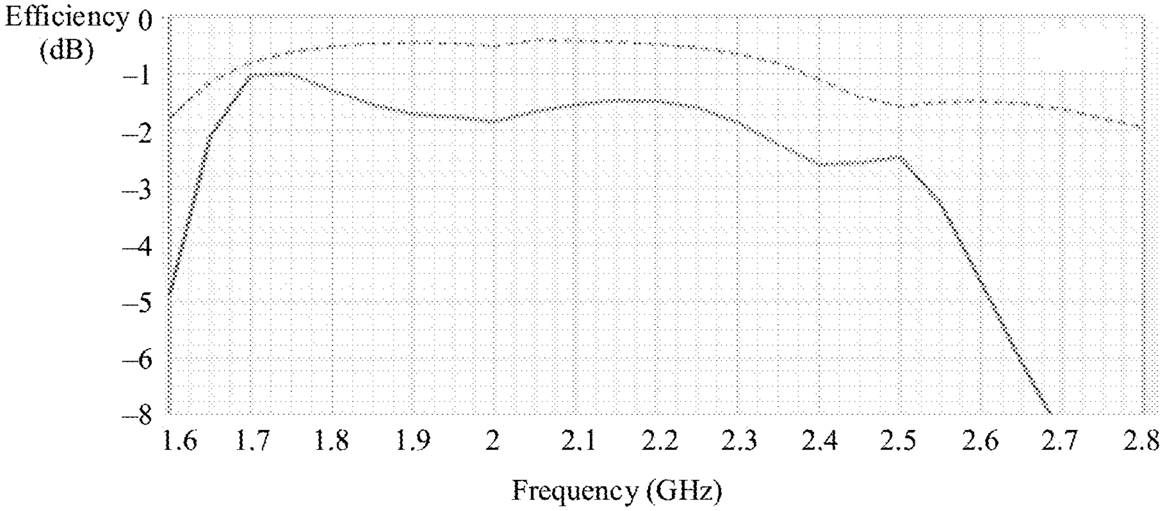

Simulation software is used to perform simulation analysis on the antenna in the electronic device in this embodiment, to obtain effect curve graphs shown in FIG. 77 and FIG. 78.

Simulation effect parameters of the obtained curve graphs shown in FIG. 77 and FIG. 78 are shown in Table 9 below (which is understood with reference to FIG. 76).

TABLE 9

| Parameters | This embodiment |
|---|---|
| Width D1 (mm) of the electronic device | 78 |
| Length D2 (mm) of the electronic device | 158 |
| Distance D8 (mm) between a bottom of the antenna and a bottom of the electronic device | 91 |
| Length D3 (mm) of the first radiator 11 | 17 |
| Length of the second radiator 12 | ¼ times an operating wavelength of the radiator |
| Length D7 (mm) of the third radiator 13 | 11 |
| Gap (mm) between the first radiator 11 and the second radiator 12 | 1 |
| Gap D9 (mm) between the first radiator 11 and the third radiator 13 | 2 |
| Distance h (mm) between an upper surface of a radiator and the PCB board 20 | 3 |
| Grounding component | Jumper resistor (zero-ohm resistor) |
| First matching component | Capacitance value of C = 1 pF |
| Tuning component of the third radiator | Capacitance value of C = 0.6 pF |
| Feed manner | A distributed feed structure is used |

FIG. 77 and FIG. 78 are respectively an S parameter effect curve graph and a radiation efficiency and system efficiency (namely, efficiency) comparison effect curve graph that are obtained when a simulation effect test is performed on an electronic device according to an embodiment of this application.

Analysis principles in FIG. 77 and FIG. 78 are similar to those in FIG. 10 and FIG. 11. Details are not described herein again. In this embodiment, three resonances can be generated, where a lower resonance of 1.71 GHz is mainly generated by the first radiator 11 (an upper metal side frame), a middle resonance of 2.21 GHz is mainly generated by the second radiator 12 (a conductive member), and a higher resonance of 2.49 GHz is mainly generated by the third radiator 13 (a lower metal side frame). It can be learned that, in this embodiment of this application, a plurality of resonance modes are generated under a condition of meeting same transmit efficiency, so that more operating frequency bands can be covered. In addition, in a same frequency band, under a condition of meeting specific system efficiency, the antenna in this embodiment of this application can excite two resonance modes to cover a wide operating frequency band, thereby significantly improving efficiency bandwidth.

Figure 79A:
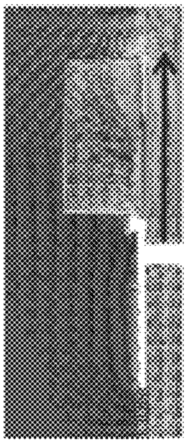
FIG. 79*a*, FIG. 79*b*, and FIG. 79*c* are current patterns obtained when a simulation effect test is performed on an antenna according to an embodiment of this application at different resonance frequencies.
Figure 79B:
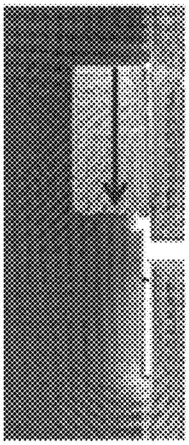
Figure 79C:
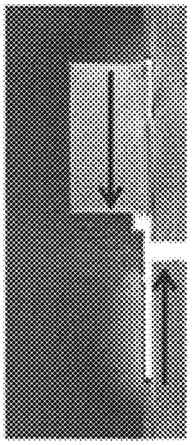
Figure 80A:
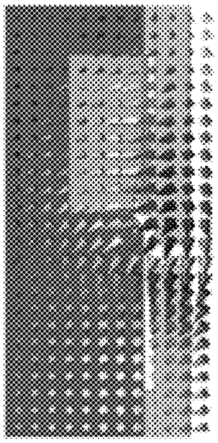
FIG. 80*a*, FIG. 80*b*, and FIG. 80*c* are electric field patterns obtained when a simulation effect test is performed on an antenna according to an embodiment of this application at different resonance frequencies.
Figure 80B:
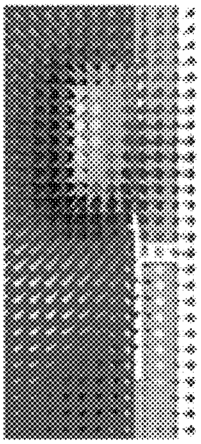
Figure 80C:
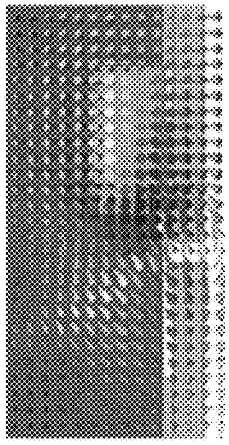
Figure 81A:
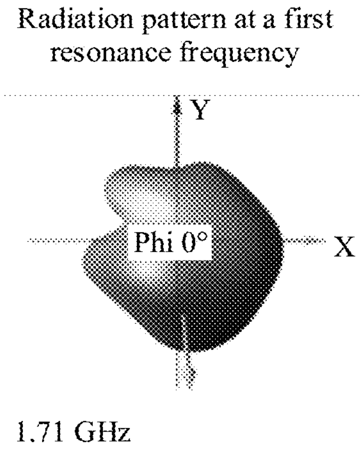
FIG. 81*a*, FIG. 81*b*, and FIG. 81*c* are radiation patterns obtained when a simulation effect test is performed on an antenna according to an embodiment of this application at different resonance frequencies.
Figure 81B:
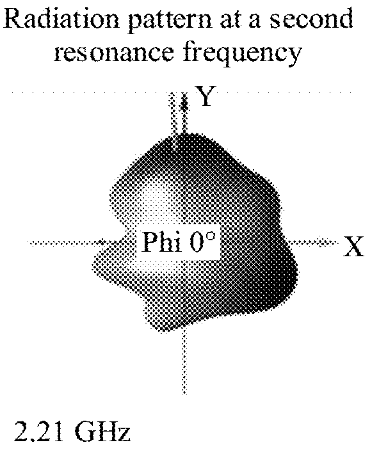
Figure 81C:
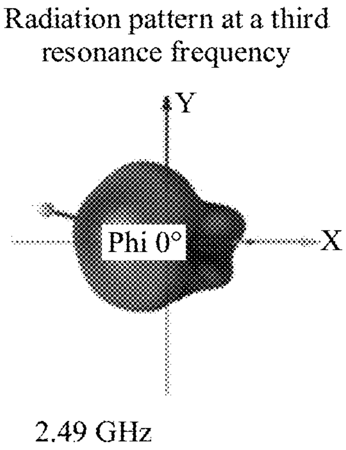

FIG. 79*a*, FIG. 79*a*, FIG. 79*b*, and FIG. 79*c* are current patterns obtained when a simulation effect test is performed on an antenna according to an embodiment of this application at different resonance frequencies. FIG. 80*a*, FIG. 80*b*, and FIG. 80*c* are electric field patterns obtained when a simulation effect test is performed on an antenna according to an embodiment of this application at different resonance frequencies. FIG. 81*a*, FIG. 81*b*, and FIG. 81*c* are radiation patterns obtained when a simulation effect test is performed on an antenna according to an embodiment of this application at different resonance frequencies.

Analysis principles in FIG. 79*a* to FIG. 81*c* are similar to those in FIG. 12*a* to FIG. 14*b*. It can be learned that electric fields generated by three radiators in the antenna are all in a direction from the ground to the radiator. It can be learned from FIG. 81*a* to FIG. 81*c* that radiation directions of the antenna at a first resonance frequency, a second resonance frequency, and a third resonance frequency are approximately the same. Therefore, it can be learned that currents, electric fields, and radiation characteristics generated by the antenna at the first resonance frequency, the second resonance frequency, and the third resonance frequency are basically the same.

Figure 82:
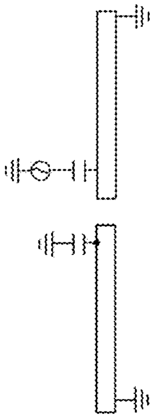
FIG. 82 is a schematic diagram of a principle structure of an antenna in a ninth reference design, where there are two radiators.

FIG. 82 is a schematic diagram of a principle structure of an antenna in a ninth reference design, where there are two radiators.

Figure 83:
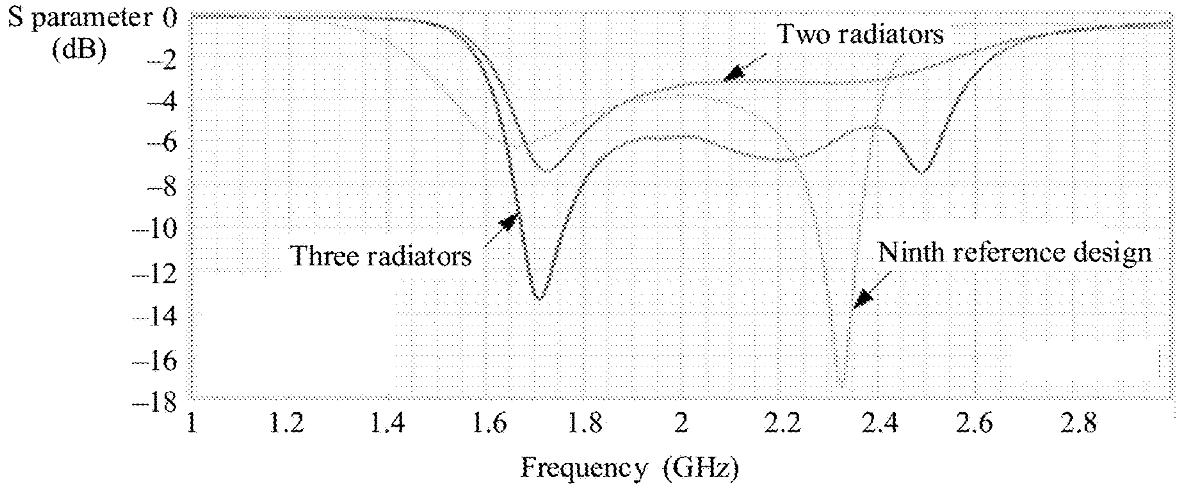
FIG. 83 and FIG. 84 are an S parameter comparison effect curve graph and a radiation efficiency and system efficiency (namely, efficiency) comparison effect curve graph that are obtained when a simulation effect test is separately performed on an electronic device according to an embodiment of this application by using an antenna with two radiators, an antenna with three radiators, and an antenna in a ninth reference design.
Figure 84:
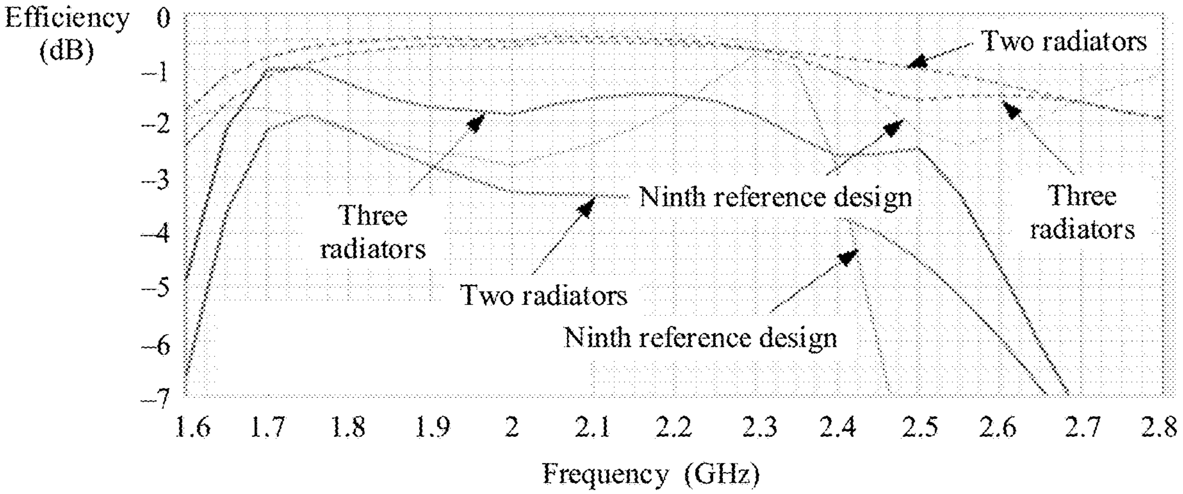

Simulation software is used to perform simulation analysis on an antenna with two radiators, an antenna with three radiators, and an antenna in a ninth reference design in this embodiment of this application, to obtain simulation comparison effect curve graphs shown in FIG. 83 and FIG. 84. For simulation effect parameters of the obtained curve graphs shown in FIG. 83 and FIG. 84, refer to the foregoing Table 9. A size of the antenna in the ninth reference design is the same as a metal side frame part (namely, the first radiator 11 and the third radiator 13) of the antenna in this embodiment, and other related parameters are the same as those of the antenna in this embodiment.

FIG. 83 and FIG. 84 are an S parameter comparison effect curve graph and a radiation efficiency and system efficiency (namely, efficiency) comparison effect curve graph that are obtained when a simulation effect test is separately performed on an electronic device according to an embodiment of this application by using an antenna with two radiators, an antenna with three radiators, and an antenna in a ninth reference design.

Analysis principles in FIG. 83 and FIG. 84 are similar to those in FIG. 10 and FIG. 11. Details are not described herein again. It can be learned that, in this embodiment of this application, more operating frequency bands can be covered under a condition of meeting same transmit efficiency. In addition, in a same frequency band, under a condition of meeting specific system efficiency, the antenna in this embodiment of this application can excite at least two resonance modes to cover a wide operating frequency band, thereby significantly improving efficiency bandwidth. Further, it can be learned that: Efficiency bandwidth of the antenna with three radiators is better than efficiency bandwidth of the antenna with two radiators.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An antenna, comprising:

at least two radiators comprising a first radiator and a second radiator that are spaced apart in parallel, wherein a first end of the first radiator is disposed closer to a first end of the second radiator than a second end of the first radiator;

a feed point connected to both the first radiator and the second radiator; and a ground connected to both the first end of the first radiator and the first end of the second radiator, wherein a gap by which the first radiator and the second radiator are spaced apart is less than or equal to 3 mm.

2. The antenna according to claim 1, wherein:

a first feed connection point of the first radiator is connected to the feed point;

a second feed connection point of the second radiator is connected to the feed point; and a phase difference between a feed signal received by the first feed connection point and a feed signal received by the second feed connection point ranges from 135° to 225°.

3. The antenna according to claim 1, wherein the first end of the first radiator and the first end of the second radiator are grounded using a co-grounded structure comprising:

a grounding component connected between the first end of the first radiator and the first end of the second radiator, the first end of the first radiator is grounded, and the first end of the second radiator is grounded by using the grounding component and the first radiator; or a metal component, the first end of the first radiator is connected to the first end of the second radiator using the metal component, and the metal component is grounded.

4. The antenna according to claim 1, wherein the first end of the first radiator is disposed in alignment with the first end of the second radiator.

5. The antenna according to claim 1, wherein the second end of the first radiator or a second end of the second radiator is grounded.

6. The antenna according to claim 1, wherein a resonance frequency of the first radiator and a resonance frequency of the second radiator are within a same operating frequency band of the antenna.

7. The antenna according to claim 6, further wherein:

at any frequency in the same operating frequency band, an electric field generated by the first radiator and an electric field generated by the second radiator have a same direction from the ground to the radiator or a same direction from the radiator to the ground.

8. The antenna according to claim 7, wherein the gap by which the first radiator and the second radiator are spaced apart is less than or equal to 1 mm.

9. The antenna according to claim 1, wherein:

the at least two radiators further comprise a third radiator;

the third radiator and the first radiator or the second radiator are disposed in series with each other and are spaced apart end to end to form a slot, so as to be coupled through the slot; and an end of the third radiator that is away from the slot is grounded.

10. An electronic device, comprising:

an antenna comprising at least two radiators comprising a first radiator and a second radiator that are spaced apart in parallel, wherein a first end of the first radiator is disposed closer to a first end of the second radiator than a second end of the first radiator, a feed point connected to both the first radiator and the second radiator, and a ground connected to both the first end of the first radiator and the first end of the second radiator, wherein a gap by which the first radiator and the second radiator are spaced apart is less than or equal to 3 mm.

11. The electronic device according to claim 10, wherein the first radiator and the second radiator are connected to the feed point using a differential feed structure.

12. The electronic device according to claim 10, wherein:

the first radiator and the second radiator are connected to the feed point using a distributed feed structure;

the distributed feed structure comprises a signal transmission line;

a first end of the signal transmission line is connected to a first feed connection point of the first radiator; and a second end of the signal transmission line is connected to a second feed connection point of the second radiator.

13. The electronic device according to claim 12, wherein:

the signal transmission line is electrically connected to a radio frequency source via the feed point; and a line length between the first end of the signal transmission line and the feed point and a line length between the second end of the signal transmission line and the feed point are set so that a phase difference between a feed signal received by the first feed connection point and a feed signal received by the second feed connection point ranges from 135° to 225°.

14. The electronic device according to claim 12, wherein the distributed feed structure further comprises:

a first matching component connected between the first end of the signal transmission line and the first feed connection point; and a second matching component connected between the second end of the signal transmission line and the second feed connection point, wherein the first matching component and the second matching component are used for radiator impedance matching.

15. The electronic device according to claim 14, wherein:

the first matching component is a capacitor, and the second matching component is an inductor or a jumper resistor; or the first matching component is an inductor or a jumper resistor, and the second matching component is a capacitor.

16. The electronic device according to claim 10, wherein:

the first radiator comprises at least a portion of a metal side frame of the electronic device, and the second radiator comprises at least a portion of a conductive member in the electronic device; or each of the first radiator and the second radiator comprises at least a portion of the metal side frame of the electronic device; or each of the first radiator and the second radiator comprises at least a portion of the conductive member in the electronic device.

17. The electronic device according to claim 10, further comprising a metal side frame, wherein the first radiator or the second radiator comprises at least a portion of the metal side frame.

18. The electronic device according to claim 10, further comprising a conductive member, wherein the first radiator or the second radiator comprises at least a portion of the conductive member.

19. An electronic system, comprising:

a display;

a frame coupled to the display;

a printed circuit board coupled to the frame;

a front cover coupled to a first side of the frame;

a back cover coupled to second side of the frame; and an antenna comprising:

at least two radiators comprising a first radiator and a second radiator that are spaced apart in parallel, wherein a first end of the first radiator is disposed closer to a first end of the second radiator than a second end of the first radiator, a feed point connected to both the first radiator and the second radiator, and a ground connected to both the first end of the first radiator and the first end of the second radiator, wherein a gap by which the first radiator and the second radiator are spaced apart is less than or equal to 3 mm.

20. The electronic system of claim 19, wherein the first radiator or the second radiator comprises at least a portion of the frame.

* * * * *